(12) United States Patent
Zwart et al.

(10) Patent No.: US 8,786,409 B2
(45) Date of Patent: Jul. 22, 2014

(54) SYSTEM FOR IMPULSE INPUT OF COMMANDS, CONTROL ARGUMENTS AND DATA

(75) Inventors: Andrew Jan Zwart, Puslinch (CA); Simon Regis Louis Lancaster-Larocque, Gloucester (CA); Dawit Mergia Effa, Kitchener (CA); Greg Mark Derige, Winnipeg (CA); Kenneth King Ho Lee, Mississauga (CA); Matthew Allen Rendall, Waterloo (CA); Jake Zwart, Puslinch (CA); Andrew Michael Cameron, Kelowna (CA)

(73) Assignee: VBT Innovations Inc, Puslinch, Ontario (CA)

( * ) Notice: Subject to any disclaimer, the term of this patent is extended or adjusted under 35 U.S.C. 154(b) by 1267 days.

(21) Appl. No.: 12/590,009

(22) Filed: Oct. 30, 2009

(65) Prior Publication Data

US 2010/0060604 A1 Mar. 11, 2010

Related U.S. Application Data

(63) Continuation-in-part of application No. PCT/CA2008/001957, filed on Oct. 31, 2008.

(30) Foreign Application Priority Data

Nov. 1, 2007 (GB) .................................. 0721475.2

(51) Int. Cl.
*G06F 3/041* (2006.01)

(52) U.S. Cl.
USPC .......................................... 340/12.1; 345/173

(58) Field of Classification Search
USPC ............. 340/4.11, 4.12, 4.13, 4.14, 4.3, 4.31, 340/12.22, 1.23, 12.24, 12.25; 341/173
See application file for complete search history.

(56) References Cited

PUBLICATIONS

Applicant response to CIPO discovery of two inventions in as-filed PCT claims (Rule 92.1). ANNEX A. Required letter response dated Jan. 2, 2009. A.Zwart-to Examiner-Christian Popa, 4 sheets.
PCT ISR written opinion dated Feb. 17, 2009. ANNEX B. 8 sheets.
Applicant response (Rule 92.1), with confments, re ISR objections. ANNEX C. Rebuttal to "obviousness" objections, A.Zwart to Examiner Christian Popa dated Apr. 15, 2009, 15 sheets.
Engineering text slides, *Dynamics*, RC Hibbeler, Prentice, 2009, 8 slides printed from web = bc.inter.edu/.../Hibb_11e_Dynamics_Lecture_Section_15-01_r.pdf . ANNEX D, 2 sheets.

*Primary Examiner* — Nabil Syed
(74) *Attorney, Agent, or Firm* — M. Conrad Huffstutler

(57) ABSTRACT

An advanced technique of user interaction with compact, portable, hand-held devices, larger electronic devices and other surfaces and objects is disclosed. The particular component arrays, configuration modes and analytic methodologies disclosed are optimized and directed toward logical interpretation of device motions resulting from vector impulses as user data inputs and commands. Apparatus, system and method embodiments are described and illustrated by examples.

14 Claims, 31 Drawing Sheets

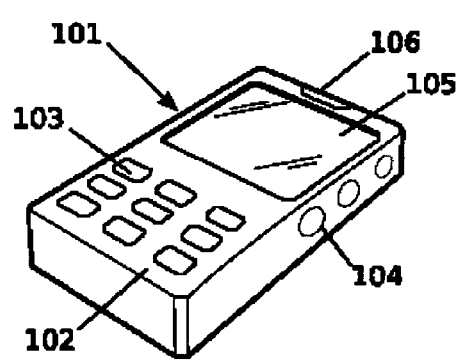
FIG. 1A
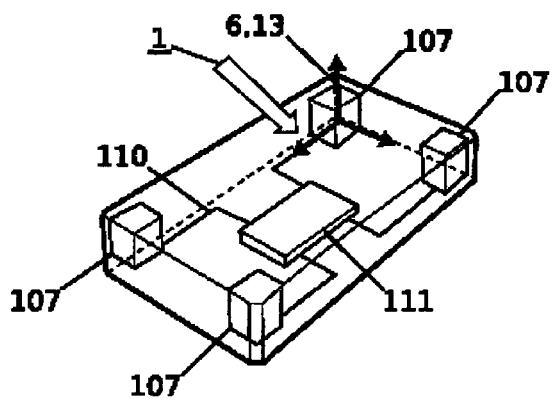
FIG. 1B
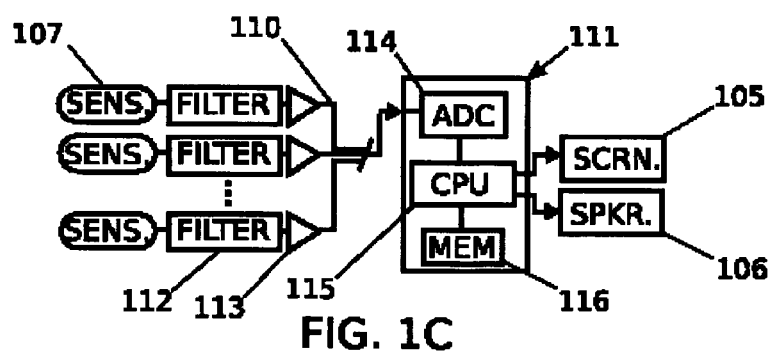
FIG. 1C
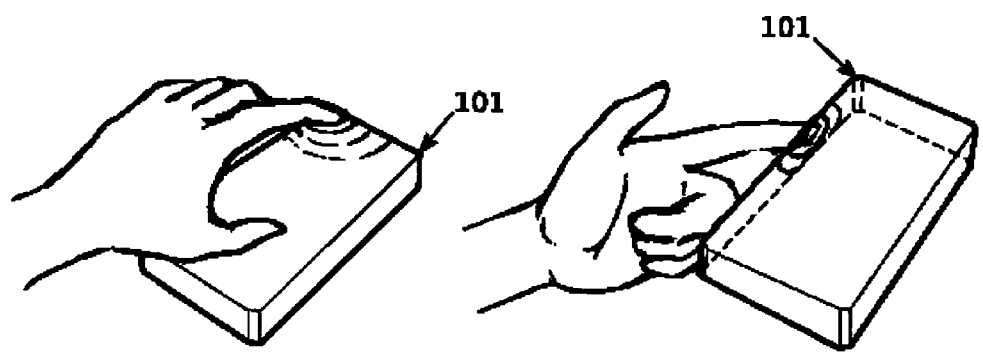
FIG. 1D
FIG. 1E

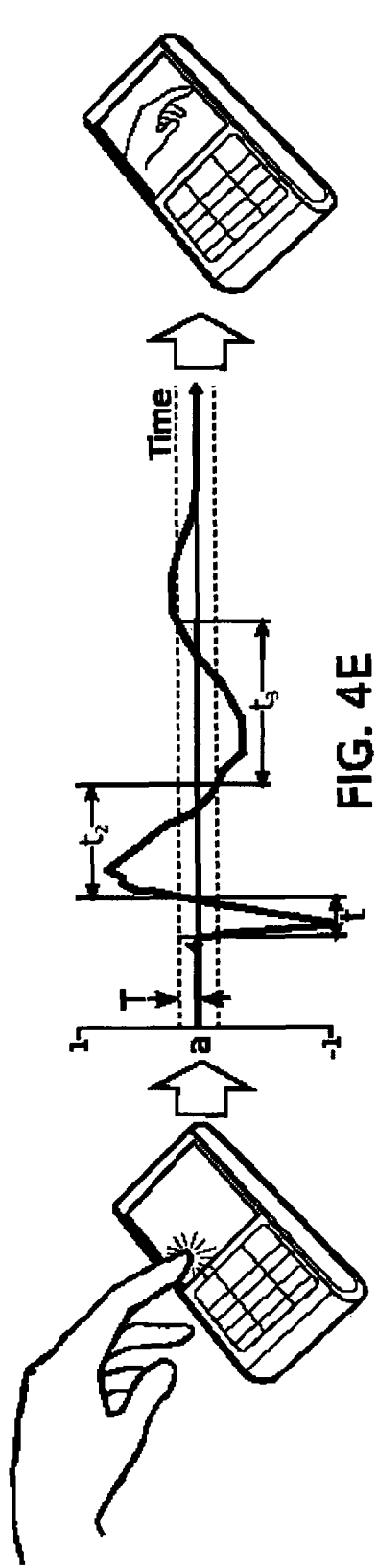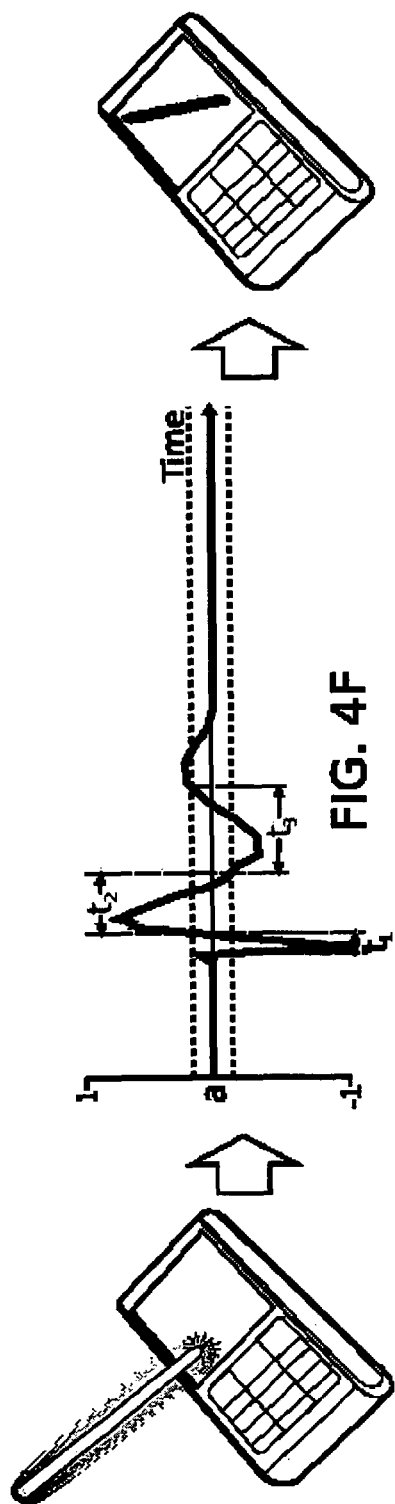
FIG. 4E
FIG. 4F

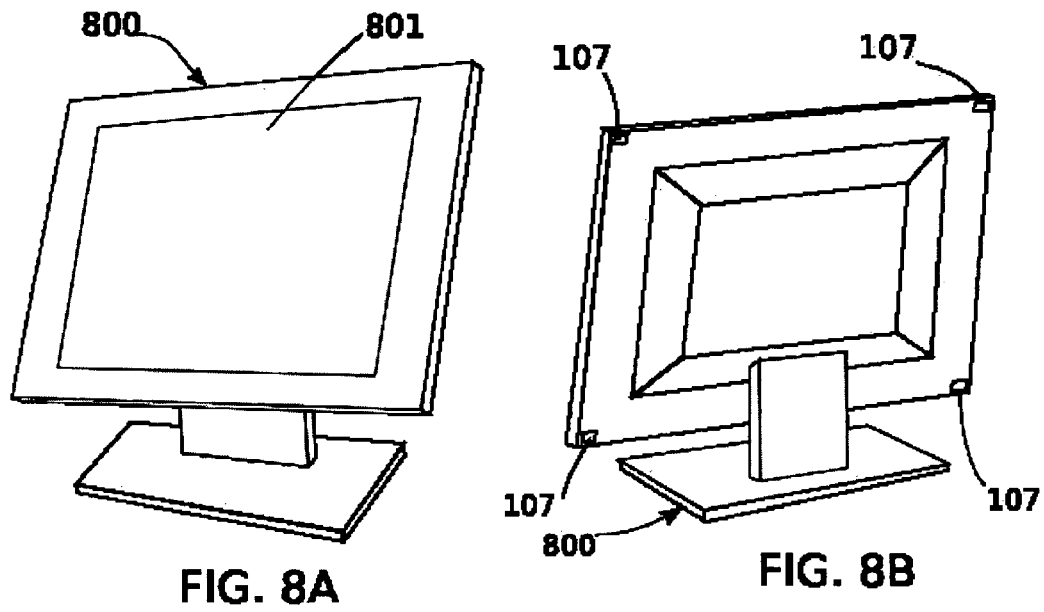
FIG. 8A
FIG. 8B
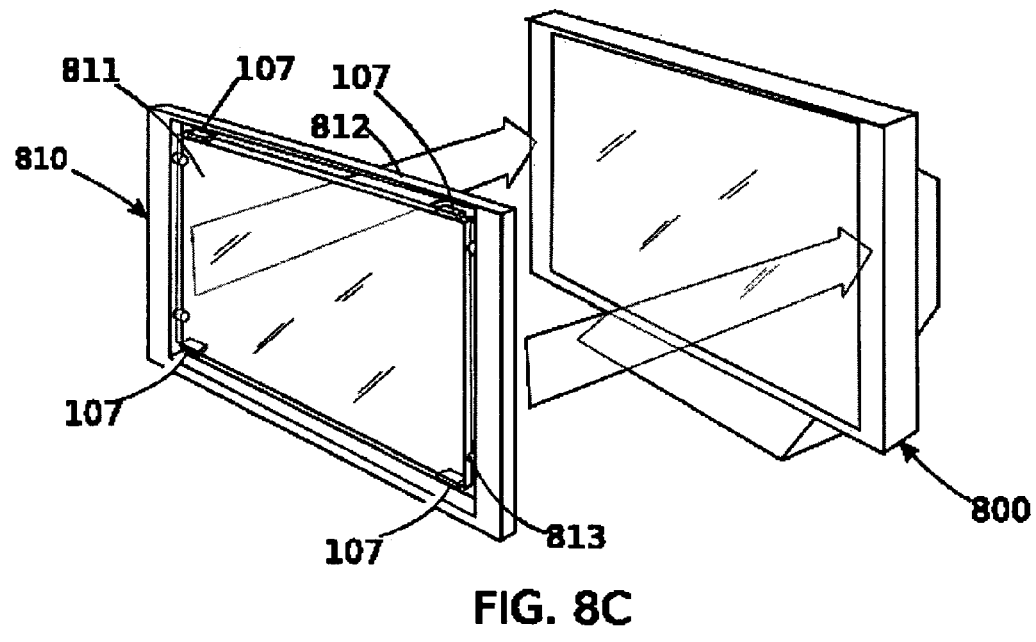
FIG. 8C

SYSTEM FOR IMPULSE INPUT OF COMMANDS, CONTROL ARGUMENTS AND DATA

CROSS-REFERENCE TO RELATED APPLICATIONS

This application is a continuation-in-part of PCT/CA2008/001957 filed on 31 Oct. 2008 which designated US along with other countries and claimed the priority of a prior provisional application, GB-0721475.2, filed on 1 Nov. 2007, both of which are included by reference.

TECHNICAL FIELD

The present application is related to the field of determining the parameters and characteristics of impulse events, and the field of human-machine user interfaces.

BACKGROUND ART

U.S. Pat. No. 7,345,677 This document seems to focus upon Lamb-wave techniques for detecting the history of surface waves propagating upon a sheet of glass. Much of the disclosure and several of the method claims (1-ff) of this USGrant focus upon a "method for locating a position of an impact", and mention a methodology similar to time-reversed acoustics, the known technic which grew from early published studies of Parvulescu and of Clay (~1960) on matched-signal techniques. This document does not mention the extensive work done by Mathias Fink in France on Décomposition de l'Opérateur de Retournement Temporel, which started in about 1990; DORT is the French-language acronym for time-reversal mirrors.

One example of the early work done by Professor Mathias Fink and his students relating to phased-array ultrasonic imaging was presented on 21 Jul. 1992 at a SPIE Conference in San Diego, Calif. (USA). This paper was titled "Focusing and steering of ultrasonic waves generated by a sixteen-laser source array". The authors were: Marie-Helene Noroy, Daniel Royer, and Mathias Fink. This paper confirmed excellent focusing and sensitivity of the multiple active thermoelastic sites by the use of classical piezoelectric transducers and a compact optical heterodyne probe.

The following quote from a contemporaneous published abstract ["The laser-generated ultrasonic phased array: Analysis and experiments", by Marie-Hélène Noroy, Daniel Royer, and Mathias Fink; Laboratoire Ondes et Acoustique, Université Paris VII, URA C.N.R.S. 1503, ESPCI, 10, rue Vauquelin, 75231 Paris Cedex 05, France (Received 27 Jan. 1993; accepted 29 Jun. 1993)] gives full, clear, complete and exact detail on the particular method reported in the 1992 SPIE presentation, i.e., "The elastic waves are detected either by a broadband optical heterodyne probe to analyze the wide ultrasonic signal spectrum (0-20 MHz), or by a narrow-band piezoelectric transducer to achieve the sectorial acoustic beam scanning of the sample. Neglecting heat diffusion in the solid and considering the source as a surface center of expansion, the impulse directivity patterns of laser-generated longitudinal acoustic waves have been computed. Experiments performed on duraluminum samples in the thermoelastic regime and steel samples in the ablation regime are presented and compared with this analysis. It is shown that a high focusing and a significant improvement of the signal sensitivity for longitudinal waves can be achieved with this technique."

Since Professeur Fink is a distinguished international authority on the science of ultrasonic medical therapy-imaging (the author of more than 300 research papers as well as inventor on a number of patents) and undoubtedly lectures often in public seminars and thesis orals, the application of ultrasonic imaging principles he has long taught relating to the problem of "locating the position of an impact" would have been well known after about 1992.

USPubApp 20070247434 FIGS. 1-6 depict a PDA device with display screen, permanent control keys ("buttons"), four small circular dashed features identified as "virtual buttons 130" and a very small circular dashed feature marked "tap sensor 140". These drawings are confusing because they seem vague and indefinite, i.e., dashed lines are typically used to show environmental features which are not part of the alleged invention. One possibility is that the disclosed "Virtual Button,™" also display the special property of "visibility".

This invention is disclosed by means of the following brief description, "A position detecting mechanism determines the position of a user's tap on the outside surface of the housing based on the tap signal. In accordance with the preferred embodiments of the present invention, the position of the user's tap is determined through triangulation using the tap signal from each of plural accelerometers mounted at different locations." (P17)

Enabling detail for the "position detecting mechanism", i.e., specific facts about its structural features, their individual functions and the methods by which they cooperate to sense input "taps", measure quantitative distances from either the "tap sensor 140" or the undefined locations of "plural accelerometers" and calculate angles to the "button 130" are not to be found in this document.

The apparent action steps 600-618 and related apparatus elements of this alleged invention as shown in FIG. 6 are characterized by name only and no quantitative data is provided on their initiation condition, duration, end point, size, shape, location, performance, etc.

The "triangulation" process (P39, P40) is vague and indefinite since the several named multiple accelerometers do not measure "tap" angles and distances and solve: firstly the particular triangles or secondly the complex geometric relationships (angles and distances) between the several possible "virtual buttons" and the several principal axes of rotation (x, y, or z) of the possible accelerometers.

Thus, one of ordinary skill reasonably concludes that this invention is not disclosed in full, clear, concise and exact terms.

U.S. Pat. No. 7,152,014 Bang, et al. Although the word "identify" is found more than 40 times in the grant, its particular, exact, quantitative technical meaning is not disclosed.

Because the words "deflection wave", "acoustic" and "vibration" are found 0 times in this USGrant, it is concluded that these basic mechanical phenomena, which are undoubtedly present and able to be measured in any real situation, are disputed or not recognized in this invention. Indeed, the repeated use of "inertia" and "angular velocity" suggests that the invention relies upon undefined new laws of physics for "tap" response and sensing. Not a single actual indicia-numbered electronic component is identified by critical performance data such as: source, model, size, sensitivity, linearity and other critical functional characteristics.

The specification seems non-enabling for independent Claim 1 which relates to a specific electronic device since it contains: (a) not a single type-model-version identification of any particular gyroscope or "angular accelerometer" being used, (b) no actual functional characteristics of any particular "inertia sensors" or "angular velocity sensors", computers or other signal processing components are disclosed, (c) no specific minimum, maximum, or typical "tap input" intensity, elastic energy or momentum exchange value is disclosed and (d) no critical elastic and vibration-damping properties of structural areas of the "housing" and its frame, which receive "input taps".

The specification seems non-enabling for independent Claim 26 which relates to a "method of entering information" since it contains no quantitative physical or functional disclosure of the several critical "means", i.e., "angular velocity measuring", "determining" whether angular velocity is actual tapping and "identifying" a particular rotation axis excited by "tapping".

The specification seems non-enabling for independent Claim 42 which relates to a "computer program" since no explicit or even general "instructions" are disclosed in a short listing of typical computer code or a microfiche attachment. One of ordinary skill would thus be required to do extensive research to find and validate components capable of: (a) measuring an unknown angular velocity resulting from an undefined "tap contact" on any unspecified area of the housing, (b) collecting and sampling the output responses from the selected components into a unspecified processor and (c) reliably deducing the "contacted region".

DISCLOSURE OF INVENTION

The present invention provides the ability to detect the location of an impulse on an electronic enabled device without the need for a direct mechanical or electrical interface, e.g., mechanical push button or capacitive touch-screen. An array of oriented motion sensors is used to measure both body motions and shell vibrations of an enabled electronic-input device. Based on the unique nature of motions induced by a particular location of the impulse vector input upon the device, the characteristics of the original impulse vector input can be accurately determined using the techniques disclosed. Table 4 a and b lists the indicia and abbreviations; Table 5 shows the properties of some common polymers used for housings and other structures.

In addition to determining the location of an impulse input, other unique results are produced. The properties/geometry of the contacting object, the intensity of input, and the angle of input are also detected and determined. In this way, false and inaccurate impulses are rejected.

Embodiments of the present invention utilize a two-phase process: the configuring phase and the operation phase. First, the device is configured with software which prompts the user to provide an input impulse on the surface of the device. Once data of an impulse vector input event is collected by the motion sensors, it is analyzed by the processor with advanced algorithms. These algorithms extract information relating to the motion (acceleration of vibration in a preferred embodiment) of the device and populate a Composite Vibration Profile (CVP) for the impulse event. Parameters such as input apparatus, striking method and impacted zone are combined with the CVP and stored in a comparison library (L).

In the second phase, the operation phase, the device calculates a CVP based on impulse vector input events in a process identical to that of phase one. The resultant CVP is compared to the CVPs in the comparison library to determine the closest matching CVP. If this match is sufficiently close, the parameters associated with the stored comparison library CVP are used as estimates for the parameters of the impulse vector input.

The present methodology begins with simultaneous collection of the data at a selected sampling rate from all sensor channels. Amplifiers may be used to convert any analog sensor data to a sufficient range. Analog data is converted to digital data via an analog to digital converter for all analog devices. Filtering may be applied to digital or analog signals to remove both high-frequency noise and low-frequency signals associated with device repositioning (as opposed to data from a valid impulse).

The resulting data is stored in an acceleration data buffer. This data buffer is continually monitored. When any channel in the buffer exceeds a specified impulse vector trigger threshold, which indicates a significant input impulse vector, subsequent processing is carried out. This includes calculation of a composite vibration profile (CVP).

A CVP condenses the information in the acceleration data buffer into a few characteristic values. This can be done by a variety of methods. A CVP can be calculated by recording the data buffer amplitudes for all channels at specific time slices such as during the maximum extrema. Another method is to take the maximum and minimum amplitude of each channel regardless of the time. The CVP can be enhanced by combining aspects of both schemes in its calculation. The values in the CVP vector represent the motion of the device and can be thought of as a shape.

The composite vibration profile is then compared with stored profiles using one of several possible methods. The methods range from shape comparison algorithms such as the Modal Assurance Criteria (MAC) algorithm to statistical inferences such as Generalized Euclidean Distance (GED), non-parametric techniques such as nearest neighbour (NN) and k-th nearest neighbour (kNN) or others. As needed, these algorithms are combined sequentially or in parallel.

A Bayesian statistical model may be used with the input vector characterization software to infer a user's intended input location. Input-localization algorithms would attach weightings to decision outputs based on the frequency of use of various input locations. This is accomplished by first recording and storing all output decisions in memory. During the operation phase, the match to each impulse zone is represented by a distance, with smaller distances representing closer matches. Using the stored frequency of use of certain input locations these distances can be scaled down (as a function of frequency) for commonly used buttons or scaled up for one or more "Virtual Button,™" that are rarely used.

Such a statistical model must be tightly integrated with particular application programs since input location frequencies vary between applications and, in many cases, from menu to menu. It is also possible to employ repeated or initialization default re-configuring phases to confirm current user-grip or external variables.

To measure rigid-body motion accurately, one must establish the number of motion sensors required to give the dynamic shape of the object at any location, i.e., the shape envelope swept by the object considering vibrations. The shape of vibration of a point in one dimension can be accurately described by one single-axis motion sensor. A point subject to translation in three dimensions would require one tri-axis motion sensor, while if that point was also subject to rotation, a tri-axis rotation sensor would also have to be included.

The range of movements which are sensed in the present invention are shown in the figures: FIG. 1H illustrates pure displacement of a rigid body in any direction and the three axes of rotation for roll, pitch and yaw rotational motions; FIG. 1I illustrates flexural movements of a typical thin plate (130) in its bending modes; and FIG. 1J illustrates acoustic waves propagating (131) (132) through the surface of the shell.

If one looks at the rigid body shape of a line moving or vibrating in a plane and in a direction perpendicular to the line, its shape can be accurately determined by two single-axis motion sensors. For a plane, or any rigid three-dimensional object, the number of measurement locations, the type of sensor, and the number of measurement channels are all inter-related. One measurement location would be sufficient if it contained a three axis translation sensor and a three axis gyroscope.

If only translational measurement is to be used, i.e., only accelerometers, then the number of sensing channels is related to the number of measurement locations. There must be at least three measurement locations that are not co-axial.

If three measurement locations (the number of points that are required to uniquely define the location of a plane mathematically) are available, seven sensing channels will be needed if they are placed correctly. In fact, a minimum of seven sensing channels will be required regardless of the number of co-planar measurement locations as long as at least three locations that are not co-axial are used. Alternatively, if 4 measurement locations are used that are not co-planar, only 6 sensing channels will be required; for example, one tri-axial and three appropriately placed single-axis accelerometers.

If the shape to be characterized is large or cannot be considered rigid, flexure modes become important and additional motion sensors are required. The number of additional motion sensors will be determined by the particular shape being measured. This is determined by the inherent dynamic behavior of the object and vibrational test results from the object. Such test results include the use of Chladni diagrams as well as vibration or modal testing.

For analysis of rigid body modes of vibration it is best to locate translational sensors near the extremities of the device. This will magnify the difference in the physical data collected by the sensors and reduce the effect of measurement noise. For best detection of device flexural modes of vibration the translational sensors should be placed on or near the anti-nodes of the vibration. Anti-nodes are those points that experience the greatest amplitude of motion, while nodes are those points that experience no amplitude of vibration motion. Naturally, if rotational sensors are used in capturing bending nodes, it would be best to place them on the nodes of vibration as these points experience no translation but are the points of maximum angular motion.

Optimum sensor locations can easily be determined with modal testing methods for a particular device. Chladni approaches to define the locations of nodes and anti-nodes can also be used to determine sensor configurations on or within the connected electronic device or external enclosure. These techniques can guide optimal positioning, optimal sensor axis orientation, and optimal signal weighting in the CVP algorithms.

Special Terms

Connected electronic device. This phrase means a device connected to receive signals resulting from user impulses into an input apparatus; interconnection may be accomplished by any known networking means including: laser, optical, electromagnetic, acoustical, mechanical, fluid-mechanical or electron-conductive links.

Signal delivery. The step of delivering a distinctive, sufficient, related resultant signal into the coupled (=connected) device or system as used herein means the transmission, to a local device or system being controlled or to an additional network-connected device, of signal data reflective of the user's original intended vector-input. Further, the transmitted signal data are distinctive in format, sufficient in intensity and duration to convey the input data or response and specific to the user's intent.

External enclosure (102). Generally, the sensing and processing components of the present invention are integrated within a protective housing, including one or more external surfaces adapted to receive finger-impulse inputs or inputs generated by any other device, which inputs are designed to deliver an impulse to the device. The enclosure is made of one or more sufficiently stiff material(s) such as metal, plastic, glass, ceramic or composites.

Optionally however, selected additional impulse-sensing and logic components may be separately mounted on or in contact with, or remotely located from, impulse-receptive surfaces which are also easily accessible to the user during the inputting sequence. The characteristics of the vibration being measured are sensed by the motion sensors and such characteristics are unique for each different input site or activatable polygon. It is anticipated that such separated components might also be used temporarily during certain conditions, i.e., provision for a head, arm-elbow, knee-foot impulses for frequent or repeated inputs. Similarly, a pointer-stylus held in the user's teeth could be used to provide impulses to a panel within easy reach of his head movements. In one embodiment the external enclosure is hand-grippable.

TSM material. The transfer surface, (3,1), is typically a thin shell of a material such as polymer, alloy, ceramic or a composite of these which receives the user's impulses. The exterior surface is generally smooth, i.e., 0.001<RMS surface roughness, mm <0.01, with a large radius of curvature (100<radius, mm <∞). The interior aspect may be provided with molded-integral or attached elements such as ribs to optimize local stiffness and vibrational characteristics.

TSM modulus. The elastic modulus of the shell, (3,2), is related to the specific material type. In the case of a housing having applied one or more continuous or discontinuous layers of different materials, such as a metallic layer plated or sputtered onto a molded part, its elastic characteristics are dominated by the properties of the resulting composite.

TSM thickness. In the case of a polymer, the housing thickness, (3,3), is typically defined by molding factors and the requirements for support and protection of internal elements of the particular hand-held device. Shell thickness is also an adjustable design parameter which is optimized to provide an optimal combination of flexural and vibrational characteristics.

TSM extent. The size of the impulse-reception area of the present invention is dominated by the particular application, i.e., its purpose and inherent mounting factors. For a hand-held or "palm-top" application, the basic shape is a "thin-brick" form (thickness range of 5 to 100 mm) which can be grasped in the normal human hand. The breadth, (3,4), is typically the palm width and the length extent may range from about 2 to 10 times the width.

For an apparatus-mounted transfer surface, the extent is dictated by the external structure and the input surface may be mounted in any orientation, i.e., horizontal, vertical or inclined.

For a permanently-mounted impulse input surface in a lab or office, an extent (3,4) greater than 1000 mm may be limited by ergonomic, safety or architectural considerations.

A non-hand-held transfer surface must of course be mounted and supported to allow a predetermined level of translational displacement or rotational displacement in addition to its normal flexural motions-modes.

Substantially planar surface. Although the present invention can be incorporated within a wide range of enclosure-face profiles including: flat, convex, concave, etc., ergonomic principles favor a planar surface about the size of a human hand and designed to receive finger impulses applied to particular points, edges or a defined area/zone. In some cases it is desirable for input locations to be on odd shaped surfaces, and this is ideally suited for "Virtual Button,™", but would cause problems for traditional touch screen interfaces. In many applications, the user's right index finger will be the impulse stylus and his pointing reflexes will select the particular location, spherical angle and force vector.

Topology of activatable polygons, AP. This concept describes the spatial coordinates of an array of polygonal surface areas or zones mathematically defined upon the apparatus housing surface. Optionally, the housing surface may be provided with an actual map or topology of tactile or other human-perceptible markings to mark out the boundaries of each polygon along with displaying a recognizable icon to indicate the related meaning/purpose. For example, surface decals and/or tactile features (104) are convenient to indicate and delimit possible impulse locations. The area within particular defined coordinates may be used to indicate a predetermined impulse action such as: a logical "no", a number or an alphabet character. Therefore, if a deliberate impulse is detected within a single defined-and-activated area, the related output signal will be sent to the connected device.

In this context, a unique area is "activated" by configuration of the installed sensor array and the relevant software to discern the vibrational and accelerational signatures associated with a range of typical impulse parameters for that particular spot, including: contact radius, vector orientation, force and duration. These "configuration parameters" are then stored in memory for comparison with subsequent "in-use" impulses.

As used herein, configuration is the recording and updating of standard values and reference parameters by which the sensors and related logic systems function. It is a different concept from imparting knowledge or skills to users through a process of repetition and training.

The literal meaning of polygons includes: triangles, squares, rectangles, parallelograms, rhombi, hexagons, octagons and n-gons (n sides). The idea of polygons includes n-gons which closely approximate a circle or ellipse. Activated polygons of the present invention may also be defined to wrap across an edge and extend into multiple adjoining faces of an enclosure, i.e., from a portion of the front face, across the full edge face and onto a portion of the back face.

As used here, the term topology acknowledges that a single apparatus face may be mapped into many polygons of different sizes and edge counts and that a particular mapping may be changed or reset to a completely different configuration at a later time simply by repeating the configuration stages noted above.

The origin (2,1) of the Cartesian coordinate system used to define particular impulse-input sites on the transfer surface 2 is positioned and aligned according to the particular application. For certain hand-held applications, it is convenient to fix this origin, at the lower left corner (plan view). The x, y, and z basis vectors of this system may be used to define the motion sensor origins (6,13) and align the sensitive axes of each motion sensor in the particular array. The location of this origin also defines the offset distance (from the individual motion sensors) to the various displacement directions and axes of rotational motion allowed for the transfer surface, i.e., motions which are allowed by the placement of the fingers and palm as well as the constraints and vibration-damping effects related to tightness of the user's grip.

The idea of activation as used here includes deliberate design of the housing shell to include features such as thin webs, coatings and stiffening ribs; features which modify mechanical-vibrational parameters may be added entirely on the interior portion or on the exterior-surface. Such functional activation of a defined housing area can be used to enhance or suppress local vibrational properties, particularly refraction, damping and absorption.

Further, the concept of activation as used herein also includes computational activation included in firmware or software code which isolates, alters or unweighs the output of one or more sensors relative to an impulse applied to a set of polygons or to an area portion of the active face.

The AP shape concept, (4,1), embraces all n-gons, i.e., any polygon having n sides (3<n<30). Area-filling polygons such as triangles, rectangles and hexagons are useful since the mathematical relationships are usually simpler. Of course, polygons of more than 8 sides may reasonably reflect circular or ellipsoidal input zones.

The AP edge length, (4,2), dictates how many distinct polygons can occupy the area of a particular impulse-transfer surface. Generally, the edge length also defines the distance between the area centroids of adjacent zones. For an array of same-size polygons, a larger distance between the centroids also influences the resolution or "ease of extraction" of the imputed impulse site from a particular impulse. FIG. 1G illustrates a housing exterior top surface mapped with a continuous array of area-filling square APs having edges of length (4,2).

Known analytic techniques are available to determine the AP centroids, (4,3), for activated n-gons. FIG. 1G illustrates the centroid spacing (4,3) between two adjacent 4-gons. The present invention encompasses patterns or clusters of adjacent polygons having related and distinctive shapes as well as predetermined centroid spacings, e.g., cruciform or flower-petal polygon-arrays of related inputs located in one or more sectors of the input surface.

Motion sensors. This concept includes methods and means used to sense displacement-rotation movements of the entire housing as well as acoustic phenomena resulting from local shell compressions/deflections caused by a deliberate user impulse upon a selected limited area of the surface. Generally, this means known, integrated-circuit accelerometers and gyroscopes, i.e., commercially available MEMS devices. However, experimental devices exhibiting unique characteristics, such as extreme angular sensitivity and resolution, may be used to practice various embodiments of the present invention.

Typically, the devices are 3-axis capable accelerometers with range and sensitivity suitable for the required configuration for "impulse-site discernment" as needed for the present invention. The particular sensor characteristics may be selected after consideration of housing dimensions and the proposed site relative the instantaneous axis of rotation and the angular velocity which results from a typical impulse to that or nearby locations. Indeed, the performance requirements for each sensor of an array may be individually fixed considering the size, number and layout of "activated polygons" in addition to the properties of the housing shell.

The general functional types of accelerometer motion sensors, MS, applicable to the present invention include different types of accelerometers, gyroscopes, velocity sensors, and displacement sensors. Typical MEMS accelerometers applicable for the present invention are shown in TABLE 1. Some specific types evaluated during developmental research and prototype testing are shown in TABLE 2. For special purposes and unique applications, other MS designs and commercial types/formats are also operable with the present invention.

Motion-sensing device specifics including: sensitive-axis count, size, detection threshold and output. Throughout this disclosure the three orthogonal axis associated with each MS origin are shown in the figures, and for each MS, at least one of the three axis is associated with an actively monitored channel. The present invention embraces variant sensor characteristics between particular positions for an application or array. Modern MEMS sensors are cost effective and are commonly available with three orthogonal sensitive axis but for a given device it is common that only one or two of the axis may have to be monitored for some of the sensor locations by the advanced algorithms disclosed herein to determine the parameters of the impulse input. To illustrate, locations near a dominant rotation axis of a hand-held version are typically provided with sensors having a low threshold and high output and the proper number of monitored sensing axis for the expected vibration.

As indicated in FIG. 1F, each sensor is positioned at particular coordinates relative to the origin of the housing coordinates and its axis orientations are defined by an individual coordinate system. This technique allows each sensor's axes to be individually aligned for optimal performance of the entire array.

Another advanced technique of the present invention is spacing-optimization of sensor pairs, i.e., setting their offset distances re a selected axis of housing rotation related to a particular impulse zone. In FIG. 1G, which shows a typical embodiment, the MS array layout is in the form of a rectangle relative to the display screen. The axes of rotation upon application of an impulse are highly dependent upon the way this exemplary housing is gripped by the user. For example, if the tablet is held by placing the fingers of one hand through the handle at the top, there would be reasonable freedom of rotation about both the rectangle axes as well as about the handle axis.

If one looks at the rigid body shape of a line moving or vibrating in a plane and in a direction perpendicular to the line, its shape can be accurately determined by two single-axis motion sensors. For a plane, or any rigid three-dimensional object, the number of measurement locations, the type of sensor, and the number of measurement channels are all inter-related. One measurement location would be sufficient if it contained a three axis translation sensor and a three axis gyroscope.

If only translational measurement is to be used for determining complete rigid body motion, i.e., only accelerometers, then the number of sensing channels is related to the number of measurement locations. There must be at least three measurement locations that are not co-axial.

If three measurement locations (the number of points that are required to uniquely define the location of a plane mathematically) are available, seven sensing channels will be needed if they are placed correctly. In fact, a minimum of seven sensing channels will be required regardless of the number of co-planar measurement locations as long as at least three locations that are not co-axial are used. Alternatively, if 4 measurement locations are used that are not co-planar, only 6 sensing channels will be required; for example, one tri-axial and three appropriately placed single-axis accelerometers.

If the shape to be characterized is large or cannot be considered rigid, flexure modes become important and additional motion sensors are required. The number of additional motion sensors will be determined by the particular shape being measured. This is determined by the inherent dynamic behavior of the object and vibrational test results from the object. Such test results include the use of Chladni diagrams as well as vibration or modal testing.

For analysis of rigid body modes of vibration it is best to locate translational sensors near the extremities of the device. This will magnify the difference in the physical data collected by the sensors and reduce the effect of measurement noise. For best detection of device flexural modes of vibration the translational sensors should be placed on or near the anti-nodes of the vibration. Anti-nodes are those points that experience the greatest amplitude of motion, while nodes are those points that experience no amplitude of vibration motion. Naturally, if rotational sensor are used in capturing bending nodes, it would be best to place them on the nodes of vibration as these points experience no translation but are the points of maximum angular motion.

Optimum sensor locations can easily be determined with modal testing methods for a particular device. The use of Chladni approaches to define the locations of nodes and anti-nodes can also be used to determine sensor configurations on or within the connected electronic device or external enclosure. These techniques can guide optimal positioning, optimal sensor axis orientation, and optimal signal weighting in the CVP algorithms.

The individual locations of the MS devices are defined by their individual origins as shown in FIGS. 1F and 1G. The spacing between these origins is given by (6,10) which is illustrated in FIG. 1G for two typical sensors.

Considering accelerometer-sensed vibration effects resulting from an impulse applied to the device shown in FIG. 1G, the spacing between the impulse origin and the location-origins of the closest MS device is illustrated by the distance (6,11). As illustrated in FIG. 1F, these two locations are at a distance 6,12 (1,5 to (107,A1)) and (1,5 to (107,A2)) respectively from the transfer site 1,5 and both provide output signals relative to vibrational modes excited by the particular impulse. As indicated in TABLE 3, the vector separation distance typically ranges from 5 mm to values as large as several meters; however, longer distances may be involved in certain embodiments.

The present invention is also able to implement electronic optimization of extraction methodology for an array via dynamic activation adjustments, i.e., on-the-fly selection of the most-trustworthy output signals.

One sensor configuration is comprised of four 3-axis linear MEMS (or NEMS) accelerometers located at the extremities of an enabled device. Depending on which surfaces of the device are intended to be "Virtual Button,™" enabled, only one or two of the three axis may be monitored to collect generated signals. When structural obstruction(s) are present in said desired sensor location(s), the nearest convenient location(s) is preferred. In situations where a "mission critical" impulse input location (i.e., an E-Stop or safety or potentially life-saving functions), an additional 3-axis linear MEMS (or NEMS) accelerometer is preferred at each "mission critical" location MEMS (or NEMS) gyroscopes (angular acceleration measuring sensors) can be used in replacement of said linear accelerometers. In areas of the housing where impulses result in predominantly translational acceleration, a "dead zone" may occur. For a "thin-brick" hand-held embodiment, a zone with limited or "nil" angular acceleration can be a consequence of user factors, i.e., the particular grip points and the momentary clasping intensity. One method of eliminating "dead zones" is to replace one gyroscope with one accelerometer in the same location; alternatively an additional accelerometer is placed in the dead zone. Any combination of accelerometers and gyroscopes in the critical locations may also be used.

In many embodiments, many of the axes of rotation pass through a portion of the enclosure or housing; in such cases the optimal motion sensor devices are chosen for each array position considering this factor. However, hand-held embodiments are occasionally subject to oblique vector impulses or other intense inputs which cause the device rotate about an axis offset from the principal edges of the input surface or the edges of its housing, i.e., the movement axis of the user's hand, wrist or elbow. Similarly, embodiments involving an impulse surface which is permanently mounted to a piece of equipment or forms a portion of a stationary wall surface, e.g., an image projected upon a panel screen or a wall, may also be subject to rotational motions around an axis outside the activated input area. In such cases, special care is exercised in optimal selection, positioning and mounting of motion sensors for each specific array position. The design alternatives in these situations include multiple individual types of known motion sensors including gyros, accelerometers or other devices capable of measuring displacement, as well as combinations thereof.

The technology and underlying techniques of the present invention work on any surface or device of any shape. Although most depictions of an enabled device shows a flat rectangular device, the sensors can be placed anywhere on any device of any shape or size.

The layout pattern of motion sensors is indicated by the indicia 6,9. As shown in Table 3, the patterns are: discrete, partial-continuous and continuous. Discrete, as used for MS layout, means that the position and axis orientation of each sensor is individually optimized for the particular shell design and use application. The concept of discrete also includes the provision that certain locations may require unique sensors with special characteristics and/or output parameters. Partial-continuous means that some sensors are placed and oriented according to special positions on mapping elements which substantially fill that selected area (triangles, quadrilaterals, hexagons, etc) and others are individually optimized in rows, columns or discrete positions for the specific situation. Continuous means that, over a selected field for impulse application, the sensors having selected characteristics are placed at certain points of the mapping elements and the sensitive axes oriented according to a specific rule for the array.

Analysis. Output parameter extraction as used herein refers to the process of extracting, from one or more recorded electrical signals, parameters characteristic of the vector-impact signals that produced said electrical signals. A weighted, ordered combination of such signal parameters is referred to as the Composite Vibrational Profile (CVP). The analysis includes the comparison of the CVPs with input localization algorithms.

Impulse Localization. There are many ways to achieve a successful localization routine to infer the location of an input impulse. Different methods yield different results with regards to reliability, repeatability, robustness, and resolution. Computational cost also varies according to the complexity of each algorithm. Known algorithms may be combined sequentially or in parallel or a series-parallel combination to achieve better results.

K Nearest Neighbour (kNN). In the nearest-neighbour algorithm the parameters of an input signal that need to be classified are compared to a set of labeled parameter data. The input signal is classified as belonging to the same class as the closest data point. KNN is a modification to the nearest neighbour algorithm that removes the first k closest data points from each class to remove outliers.

kNN is a non-parametric pattern classification method based on the following rule: given a reading (CVP) x.bar and a distance metric f(x), a reading is said to belong to a class i if f(x.sub.i) is less then all f(x.sub.j) for all j, where x.sub.n is defined as the stored data point (CVP) in class n that produces the k-th smallest value for f(x.sub.n).

Modal Assurance Criteria (MAC)/Operating Deflection Shape (ODS). Modal testing measures the response at a variety of locations due to a (measured) impulse force. Frequency response functions (FRFs) are then collected from the measurements and processed to the modal domain. The modal domain information can be obtained from the FRFs or from the time domain equivalent information using standard curve-fitting techniques such as the complex exponential or polyreference algorithms. When comparing shapes, MAC gives a number of between 0 and 1 where 0 is no similarity between shapes and 1 is perfect similarity. For this application, in order for the software to identify distinct and non-overlapping inputs, it would be necessary to specify that an impulse, i.e., an input deflection shape, corresponds to a single stored shape with a MAC number greater than 0.9 for example, and less than 0.65 for all other stored shapes. If the input deflection shape matches a shape with a MAC number between 0.65 and 0.9, the impulse is rejected. If the input deflection shape matches two shapes with MAC numbers above 0.65, the impulse is also rejected. Advanced simpler-faster ODS and MAC algorithms that do not require FRFs or any frequency analysis have been developed for alternative embodiments of the present invention in which a simple "shape" or "mode" is captured in the CVP and then analyzed.

Kohonen Self Organizing Map (KSOM). A KSOM is ideally suited for data-clustering applications such as pattern recognition, speech recognition, vector coding, and texture segmentation. One of the defining characteristics of this type of neural network is its unsupervised customization paradigm, i.e., output elements distribute themselves such that they each represent a cluster of closely-related Composite Vibration Profiles (CVP).

Bayesian Classification and Output Determination. Once regular algorithms have completed, a weighted decision-making process is initiated to determine the most likely impulse location for a given user input. The Bayes-inference approach of the present invention uses a temporary store of immediate prior evidence/solutions for recent inputs by a particular user for a selected command or impulse site. In this way, a user's instantaneous impulse history is used to discriminate between alternative solutions for the latest impulse site.

Acceleration data buffer (ADB). Measured acceleration history data buffer as used herein is a temporary store of ongoing instantaneous data being provided from all channels of each sensor of the current group. The data in this buffer is acceleration in a preferred embodiment, but may be other types motion data. This data is used to deduce the source polygon for each new impulse by comparing it with data previously recorded from "standard configuration impulses".

Composite Vibration Profile (CVP). A vector including selected attributes descriptive of the acceleration history of the sensor array. From the normalized acceleration history, waveform characteristics such as peaks, valleys or absolute extrema are calculated. Other calculable properties depict acceleration history data during representative time slices. Such features also indicate the outputs associated with the sensor array at specified times. Time slices of interest may include the times associated with acceleration data buffer extrema or the first instance in which a particular threshold is exceeded in an acceleration data buffer. Primary CVP characteristics in the frequency domain include the dominant and peak frequencies. Additionally, characteristics may be determined from transformations of the acceleration data buffer. For example, the Fast Fourier Transform may be applied to the acceleration data.

Composite Vibration Profile Comparison Library (L). A condensed form of the CVP database (DB) that is used for dynamic comparison of live data during operation. Since the DB may be very large, in many cases it will be impractical to do direct comparison between the CVP calculated from live data and all entries in the CVP database. One simple example of database to library reduction would be to replace all the records associated with an impulse location with the a single record in which the CVP field consists of a vector that is the mean of all the CVPs in the DB associated with that impulse location.

The complete comparison process, which includes: (a) filtering and conditioning to remove noise and interfering signals, (b) threshold testing, (c) vibration profile characterization, (d) input site determination and finally (e) impulse focus and intensity characterization. For example, a filter (112) removes undesirable or spurious information not representative of an impact vector at a predetermined impulse location; such sensor or environmental background noise are typical components which are filtered out.

Class. Collection of items that can be unambiguously defined by properties that all members share. All CVPs that share the same properties such as input site, impacting apparatus, etc. belong to the same class.

Configuration phase. The first of two phases required for "Virtual Button,™" usage in which the user is instructed to interact with a device via a user interface. Data is collected for the purpose of building a library that future operation phase CVPs may be compared to.

Operation phase. The second of two phases required for "Virtual Button,™" usage in which operation software determines the properties of an input impulse vector by comparing the acquired signals to those stored in the CVPL.

Transfer surface space. Coordinates in the transfer surface space represent the points on a device that may be impacted by an impulsing apparatus during normal operation.

Composite Vibration Profile Space. The coordinate space that CVPs exist in. This space has as many dimensions as the CVP has parameters. For example, using a time slice method with 6 sensor channels produces a CVP that has 6 parameters and thus exists in a 6-D CVP feature space.

Match. A metric indicating the similarity between two CVPs. Larger match values for a pair of CVPs signify a closer relation between two signals. Equivalent CVPs produce a match value of 1.0. More dissimilar signals result in smaller or negative match values Match Vector. Vector composed of the match value and a transfer surface coordinate at which the vector acts.

Operation CVP ($CVP_O$). CVP calculated in the operation phase that is used for pattern classification.

Reference CVP ($CVP_R$). CVP calculated in the configuration phase that is stored in the CVP database as reference signals.

Multimodal. A data distribution with two or more local maxima.

Unimodal. A data distribution with a single local maxima.

Orthogonal coordinate systems. Because the vector calculations of the present invention require explicit spatial coordinates, the following conventions are used: chosen housing edge(s) or selected principal direction(s) are defined as being oriented along the basis vectors of a global Cartesian coordinate system; the impulse vector orientation is defined in spherical coordinates with respect to the similar coordinates of the housing according to the physics conventions of ISO; and unless explicitly stated otherwise, the sensitive x, y, z axes of all accelerometers are oriented parallel to the defined coordinates of the housing.

Perceivable feedback. As used here this phrase means an indication of the status of the system or its active processes which is easily discernible by typical human perception. Such feedbacks may be sensed by a variety of human faculties including: sight, hearing, taste, touch, balance-acceleration, temperature, pain, etc., For example, an audio speaker (106) can provide confirmation to the user of a prior impulse command.

Vector-impulse. This terminology includes unitary or multiple simultaneous or sequential impulses or inputs applied by the user to an activated zone of the housing or to another predetermined input location. Such actions are sufficient in orientation, placement and intensity to convey the user's inputs, i.e., to provide a command impulse or a required data value argument into the apparatus or system whereby its activity is reliably controlled.

Impulse vector, IV, tip properties. In most cases user impulses will be applied to the active surfaces by the soft tissue of the fingertip or the hard tissue (keratin/chitin) of the fingernail. For modeling of the tissues of the finger tip, the following approximate properties are assumed:

|  | Nail | Epidermis | Dermis | Subcutaneous | Bone |
|---|---|---|---|---|---|
| Elastic modulus, MPa | 170 | 0.136 | 0.08 | 0.034 | 17000 |
| Poisson ratio | 0.3 | 0.48 | 0.48 | 0.48 | 0.3 |
| Thickness, mm | 0.2 | 0.2 | 1.0 |  | 4.0 |

Measurements of the compressive stress level under typical fingertip impulse contacts is estimated to fall in the range of 0.020-0.030 MPa for soft-tissue compressions of about 2 mm. Under these conditions, the fingertip tissue-contact area is approximately circular and about 6-10 mm diameter.

For modeling the hard tissue of the fingernail, the following properties were assumed: 20< tensile strength, MPa<60; 0.3< elastic modulus, GPa<1.5. These properties are dependent upon age, skin moisture, the degree of cysteine-related crystallinity and the fine structure of the scales.

Impulse vector spherical coordinates (ISO31-11 conventions). As illustrated in FIG. 1F, the use of spherical coordinates allows compact expression of vector direction relative to any housing surface adapted to receive a user impulse, i.e., front, back, side-end edges, etc.

IV zenith angle, theta ($\theta$), 0< range, radians <$2\pi$. This is the angle between the impulse vector and the defined positive z-axis. Typical zenith angles for the present invention fall in the range of about 0 to 30 dig.

IV azimuth angle, phi ($\phi$) 0< range, radians <$\pi$. This is the angle between the projection of the impulse vector into the x-y plane and the defined positive x-axis.

IV impulse force. Basically the impulse must be a force sufficient to cause a momentary movement (displacement-deflection and/or rotation) of the input surface. Both effects are sensitive to the way the surface is mounted-supported. For a hand-held, polymer thin-shell surface, and usual light contact with the user's skin, a typical fingertip-impact force in the range 0.1< value, N<5 is sufficient to produce sensor outputs for reliable extraction of the contact point.

IV impulse duration. From known characteristics of finger articulation kinetics, a typical fingertip impulse duration is in the range 1< time, milliseconds <5. This time is shorter for a stylus or hard fingernail tissue and longer for compressible soft tissue of the distal phalange. Intentional impulse-force dwell, for duration longer than about 5 millisecond, to achieve a perceptible deflection of the shell surface region around the contact point is also anticipated in the design of the present impulse-site extraction system.

IV stress and torque patterns. The configuration and extraction techniques of the present invention anticipate the effects of strong, angularly-oriented impulses, i.e., (a) unique rigid body vibration characteristics, (b) possible complex stress patterns being developed in the shell contact zone and (c) possible anomalous torsion upon and within the housing shell.

Signal conditioning. Signal conditioning as used herein includes all known processes such as filtering of analog or digital components to exclude noise, amplification or normalization of the data and conversion into digital values for the purpose of further processing.

To ensure reliable and repeatable results, all raw time-history signals acquired during the triggering phase must be conditioned to eliminate undesirable signal components. Pre-processing involves manipulating raw time-history via standard known signal conditioning techniques. Most importantly, all undesirable low and high frequency noise and disturbance components are removed with a carefully tuned band-pass filter. The typical filter is a 3rd order Butterworth filter, digital or analog. The signals are then normalized to eliminate variations in signal scaling due to user variability. Other signal conditioning operations include amplification, decimation, interpolation, phase-shifting, and modulation.

Sampling. Sampling as used herein includes capturing a sequence of discrete output voltages from one or more particular sensors/components within a predetermined post impulse time window upon triggering.

Triggering. As used herein, triggering includes making a determination of whether an apparent sensed impulse is a deliberate user input and the instant at which the input occurred. Triggering is also based upon whether the sensed intensity reflects an acceleration exceeding a predetermined threshold.

Extraneous movements and external influences. Spurious or environmental influences as used herein includes interference that degrades the quality of an electrical signal including: sensor noise, thermal effects and electromagnetic interference. Environmental influences also include any motions not characteristic of an intentional vector-impact, e.g., rigid-body motion due to device repositioning, earth temblors, vibrations-oscillations of the user-platform, intense airborne acoustic signals, shock waves, wind velocity above about 90 km/hr, and body tremors/limb trembling of the user.

The present invention includes features which anticipate known, normal hand-arm tremors and jerk reactions as they relate to hand-held embodiments: $7<$frequency, Hz $<30$; $10<$amplitude, micrometer $<50$; and $0.1<$acceleration, $m*s^{-2}<0.15$.

While the configuration phase provides basic compensation for routine external damping factors i.e., hand grip placement and force, the computational algorithms of the present invention also provide feedback indications which signal excessive damping due to effects of environmental changes such as temperature and humidity upon properties of the input surfaces. The halves of a clamshell housing, for example, may suffer gradual warpage and inordinate gaps in addition to shrinkage of adhesives, sealants and gaskets. All such situations can lead to excessive and unexpected damping.

The feedback parameters also allow inference of the non-dimensional absorption factor, alpha, of materials which contact the impulse surfaces. Further, the feedback values are helpful to optimize the thickness and particular acoustic properties of the contact members. Finally, the extraction system of the present invention is capable of identifying completely unsatisfactory external damping conditions and signaling the user by triggering the alarm mode and shutting down, if acceptable conditions are not restored within a predetermined time period.

Logic. A logic component connected to the vibration-detection component as used herein includes any logic component, including microprocessors, that take as an input an electrical signal indicative of the motion of one or more vibration-detection components or other relevant signal information. Logic components include: analog to digital converter (114), a central processing unit (CPU) (115), and memory (116). These elements receive input from sensors (107), run impulse-localization software (310) and deliver output signals to peripherals, e.g., a display screen (105) and/or audio speaker (106). For many embodiments, the processor is located literally adjacent the sensor array, i.e., within 0-50 mm for design and manufacturing-economy reasons. However, an embodiment of present invention may employ multiple processors connected by a wire or wireless network as well as remote, network-connected processors.

Time Slice. A discrete interval of time, having its beginning and end moments marked out by a selected processor clock, in the streams of signals flowing from the motion sensors.

Screen Display. An output device that displays text and graphic information including prompts for impulse commands. Another purpose is to provide visual feedback to user.

Acceleration. A preferred embodiment uses the signals from acceleration motion sensors, such as accelerometers, but embodiments of the present invention can just as easily use other motion sensors that measure velocity, displacement, jerk, or aspects related to motion. As used herein, acceleration can refer to any of these phenomena, but preferentially acceleration.

BRIEF DESCRIPTION OF DRAWINGS

FIG. 1A An isometric view of a hand-held device outfitted to sense the location of a impulse.

FIG. 1B A cut-away isometric view showing main internal components of a hand-held device outfitted to sense the impulse site.

FIG. 1C A schematic functional block diagram of device adapted to sense the location of an impulse.

FIG. 1D A schematic view of a fingertip impulse being applied from the top left corner of the front face.

FIG. 1E A schematic view of a fingertip impulse being applied from the left-side or left-long-edge aspect.

FIG. 4E An exemplary sensor-output trace resulting from a specific fingertip impulse.

FIG. 4F An exemplary sensor-output trace resulting from a specific stylus impulse.

FIG. 8A. Perspective front view of an LCD monitor with factory-installed protective ICS screen.

FIG. 8B. Perspective rear view of monitor shown in FIG. E3a. This view shows schematic locations of 4 illustrative MS devices; individual devices are selected from TABLE 2 according to the particular application and monitor dimensions.

FIG. 8C. Isometric view of LCD monitor and removable ICS screen (810). Note the compliant mounts which support the screen inside the frame and the illustrative array of 4 motion sensors fixed on the edges of the transparent glass screen.

MODES FOR CARRYING OUT THE INVENTION AND INDUSTRIAL APPLICABILITY

Figure 1F:
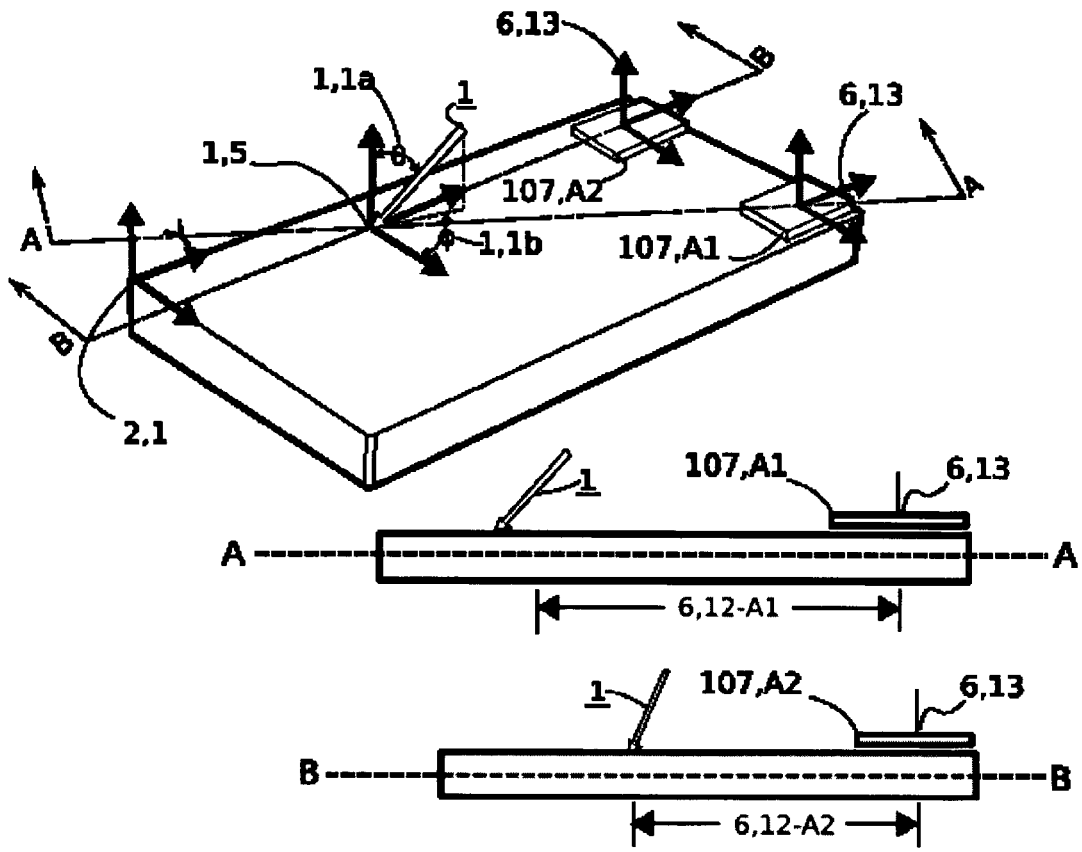
FIG. 1F A schematic view showing relationships between coordinate origins of the housing, the impulse and two illustrative motion sensors.

The first hand-held embodiment below sets forth the best mode for carrying out the invention. The remaining examples (example 1 through example 8) set forth other modes. The hand-held embodiment and examples 1 through 8 also show industrial applicability.

BEST MODE FOR CARRYING OUT THE INVENTION

Hand-Held Embodiment

FIGS. 1A to 1E show a typical hand-held embodiment in the "thin-brick" format, the method of impulse application, the internal components and the motion sensors.

FIG. 1A: A schematic perspective view of a hand-held device (101) outfitted to sense the location of an impulse on said device. The elements are:

(101). A hand-held device such as a cell phone, remote control, etc.

(102). Casing: materials such as metal, plastic, glass, ceramic or other sufficiently stiff material (103). Mechanical Push Button (104). Decals: indicate and delimit possible impulse locations (105). Screen: output device that may display impulse locations (prompts), give visual feedback to user (106). Speaker: output device providing audio feedback to user indicating an appropriate impulse FIG. 1B: A see-through schematic perspective view of a hand-held device (1) outfitted to sense the location of an impulse on said device indicating the electrical components. The elements are:

(107). Sensor: possibly an accelerometer, single or multiple axis transducer that produces electrical signals that are indicative of motion such as displacement, velocity or acceleration (6,13). Sensor Axis or Axes Orthogonal axis (X,Y,Z) associated with each sensor.

(1). Input Impulse Vector: A representation of the impact from an apparatus onto a device. Such a vector may parameterize or describe the location, orientation, intensity and apparatus associated with a particular impact.

(110). Connectors: may be conductive wire or a wireless transceiver-receiver RF pair (111). Micro-controller: an electrical device consisting of an analog to digital converter (114) a central processing unit (CPU) (115) and memory (116). Receives input from sensors (107), runs impulse localization software and outputs signals to output peripherals such as (105) and (106).

FIG. 1C: An electrical schematic diagram of device (101). The elements are:

(112). Filter: remove undesirable information not indicative of an impact vector at a predetermined impulse location such as sensor or environmental background noise.

(113). Amplifier: increase the voltage output from the filtered sensor data (114). Analog to Digital Converter: digitize a continuous analog voltage to a discrete digitized signal sufficient for digital processing for the CPU (115). Central Processing Unit: Logical device that carries out computer instructions (116). Memory: Used for computer data storage. Includes RAM (Random Access Memory) as wells as ROM (Read Only Memory). ROM is used to store software instructions and data important for software running. RAM is used for the temporary storage and manipulation of data.

Figure 2:
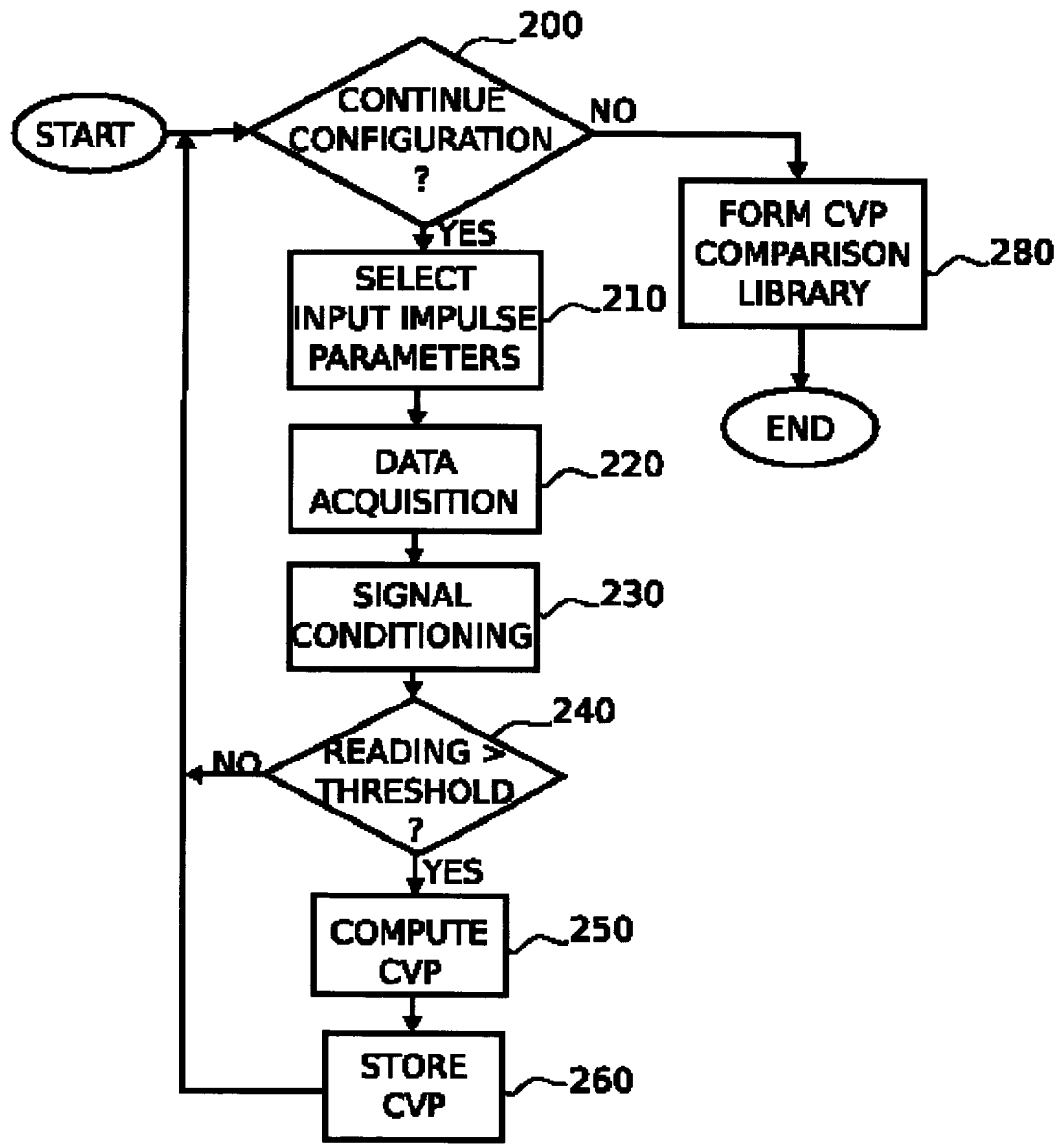
FIG. 2 A software block diagram depicting an exemplary method of configuration device adapted to sense the location of a impulse.

FIG. 2: A software flow diagram for a method of configuring device (101) for later impulse parameter recognition. A user interface and software may be required when providing configuration signals that may be attributed/correlated to various impulse locations/zones. Initially, the user configures an impulse-conditioned device of the present invention for his particular style of support (hand-grip and finger or stylus applications) and personal command patterns; these steps are indicated in FIG. 2.

Step (200). Continue configuring: the user may cease the configuring routine by using an input device such as a button, impulse recognized button, or mouse at any time.

Step (210). Select input impulse parameters: with an input device the user indicates parameters associated with the current input impulse; parameters may include: input location and input apparatus Step (220). Data acquisition: sensor data from one or more sensor channels are read by micro-controller 111.

Step (230). Signal conditioning: data is filtered. Such filtering is intended to remove sensor or background noise or other signals that are not indicative of an impulse action at a specific location. Removing low frequency components removes "global device movements" such as those that occur during relatively low frequency actions such as moving the device from a person's pocket to said person's ear.

Step (240). Sensor reading threshold comparison: in which a conditioned reading or readings gathered resulting from (230) are compared to a specified threshold value or values. This comparison (240) is indicative of whether or not a user impulse impact has occurred. If these values are exceeded, then further operations (250)-(260) are carried out, otherwise return to the start of the algorithm.

Figure 4A:
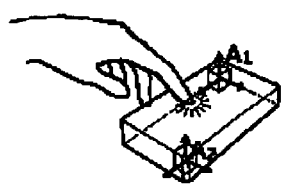
FIG. 4A A graph showing CVP calculation using time-slice information.
Figure 4A:
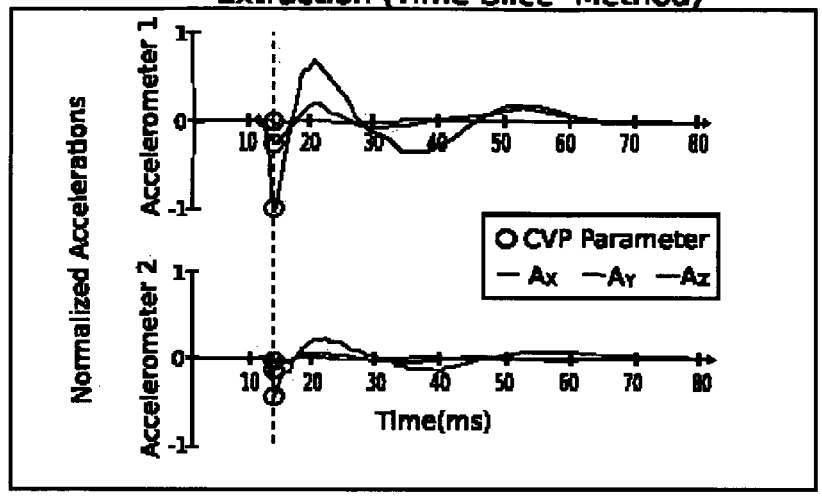
Figure 4B:
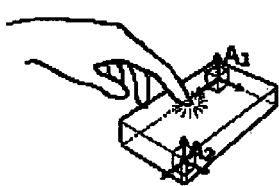
FIG. 4B A graph showing CVP calculation using channel maximum and minimum information.
Figure 4B:
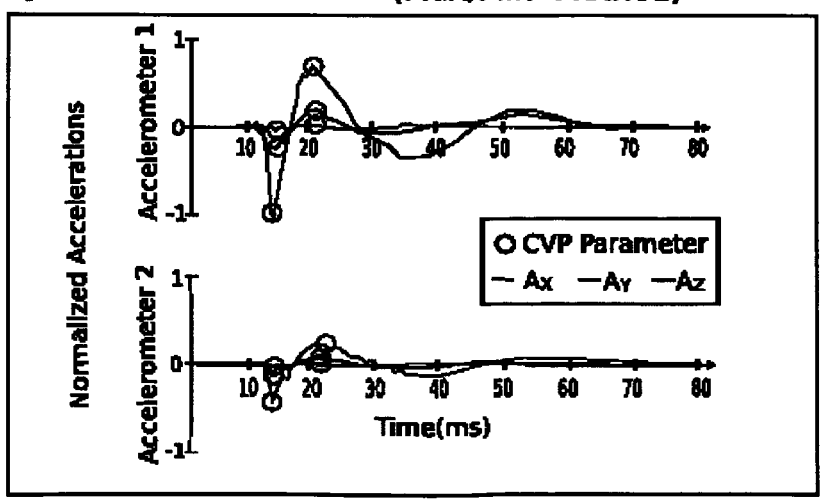

Step (250). Compute Composite Vibration Profile The first step in the computation of the composite vibration profile is to retrieve the ADB. Examples of how the CVP can be calculated are illustrated in the descriptions of FIG. 4A and FIG. 4B.

The ADB is a matrix representing all the conditioned and filtered sensor readings from time $t_N$ to time $t_M$ noting that:

$t_o$: time that the comparison (240) occurs $t_i$: the ith sampling period from comparison (240)

N−1: number of pre-samples in acceleration data buffer

M: number of post-samples in the acceleration data buffer

N+M: total number of samples in the acceleration data buffer

The normalized acceleration data buffer, ADB, is derived by dividing every element in the acceleration data buffer by it's largest absolute value. All values in the ADB are between −1 and 1.

Each acceleration data buffer encodes information about the motion of the device corresponding to an impact. The goal of this input impulse localization algorithm is to compare two (or more) such instances. For example we may like to compare one (or more) impacts from configuration compared to an impulse just initiated by the user.

Theoretically we can compare one entire data buffer to another directly. In practice this may not be feasible due to memory requirements and variability from one ADB to the next. Therefore, to reduce the memory and computational requirements and to address problems with acceleration buffer variability each buffer is reduced to a few characteristic parameters ($P_1, P_2 \ldots P_c$). A weighted, ordered, set of these parameters forms the Composite Vibration Profile (CVP).

If the CVP is formed from configuration data then it is denoted mathematically throughout as $V\_i,j$ where i is a non-negative integer representing the class (input site) associated with the impulse and j representing a unique identifier for each CVP within a class. For example the CVP for the fourth recorded impulse associated with the third input location would be $V\_3,4$.

The CVP may be any signal derived from the array time domain data from (250) or from a derivative of said array such as one based on a Fast Fourier transformed version of the data.

In one embodiment the CVP is a vector formed from the maximum and minimum value from each channel in the acceleration data buffer. [see FIG. 4A] In this example with two three axis accelerometers, and therefore six channels in total there would be twelve total parameter and V would be defined as:

$$\vec{V} = [P_1, P_2 \ldots P_{12}]$$

Where:
$P_1$: max value of channel 1 of acceleration data buffer
$P_2$: min value of channel 1 of acceleration data buffer
$P_3$: max value of channel 2 of acceleration data buffer
$P_4$: min value of channel 2 of acceleration data buffer
. . . .
$P_{11}$: max value of channel 6 of acceleration data buffer
$P_{12}$: min value of channel 6 of acceleration data buffer In yet another embodiment the CVP is formed from the readings in the ADB at a specified time slice. For example the time slice may be the time of the channel maximum peak in the ADB. [SEE FIG. 4B] In this example, with two three axis accelerometers:

$$\vec{V} = [P_1, P_2, \ldots P_6]$$

Where:
n: time slice index corresponding to first maximum peak on any channel in the acceleration data buffer
$P_1$: acceleration data buffer reading for channel 1 at time n
$P_2$: acceleration data buffer reading for channel 2 at time n
. . . .
$P_6$: acceleration data buffer reading for channel 6 at time n Step (260). Store CVP: this data is stored in a database according to the impulse location specified in (210). Said database may be created from the accumulation of a single or several configuration locations and may include data that has been included theoretically and not as the result of the configuration routine specified in FIG. 2.

Step (280). From the CVP database a CVP Comparison Library is formed. The CVP Comparison Library may be much smaller than the CVP database thus requiring less memory. In one embodiment, the CVP database is reduced by combining the data from each impulse location into one CVP based on the mean value of all the CVPs for a given input location. In another embodiment, the CVP database is exactly the same as the CVP Comparison Library.

Figure 3:
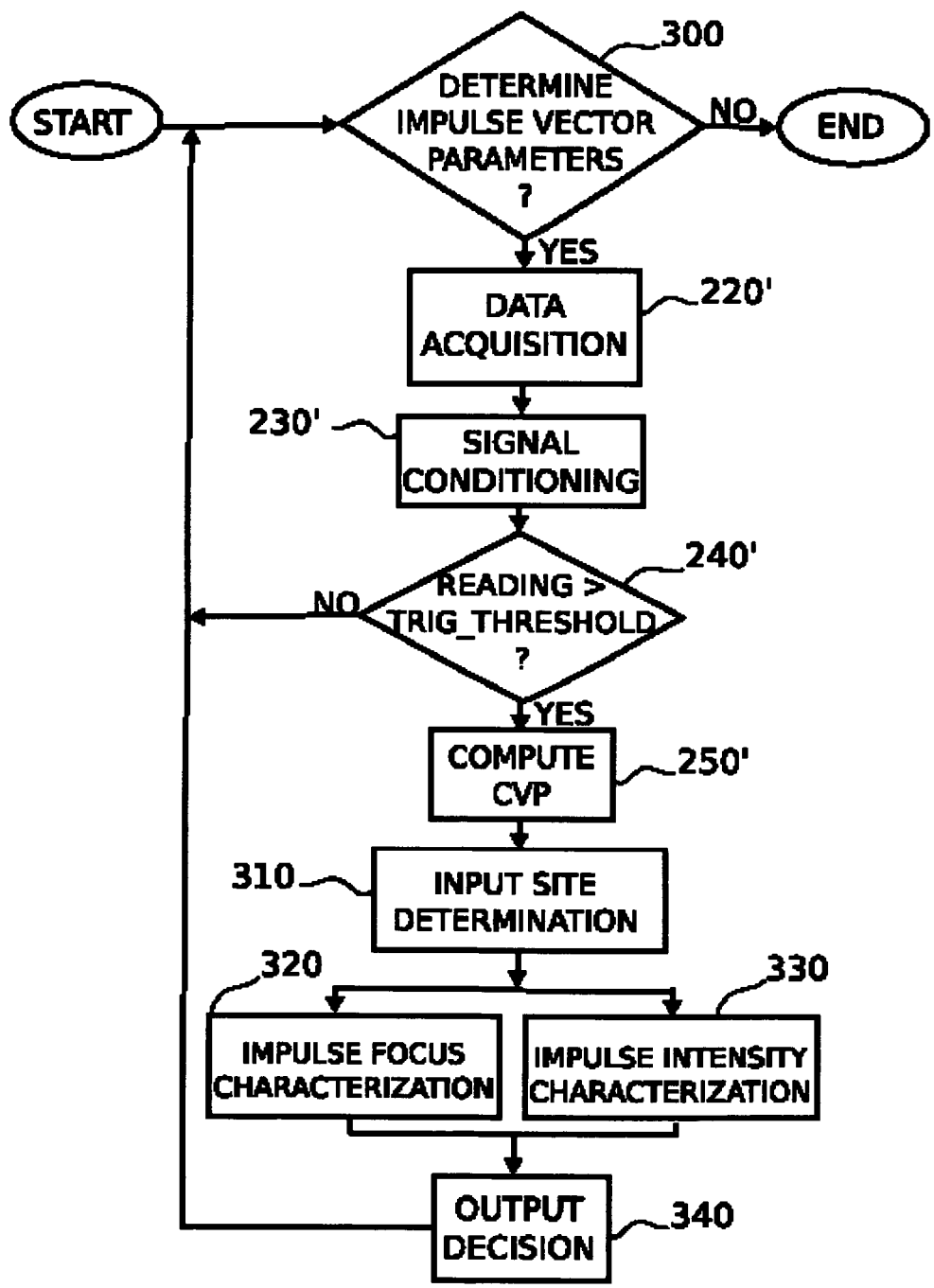
FIG. 3 A logic block diagram depicting the stages of determination of the parameters of an applied impact.

One method to reduce the data set is to:
Create a data set that includes all possible data points in the feature space in question
Calculate the decision boundary based on kNN algorithms using the data set created in Step 1
Remove the first configuration CVP from CVP library and determine the corresponding decision boundary
If the decision boundaries produced from steps 2 to 3 are different then the CVP in question is added to the CVP comparison library
Repeat steps 2-4 for all points in the CVP library FIG. 3: A method for determining the location of an applied impact on device 101.

Step (300). At any time, the Impulse Localization software can decide to end software operation. This can occur when the user specifies through input devices or before the device is turned off.

Steps (220')-(250'): Similar steps as (220)-(250) respectively—except now instead of acquiring configuration data the hardware is acquiring data that will be used to estimate the impacted input location. Ideally, (220)-(250) would have exactly the same settings as (220')-(250') so that configuration and operating conditions are as similar as possible.

Step (310). Input site determination: the impacted impulse location is estimated based on the input acceleration data buffer. [Further described in FIG. 5: Input Site Determination]

Step (320). Impulse Focus Characterization: Determine what instrument and/or how the device was impacted. For example, a stylus, a finger nail or a finger tip will all cause differences in the acquired signal. A pointed impulse produces a signal that has many characteristics similar to "broad" impulse however the data is temporally transformed (stretched or narrowed) in the time domain.

In one embodiment the impulse type is determined by measuring the time elapsed between two characteristic time slices. The time between these two time slices is indicative of the impulse type. If two impulse types are differentiated then a single threshold exists between the two impulse types. Such thresholds can be determined experimentally or can be taken into account in (210) during configuration. This is further described in FIGS. 4E and 4F. Impulse Focus Characterization.

Step (330). Input Intensity Characterization: output a signal that is indicative of the force at which the user impulses the device at an activated region. In one embodiment the intensity is simply the maximum absolute value of the input ADB.

Step (340). Output decision: output an electrical signal to the device software to perform an action. Such actions may include the actuation of the output device or changing the software operation of the device.

FIG. 4A: A graph showing CVP Calculation using time slice information. This graph shows the ADB produced after (240) in which the trigger threshold is surpassed. In the example shown 25 pre-samples and 175 post-samples have been taken. The earliest peak value surpassing a set threshold is calculated and identified by the dashed vertical line. Six accelerometer readings have been shown, three channels each (X, Y and Z) from two sensors. The readings from each channel are combined to form a vector called the Composite Vibration Profile (CVP).

FIG. 4B: A graph showing CVP Calculation using channel maximum and minimum information. This graph shows the ADB produced after (240) in which the trigger threshold is surpassed. The CVP in this example is calculated by combining the maximum and minimum values for each channel in the ADB. Note that a CVP can be constructed from any derivative of the ADB such as the Fast Fourier Transform of the data or from any combination of readings from said ADB.

Figure 4C:
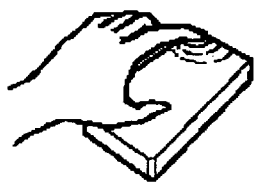
FIG. 4C A graph showing an acceleration data buffer composite vibration profile (CVP) calculation using time slice information for an impulse input at top left corner [front face].
Figure 4C:
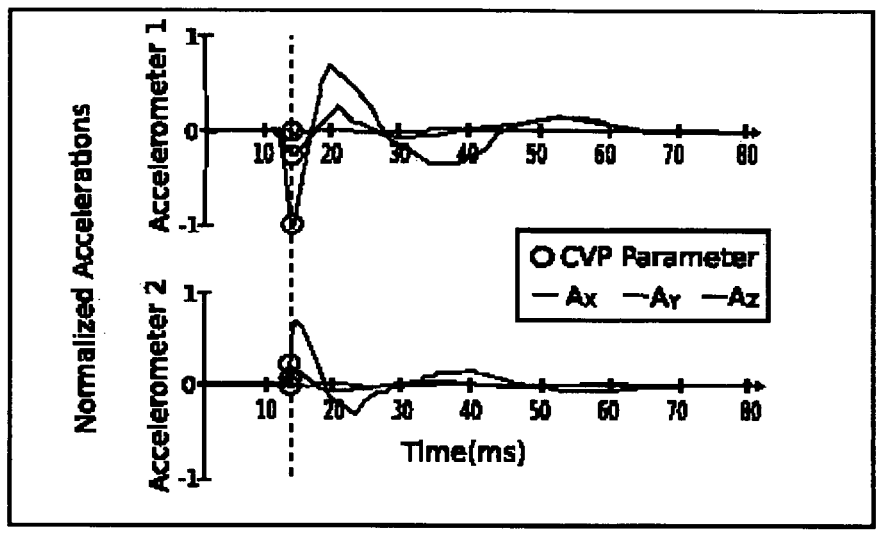

FIG. 4C: A graph showing CVP Calculation for a representative impulse on the top left corner of the front face device. This graph shows the ADB produced after (240) in which the trigger threshold is surpassed. The CVP in this example is calculated by the time slice method for a representative impulse on the top left corner of the front face of the connected electronic device, (101).

Figure 4D:
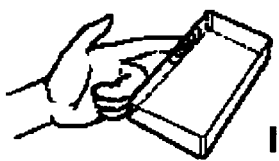
FIG. 4D: A graph showing an acceleration data buffer composite vibration profile (CVP) calculation using time slice information for an impulse input at top left corner [left face]
Figure 4D:
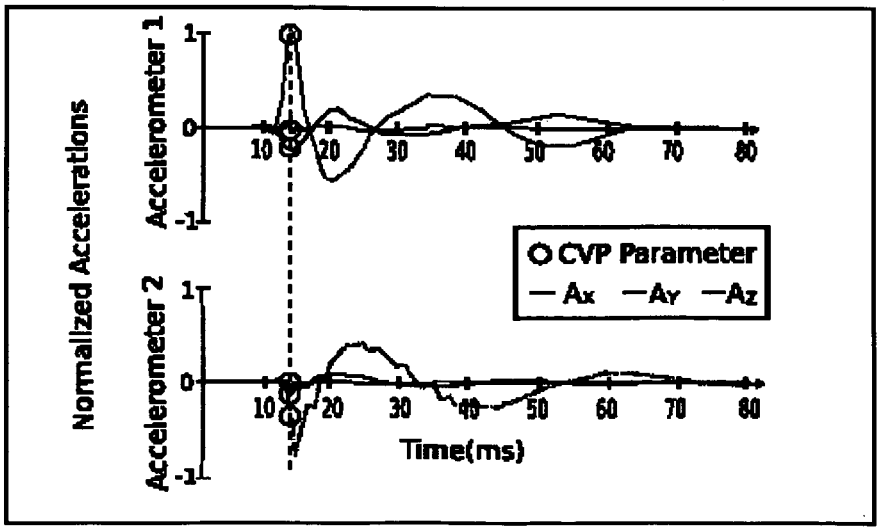

FIG. 4D: A graph showing CVP Calculation for a representative impulse on the top left corner of the left face of the device. This graph shows the ADB produced after (240) in which the trigger threshold is surpassed. The CVP in this example is calculated by the time slice method for a representative impulse on the top left corner of the left face of the connected electronic device, (101).

FIG. 4E and FIG. 4F illustrate impulse type determination, starting with the data buffer. In the impulse type determination method represented in FIG. 4E and FIG. 4F, several key time-domain features are calculated including t1, t2 and t3. These parameters are calculated by locating the first time in which the threshold T is surpassed. The period from the time that minus T (−T) is crossed to the time that plus T is surpassed is designated as t1. The period t2 is calculated in a similar way by measuring the period from when plus T is first surpassed to the next time that (−T) is surpassed. This procedure is repeated throughout the data buffer.

FIG. 4E and FIG. 4F show device 101 being impacted by hand and through the use of a stylus. By measuring the size of features t1, t2 and t3 and correlating the measurements with an impulse type during configuration, the input impulse type can be determined during live operation. For example, the extraction algorithm can be adapted to reckon the most-probable impulse type, i.e. if the impulse exceeds the threshold for finger-type impulses, the source is imputed to be "stylus".

Figure 5:
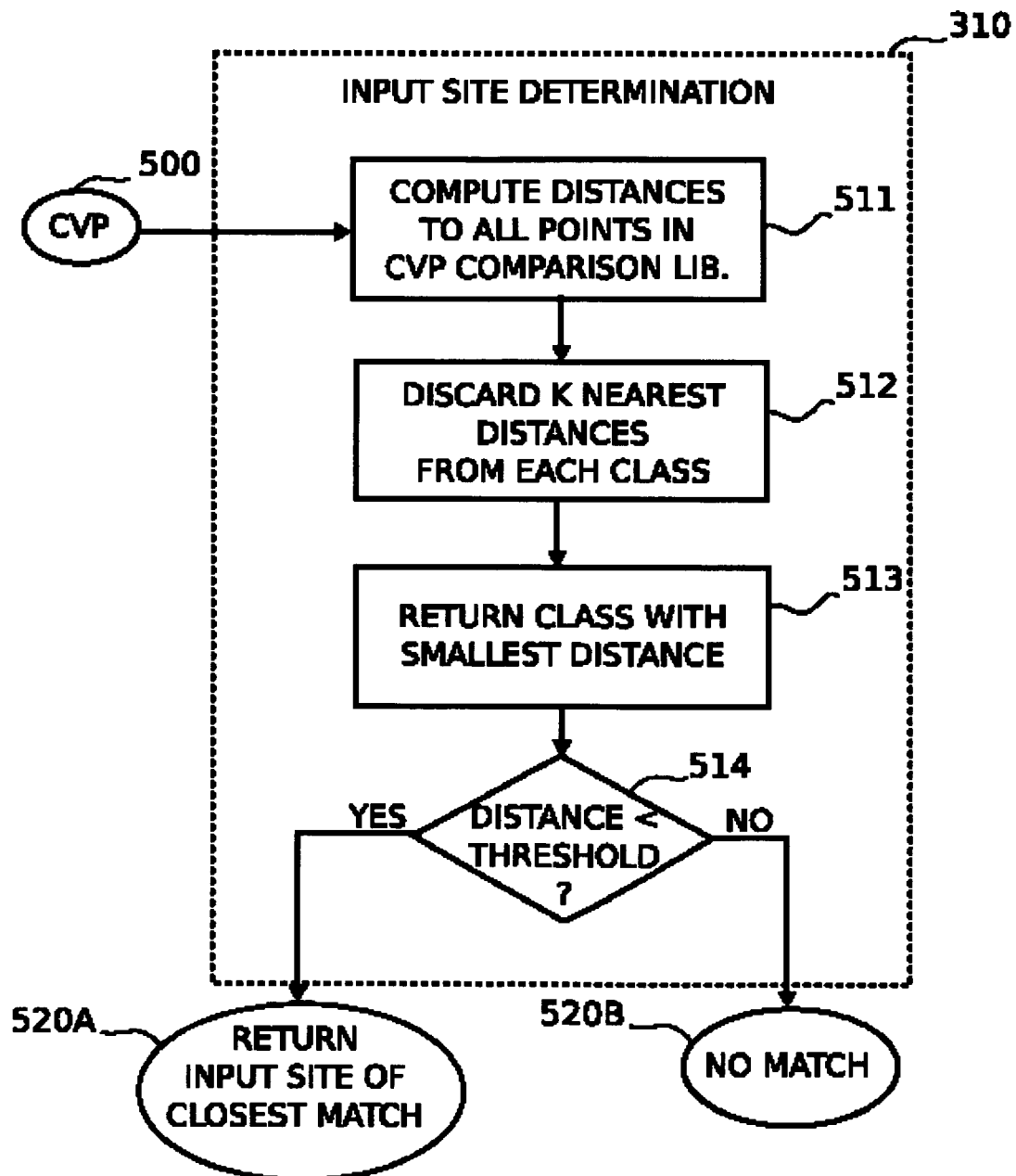
FIG. 5 A logic block diagram depicting the steps associated with impulse input site determination.

FIG. 5: A schematic software flow diagram indicating the steps associated with input site determination (310). After an ADB has been calculated and a CVP 500 has been extracted according to (250), data is passed to the impulse location determination function (310).

Step (511). First the distance between the recently acquired CVP and each of the CVPs in the CVP Comparison Library (L) is measured and compared.

The variable D stores the distance from V to each value in L.

$$D_{ij} = d(\vec{V}, \vec{L}_{ij})$$

where: $d(\vec{A}, \vec{B})$ is a distance metric indicative of the similarity between two vectors, the most intuitive being the Euclidean distance: $d(\vec{A}, \vec{B}) = \sqrt{(\vec{A} \cdot \vec{B})}$ Afterward, in (512), the k (where k can be any non-negative integer less than or equal to j) smallest distances from each class are discarded. In other words, the smallest k terms in $D_i$ are removed. 'k' may vary from class to class. This step reduces the effect of outliers in class data. The resultant of this step is the variable D'.

The smallest distance and associated class are returned as the result of (513). The results are represented by $\vec{D} = \min(D'_i)$. The closet impulse location is defined as the i term that minimizes $\vec{D}_i$.

According to (514) if the distance is sufficiently close and thus smaller than a specified threshold (the minimum match threshold (MM) then (520A) occurs and the impulse location is identified as the output from (514), otherwise the output is regarded as "no match" (520B). This threshold can be determined experimentally after configuration and can be set according to user specifications.

Figure 6A:
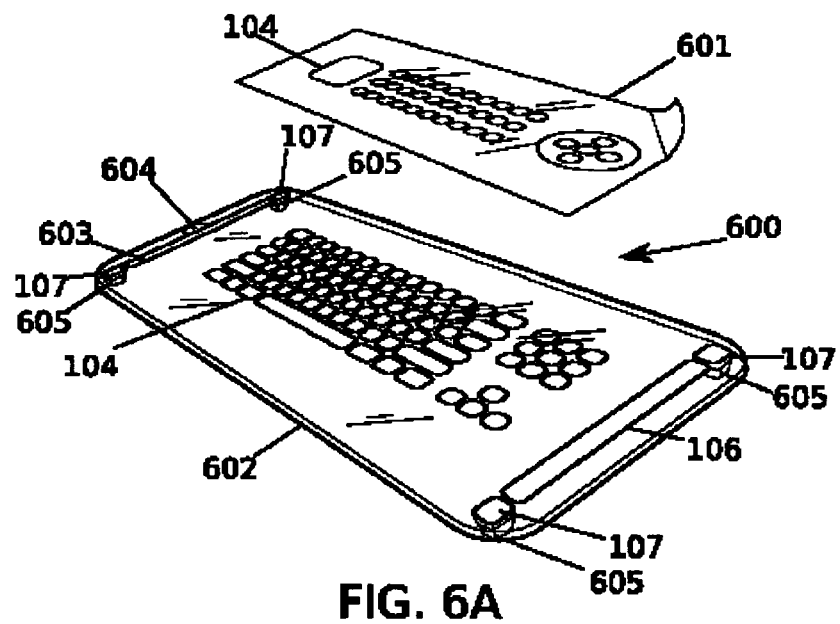
FIG. 6A An impulse-enabled keyboard 600 sealed against liquid or vapor intrusion.
Figures 6B, 6C:
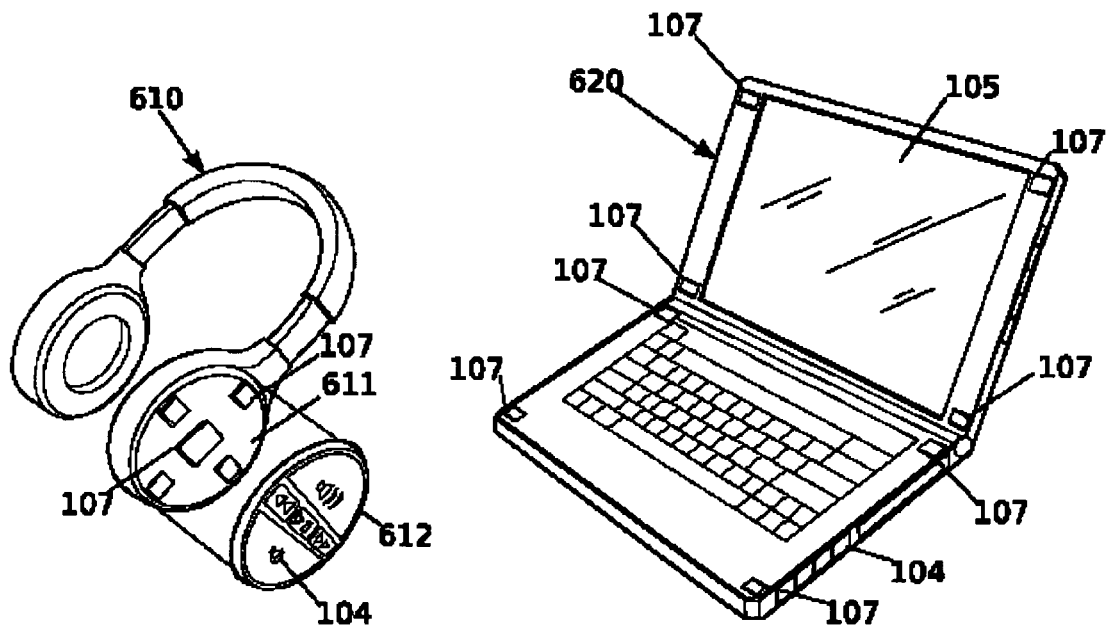
FIG. 6B An impulse-enabled headphone set (610).
FIG. 6C An impulse-enabled laptop (620).

FIGS. 6A-6C illustrate examples of alternative embodiments.

FIG. 6A. An impulse-enabled "Virtual Button,™" keyboard (600). This laptop is sealed against liquid or gaseous sterilants and is thus easy to clean. The sensors (107) will be positioned at anti-nodes to improve signal characteristics. Support risers or "feet" (605) can be made of a soft damping material such as felt or foam; these allow a stiff keyboard surface (602) and provide a consistent and reliable impulse signal. This makes the surface on which the device (600) is resting on less important. (602) can be made of metal, plastic, glass or other relatively stiff material. (604) is a USB housing that allows for connection of this device as a peripheral to a computer system. (104) are visible or tactile markers utilized for delimiting the locations of individual activatable polygons, e.g., a decal or sticker applied to the panel (602). (106) is a speaker used for audible user feedback that a key has been pressed. (601) is an interface skin, i.e., a film or thin sheet placed over, or attached to, the panel (602), which may be used in place or along with decals to indicate activated sites, 4. (603) is the micro-controller for the computations.

FIG. 6B. A impulse-enabled "Virtual Button,™" headphone set. This headphone set (610) is active for impulse user input which provides quick and easy input commands by the user. For example, the user may change tracks increase or decrease volume, or control the radio channel being listened to with impulses to the headphone set while it is being worn on the head. This set also has the advantage of being weatherproof; since there are no mechanical buttons, liquid fluids can not enter through openings around them. The sensors (107) and the printed circuit board (611) are added on the interior of one earpiece. The outer surface of that earpiece (612) is provided with decals (104) or equivalent for delimiting the locations of the impulse locations.

FIG. 6C. An impulse-enabled or "Virtual Button,™" laptop. This laptop (620) has sensors (107) added and is active for user impulse inputs, which allows quick and easy operation by the user. For example, the user may launch or change applications between several commonly used applications. The user may also control the cursor(s) on the display (105), or may zoom, scroll, and pan around the application. A hidden security system composed of a combination of particular impulse locations is also advantageously applied. Decals (104) or optional equivalents are used for delimiting locations of the predetermined impulse sites.

EXAMPLES

Figure 7A:
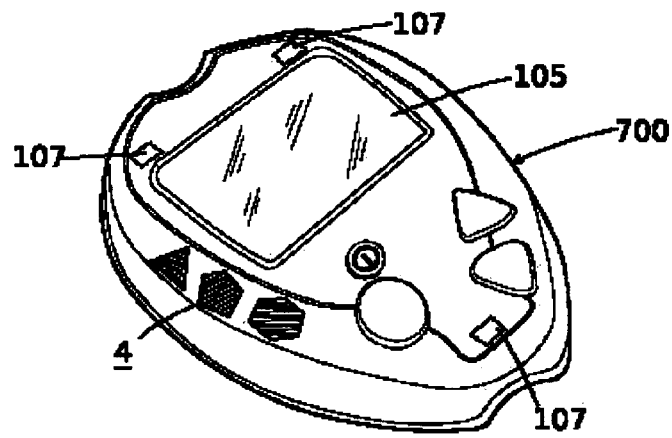
FIG. 7A. Schematic perspective view of MCA.
Figure 7B:
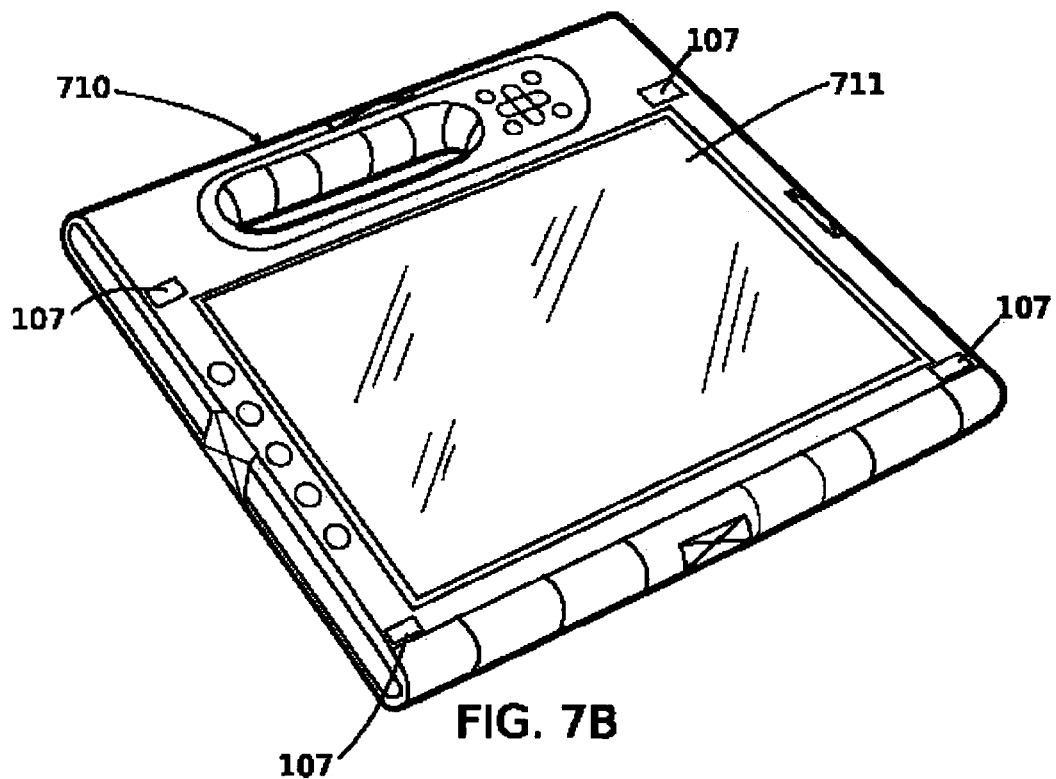
FIG. 7B POC embodiment

Point of Care (POC) devices (700) in FIG. 7A and Mobile Clinical Assistant (MCA) (710) as shown in FIG. 7B are examples of how the present invention is embodied into advanced technology for sensitive environments. These appliances typically assist healthcare professionals in carrying out a variety of tasks by combining several common functions into one computerized device. They are ideally suited for assisting in: recording clinical notes, confirming medication compliance, capturing images of clinical events, reading bar codes (patients, medications, equipment, reports, etc.) and planning/managing therapy. The operation of "Virtual Button,™" of the present invention is not affected by extremes of hospital environments, especially frequent surface cleaning with chemical sterilants. MCAs most often already have a traditional touch screen as an active user interface while a POC device generally does not include an active contact screen. MCAs are increasingly becoming a clinical standard because of their ease of surface sterilization and their small form factor, which make them easily accessible and fully portable. Well designed MCAs are very flexible, wirelessly connected, and integrate popular functionalities. The flexibility of MCAs and POC devices allows workers to carry them from room to room during rounds and utilize wall-mount devices and terminals in each treatment room. Typical MCAs are also used as regular personal computers at a desk when keyboard and mouse peripherals are added. This wireless functionality allows instant updating of hospital records and databases.

Example 1

MCA Clinical Embodiment

An MCA is an example of how the present invention is seamlessly integrated into the latest advanced medical practice. MCAs are specialized tablet computers which can be carried by physicians, nurses, and other health-care professionals (see FIG. 7A). MCAs are quickly gaining popularity in hospitals and nursing homes as these institutions strive to increase productivity and convert to Electronic Medical Records (EMRs). The motion-sensor components evaluated for clinical prototypes are operational at temperatures from −40° C. to 85° C. and withstand shocks up to 10,000×-gravity or more (see TABLES 1, 2 and 3).

There are a number of browser, medical-science and accounting-type programs which are commonly used by healthcare professionals and it is desirable to be able to launch and quickly switch between 2-3 active programs. This can be easily accommodated by an embodiment of the present invention, i.e., by adding 3-10 impulse sites or "Virtual Button,™" on the housing adjacent a known touch screen. Integrated "Virtual Button,™" can be placed anywhere on the external surface of the device, including the display-screen area; impulse-site resolution techniques of the present invention are highly reliable for polygon center-to-center spacings of about 25 mm. Improved resolution, especially for stylus modes, is expected with advanced hardware and refined software now under development.

Alternatively, "Virtual Button,™" can be provided in a separate extension or as an add-on component which may, optionally, be fastened mechanically to one edge and which couples electrically to the screen component by known technologies such as: IEEE 802.11b, infrared, "bluetooth" (2.4 GHz ISM band), FM radio or a short USB wired cable. For example, an embodiment in the general form of a paddle-like display screen (about 150 mm square, 10-30 mm thick) flexibly-mounted to a "thin brick" handgrip (180 mm length, 60 mm wide, 15-30 mm thick) provides ample room for 20-30 "Virtual Button,™" on the handle surface and a convenient viewing area, even for detailed spreadsheets. In such a "table-tennis-paddle" configuration, an optimal array of motion sensors is arranged at outboard corners of the display and along the face and edge surfaces of its picture frame. In such an embodiment, both the sensor-array layout and each individual orientation for sensing rotational accelerations about the handle axis and flexible hinge link are functionally optimized for the particular size of the display. The min and max limits for the sensor array layout (count, position and orientation), 6, as indicated in TABLE 3, are applicable as an example of design scaling of the present invention.

In certain applications, such as intensive care or the operating room, both the handpiece and the display screen may be enclosed within a flexible, sealed, sterilized, transparent-polymer bag to assure compliance with hospital procedures. For such applications, larger polygons and fingernail or stylus inputs may be favored. The present invention envisions full-duplex network communications by means of "piconets" and "scatternets".

Applying a command impulse to such a "Virtual Button,™" site corresponds to "calling up" the selected program from the repertoire of applications or functionalities of the MCA. This saves time compared to the classical method of the cursor over a "Start menu" and then choosing the program from that list.

Five illustrative impulse sites, 4, are shown as open circles on the housing surface along the left edge of the display in FIG. 7B. Naturally, if there are more common applications, the number of application—selection impulse sites is easily increased.

Figure 1G:
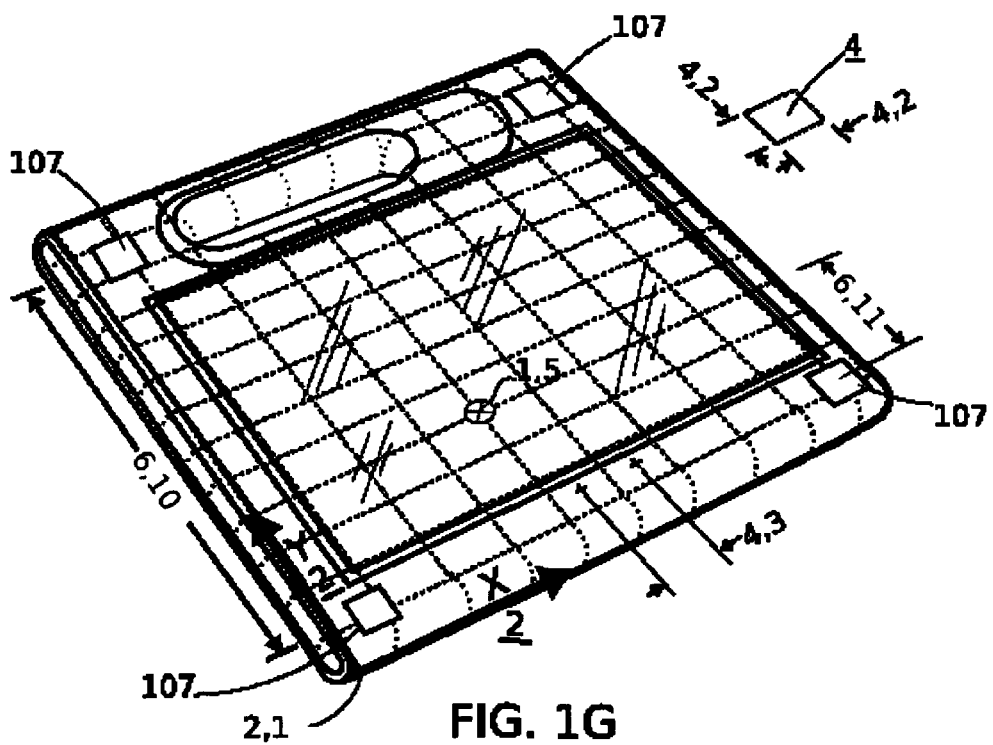
FIG. 1G A schematic view showing an illustrative AP array which is mapped continuous (area-filling) over the transfer surface, TS. This figure also illustrates the centroid spacing of adjacent 4-sided (quadrilateral) n-gons, 4,3; the spacings between an MS origins (6,10); and the spacing (6,11) between an MS origin and an IV origin (1,5).
Figure 1H:
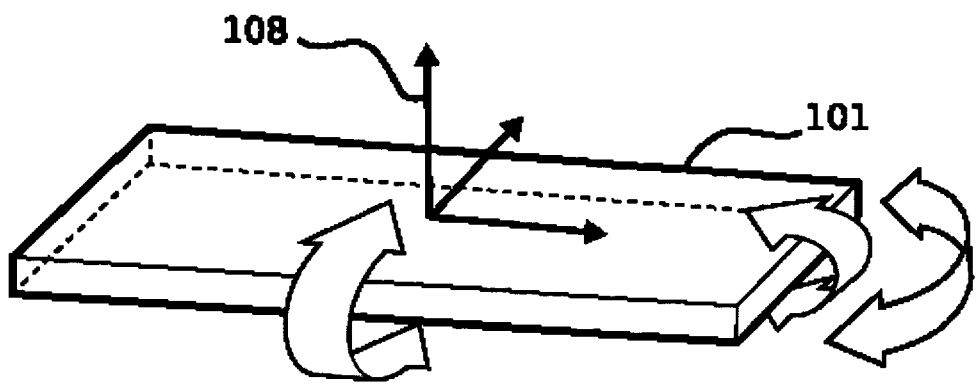
FIG. 1H Schematic view of rigid-body motion
Figure 1I:
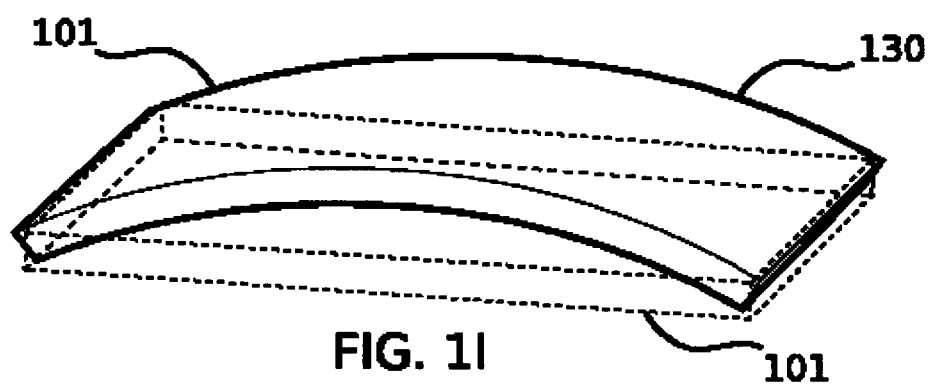
FIG. 1I Schematic view of bending motion
Figure 1J:
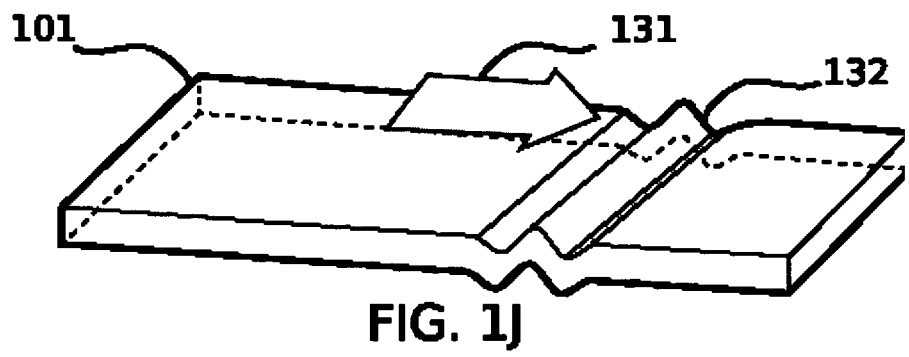
FIG. 1J Schematic view of wave motion

Scrolling functionality, e.g., for reviewing large databases or lists of medications or patient information, may also be provided in embodiments of the present invention. In FIG. 7B special scrolling AP, 4, impulse command sites are shown as "x-in-square" symbols. An illustrative array of MS locations is shown in this figure as filled circles. FIG. 1G illustrates an alternative continuous grid of mapped polygons, i.e., 4-gons on all areas and an alternative "diamond array" of four MS devices.

Figure 7C:
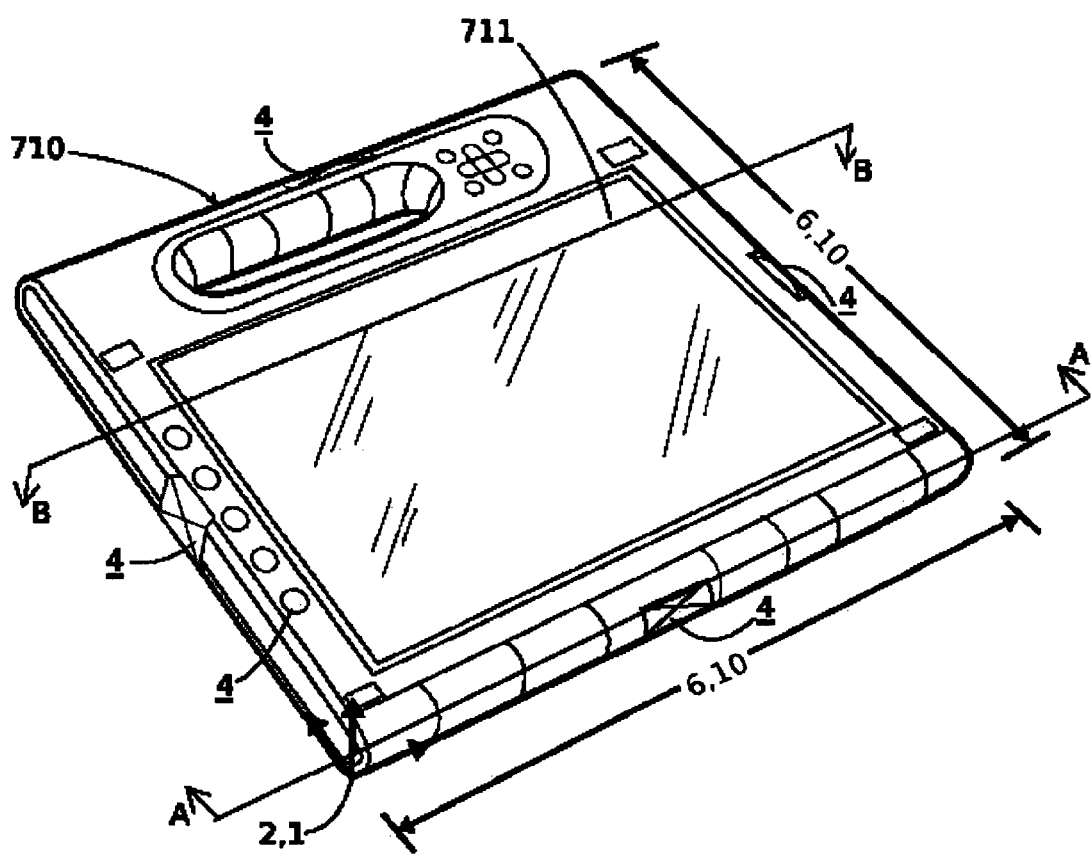
FIG. 7C. Schematic perspective view of MCA embodiment showing 4 discrete and 5 partial-continuous (strip-format) APs. Section planes for FIGS. 7C and 7D are indicated.
Figure 7D:
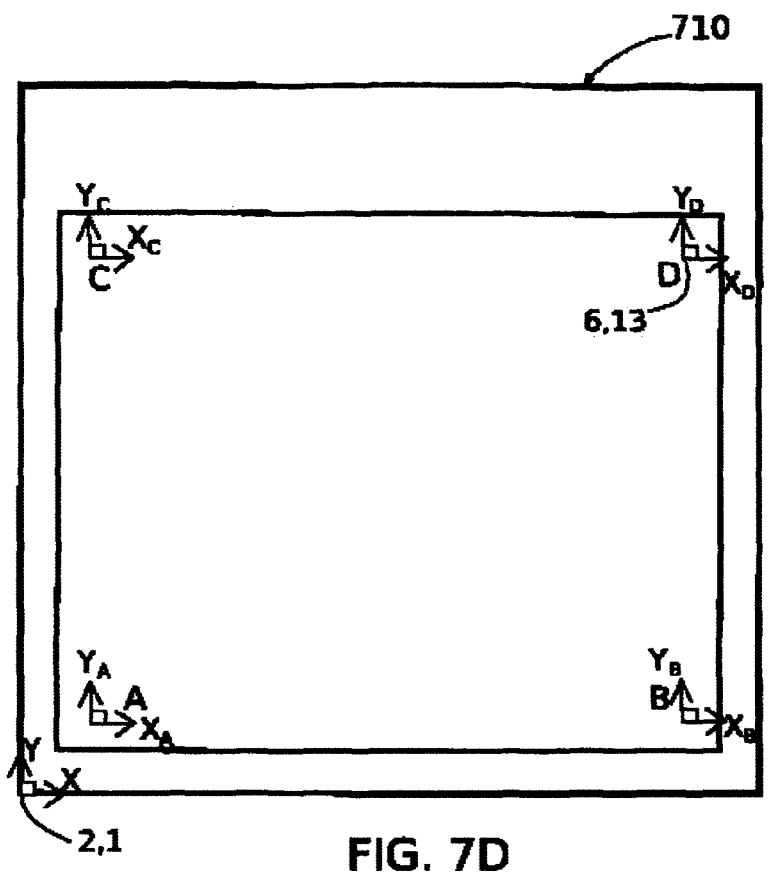
FIG. 7D. Sectional view AA showing PC board and MS positioning-alignment
Figure 7E:
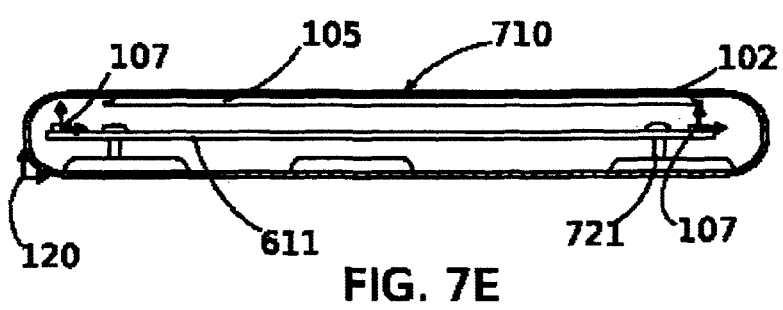
FIG. 7E. Sectional view BB showing PC board and MS positioning-alignment

Exemplary design considerations for incorporation of integral "Virtual Button,™" is shown in FIG. 7C, FIG. 7D and FIG. 7E. Input sites can be easily integrated in an MCA by adding several MEMS motion sensors directly on the printed circuit board (PCB) (611) of the device. The motion of the transfer surface is transferred to the PCB (611) through the mounting screws (721). The ability to place the hardware directly on the PCB allows the integration of the present invention directly in the existing manufacturing process. Adding two motion sensors would give basic functionality while three or four such sensors would result in good resolution over the entire external surface. If desired, the motion sensors could also be placed on the inside of the external surface, and adding several more sensors would increase the resolution further with the ability to capture more flexural modes of the device. The locations of the sensors relative to the origin of the transfer surface (2,1) (in this example, the same as the origin of the device); the specific MS locations are indicated schematically FIG. 7D. As shown, the sensitive axes of each MS device is aligned with the base vectors for the transfer surface coordinates.

For this illustrative example, an array of 4 known Bosch BMA 140 sensors is used; technical characteristics of this and similar devices are included in TABLE 2.

Example 2

Point of Care (POC) Devices

Although POC medical diagnostic devices are offered in various form factors, they are generally light-weight, portable, hand-held devices. The main advantage of POC devices is immediate network access to test results and convenient entry of new information into the health information system. POC devices may be used outside the sterile clinical environment to provide test results that can be used by a diabetes patient to take corrective action during normal day-to-day activities. Similarly, they are used in medical facilities to get quick results without the need to send samples to a remote laboratory. An exemplary upgraded POC blood-glucose meter, which is provided with an LCD display screen and "Virtual Button,™", is shown in FIG. 7A.

POC medical devices are typically utilized for a specific application, e.g., blood diagnostics. The user introduces a tissue or fluid sample and enters commands that direct the device to analyze the sample; this management process may involve choosing options from several menus. Known POC devices generally have simple displays and mechanical-button type user interfaces. The present invention allows replacement of all the mechanical buttons including arrow and enter keys; in addition, additional functions activated by conveniently sized impulse areas can be added at no extra cost. "Virtual Button,™" can support basic touch screen like functionality along with the replacement of mechanical buttons in the present invention. In some cases a POC device does include an active traditional touch screen (711). Traditional user interfaces such as active touch screens and other standard functions can be maintained after the "Virtual Button,™" of the present invention are added.

FIG. 7A shows an exemplary POC device embodiment of the present invention. For this embodiment, a known basic appliance is modified to install three discrete impulse-enabled "Virtual Button,™" (3-gon, 5-gon and 6-gon along left edge). After design enhancement, the classic mechanical switches (1 round, 2 triangular) are removed; the three APs are then placed at any location on the housing (sometimes dictated by ergonomics or structural factors). Further, an appropriate-sized LCD screen with activatable polygons, 4, for one or more "Virtual Button,™" is added to replace the typical simple alpha-numeric display. The advanced, impulse-enabled POC includes an active contact screen which is shown hatched in FIG. 7A; this LCD display is provided with an array of APs for additional and enhanced functions available to the user. Standard functions of the basic device are maintained after the "Virtual Button,™" of the present invention are added. Traditional user interfaces, such as active touch screens and other standard functions, can be maintained after the "Virtual Button,™" of the present invention are added.

This exemplary design is fitted with an internal-mounted, triangular-pattern MS array consistent with the design parameters of rows 6,1 to 6,12 in Table 3. The three MS devices shown in this schematic drawing are selected from Table 2. The supporting internal electronic devices to enable the "Virtual Button,™" is integrated directly into existing manufacturing processes and onto the printed circuit board (611) of the host device. These additions include a digital signal processor and related components; the extra physical space required on the PC board for packages is about 150 mm$^2$.

Example 3

Impulse-Contact Screen (ICS) Embodiments

Traditional touch screens for computer monitors are commonly used in public settings such as restaurants, banks and many stores. Traditional touch screens are also used in popular hand-held entertainment devices. With a motion-sensor-based system, it is possible for many existing computer monitors (whether the design is LCD or CRT) or projected displays (whether the display is on a dedicated display surface or is projected onto common surfaces such as walls or white boards) to be updated to become inexpensive, high quality impulse-contact screen interfaces.

The low cost of ICS technology makes it viable for many types of household electronic devices. ICS technology can even be retrofitted into existing display screens and computer monitors.

The underlying principle behind the ICS technology is simple. When the user impacts a device, energy is transferred to that device, causing it to move slightly. When a user impulse-contacts the ICS screen of a computer monitor, the impact intensity and contacting-device properties influence the resulting movements. The ensuing motions, including vibration, are measured by an array of four MEMS (micro-electro-mechanical) sensors securely-mounted at selected positions on the edges of the screen plate. In a well-designed embodiment of an LCD monitor (800) with a factory installed ICS screen (801), shown in FIG. 8A and FIG. 8B, the edge-mounted sensors are concealed within the device housing or enclosure.

A processing unit, combined with advanced software, correlates between the experienced motion and a stored library of predetermined motion signals. The goal of the software is to resolve the several characteristics of each particular impact, e.g., the contact location, the intensity, and the effector-apparatus type (fingertip, fingernail, stylus or other).

The required steps for conversion of an LCD or CRT or a projected-surface display to ICS operation are: (1) Attach motion sensors to the monitor screen and (2) Configure the processing unit and advanced software for the particular display.

Sensor mounting. The sensors used for updated factory versions and after-market modification to ICS are based on MEMS (micro-electromechanical systems); most are available in small packages, i.e., about 8 mm×5 mm×1.5 mm (see TABLE 2). For one embodiment, each MEMS accelerometer is mounted on a small circuit board from which data, power and ground lines are attached. These wires connect all four sensors to a dedicated micro-controller. In another embodiment, the MEMS accelerometers are mounted onto a small circuit board with a long-life battery and a wireless transceiver. For optimal performance, the sensors are rigidly attached to the device; alternative sensor attachment methods include: mechanical fasteners, adhesives or other known means.

System configuration. The special software provided in the processor guides the user through the configuration sequence, i.e., prompts discrete impulse-contacts at specific locations, e.g., ruler markings or at locations defined on a removable overlay template. The purpose of configuration is to build a library of classified sensor readings that future readings are compared against. The advanced software system of the present invention is also adapted to allow addition of customizing commands and/or macros.

Adaptation and scalability. The technology of the present invention is easily adapted for use with small hand-held devices such as PDAs and small laptops. The present technic is equally compatible with large, wide-screen monitors (about 1 meter wide) and larger projected displays including front and back projection. Similarly, it can be applied to enclosures and housings of widely varying size and shape, i.e., it is not restricted to absolutely flat applications and is highly practicable for curved or irregular-form monitors. ICS techniques are used to add extra function to existing displays. ICS technology is not limited to the specific area of the display screen; users can enhance their interaction by using the sides, back, base or any other external housing portion. For example, commonly used applications are launched by impulse-contacting a particular location on the side of the monitor. Zooming, scrolling, and panning could also be accommodated in most applications. Such command sites can be configured to turn on or off peripherals, adjust audio volume or image brightness, navigate within the user's operating system or to interact with specific applications. For factory upgrade or user retrofit of LCD displays to ICS capability with a removable protective ICS screen assembly (810), a protective screen (811) is typically valuable to prevent scratching or the build up of dirt and oils.

Impulse-effector differentiation. ICS techniques allow the user to configure selected impulse-input surfaces to the unique needs of the application, i.e., restaurant versions may be optimized to each particular server's convenience. The range of such preferences extends across many possibilities including: fingertip, pen, credit-card edge, a tethered stylus, other item, etc.

Figure 8D:
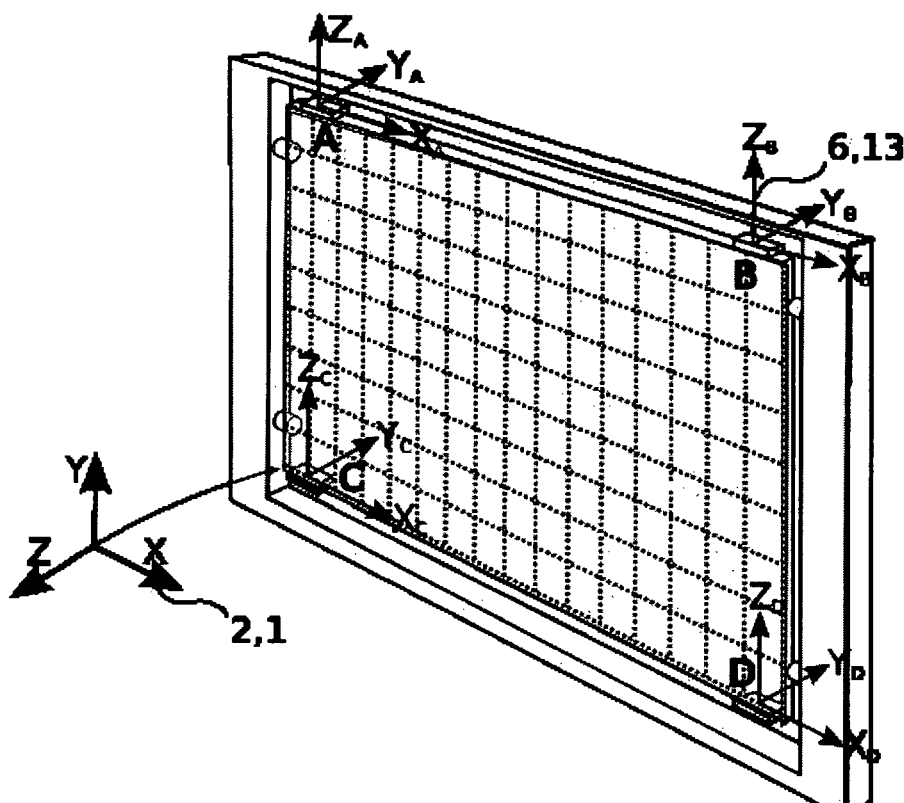
FIG. 8D. Isometric view of removable ICS screen (TS) and frame. Note the location origins of each 3-axis motion sensor showing the orientations of the sensitive axes and their alignment with the coordinate system for the screen edges and the continuous array of 4-gon quadrilateral activated polygons (APs).
Figure 8E:
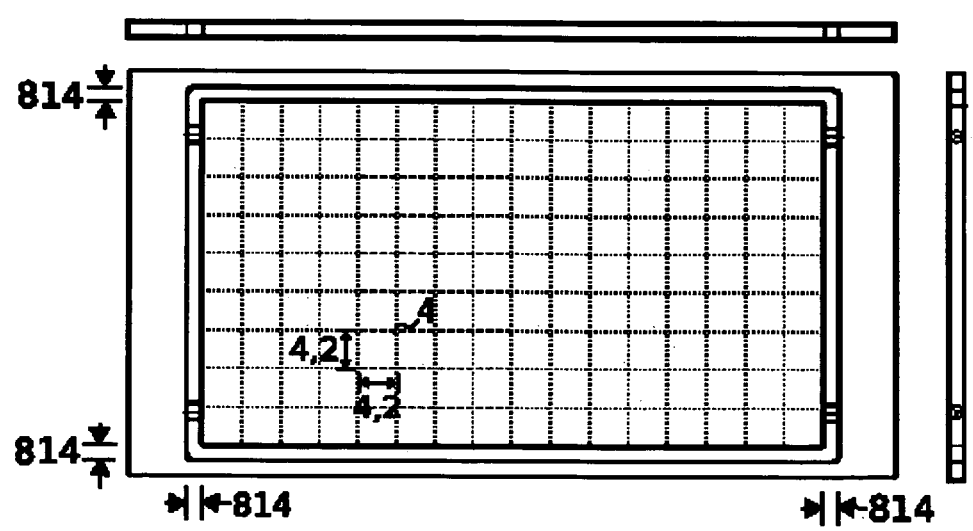
FIG. 8E. Set of traditional Third-Angle views (top, front, right-side) of an ICS screen (TS) and its supporting frame. In this illustrative embodiment, the edge lengths of each AP are 29 mm. The flat glass transfer surface, 2, is rectangular with a X extent of about 465 mm, a Y extent of about 262 mm and a Z extent of about 6 mm.

Compliant-mounted ICS screen. Compliant mounts or spring-type dampers allow the impacted protective screen (811) to move freely, with a clearance spacing (814) from the frame, under controlled-level command impulses. This assures that resulting movement signals are sufficient for accurate impulse-contact parameter characterization. As illustrated in FIG. 8C and FIG. 8D and FIG. 8E, a set of spring dampers connects a protective screen (811) to a rigid frame (812). This frame is attached to a monitor using a variety of known means. A hook that extends over the top of the monitor is desirable because it is minimally invasive. The addition of a damping mount adds compliance to the protective screen (811) that supports the four accelerometers which are mounted thereto. Thus, the signal to noise ratio is improved and better parameter discrimination is possible.

Example 4

Measured Effects of External Damping Factors Upon Performance of Impulse-Driven Devices The impulse interface of the present invention is subject to different types of boundary conditions. Depending on the application, the housing (101) may be held in a user's hand or laid on a hard surface such as a tabletop. A hand-held communications device is often subject to both these conditions within a short period of time. In certain embodiments, the transfer surface is tightly connected to a frame or support structure. In some alternative embodiments, the transfer surface, 2, is fixed to a larger piece of equipment, e.g., a large monitor or image-screen surface of a projected display. In some cases there may be springs or dampers combined in a "compliant mount" (813) that give consistent boundary conditions so the enabled surface responds in a predictable and consistent way to impulse inputs.

The purpose of this test was to measure the effects of various boundary conditions on performance of a typical hand-held device, particularly comparison of MS signal attributes and the resulting error rate. The measurements were made under typical and two more-challenging conditions: 1. Held in the user's right hand; 2. Laid flat upon a table; 3. Held in a vise with small pieces of elastomer as compliant pads against the housing edges. In each of these cases the standardized impulse was delivered with the left middle fingertip tissue of the operator. The "base case" is the hand-held case.

Figure 9A:
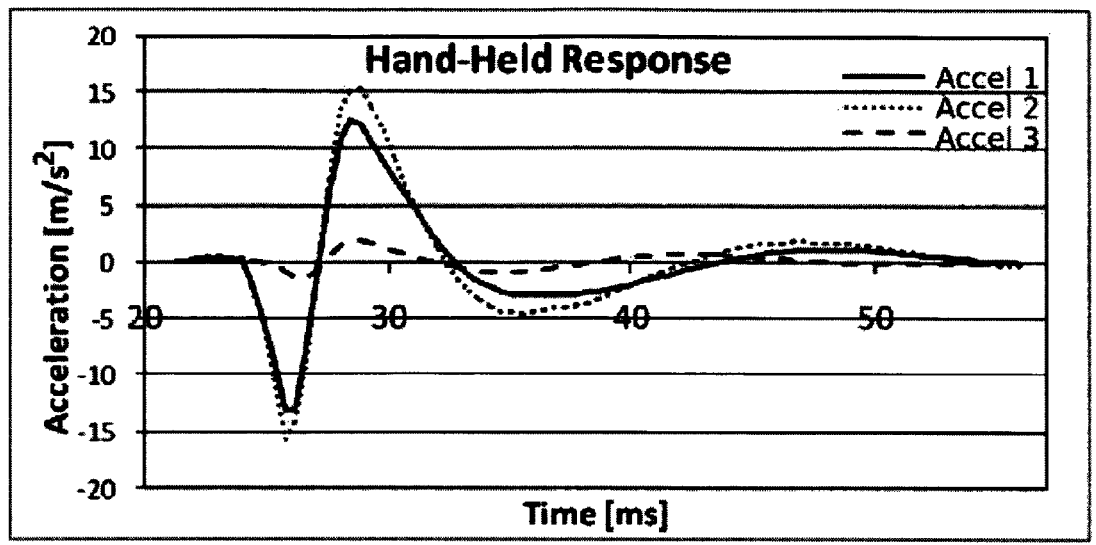
FIG. 9A. Vibration of hand-held device as grasped in adult human hand

In the hand-held case, FIG. 9A, the frequency is just over 100 Hz for the first full period. The accelerational amplitude is about 15.0 m/s². The hand and arm act as a large spring-damper. In this case the amplitude of acceleration is relatively large and there is also a lot of damping. The signal quickly dies away over time so that there is negligible acceleration after the first or second period. Another interesting characteristic of this case is the change of frequency over time. The second period in FIG. 9A is seen be 22 ms in length, corresponding to a frequency of 45 Hz.

As mentioned in the previous description sections, one way of constructing the CVP is take the maximum and minimum extremes of each MS channel. For a normalized hand-held case this would result in channel 2 contributing a +1 and a −1 (which becomes 1 and 1 in the maximum/minimum CVP) to the CVP while channels 1 and 3 contribute smaller values, but with similar absolute values of the maximum and minimum, the CVP for these three channels would be [0.79, 0.84, 0.97, 1, 0.13, 0.10]. Another embodiment mentioned is taking a time slice of the data at a certain point, such as the absolute maximum extreme. For the hand-held case, the absolute maximum extreme occurs on the $2^{nd}$ acceleration channel with a value of |−15.4 m/s²| at a time of 25.8 ms (5.8 ms after the impulse occurrence). The values of the other two channels shown are |−13.0 m/s²| and |−1.5 m/s²|. In a normalized situation this would result in a CVP of [−0.84, −1, −0.1]. Because there is another maximum that is positive, and close to the same absolute value, this might also be gathered as the CVP in some instances. This would result in a CVP of [0.8, 1, 0.1] (taken from the time slice at 29 ms). Testing has shown that two different CVPs associated with the same location can easily be taken into account with the algorithms disclosed herein. A CVP generated in the operation phase as a result of an impulse will fall very near the two or more different clusters of CVPs generated during the configuration phase. It is also noted that the two CVPs that might be commonly generated as a result of the impulse in this test are nearly the same except one is the negative of the other.

Figure 9B:
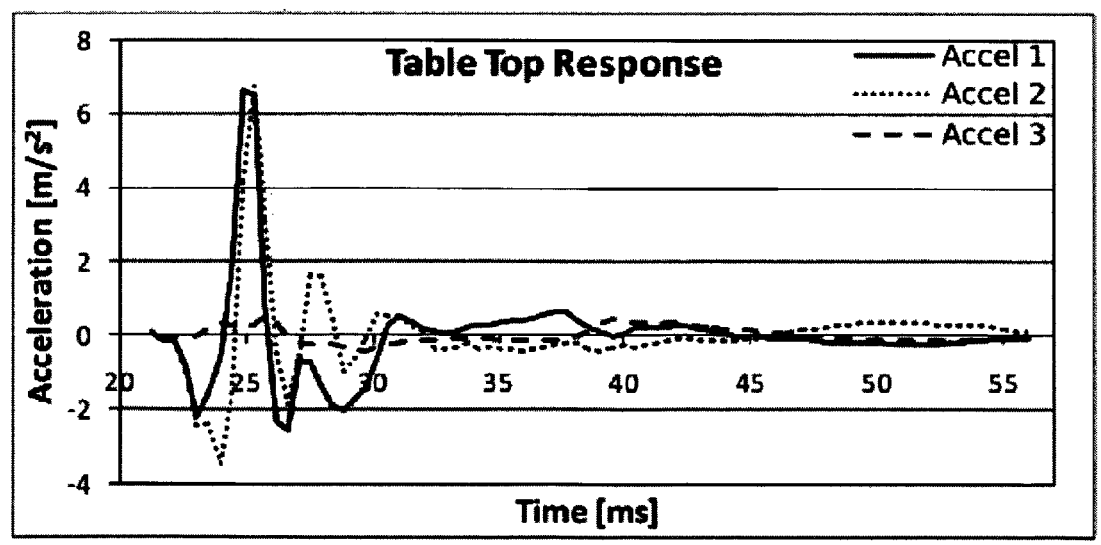
FIG. 9B. Vibration of hand-held device laid on table

The second case is of a hand-held device laid flat upon a table. A representative response is shown in FIG. 9B. In this case the period of vibration is seen to be about 3 to 4 ms corresponding to a frequency of 250-333 Hz. The amplitude of acceleration is reduced somewhat and in this case is about 6.5 m/s². The response is slightly less damped when laid on the table and there are three noticeable periods at the dominant frequency. The CVP generated with the maximum/minimum method would be [0.98, 0.33, 1, 0.51, 0.09, 0.07]. This is quite different than the CVP generated when the device is held in the hand. It is suggested that with this method of generating CVPs, either separate configuration CVPs should be generated for the case when the device is laid on the table (an easy task when configuration is done once at the factory) or a different method of generating the CVP should be investigated. Using the time slice method of generating CVPs would result in [0.96, 1, 0.06]. This is similar to the CVP generated for the hand-held case.

Figure 9C:
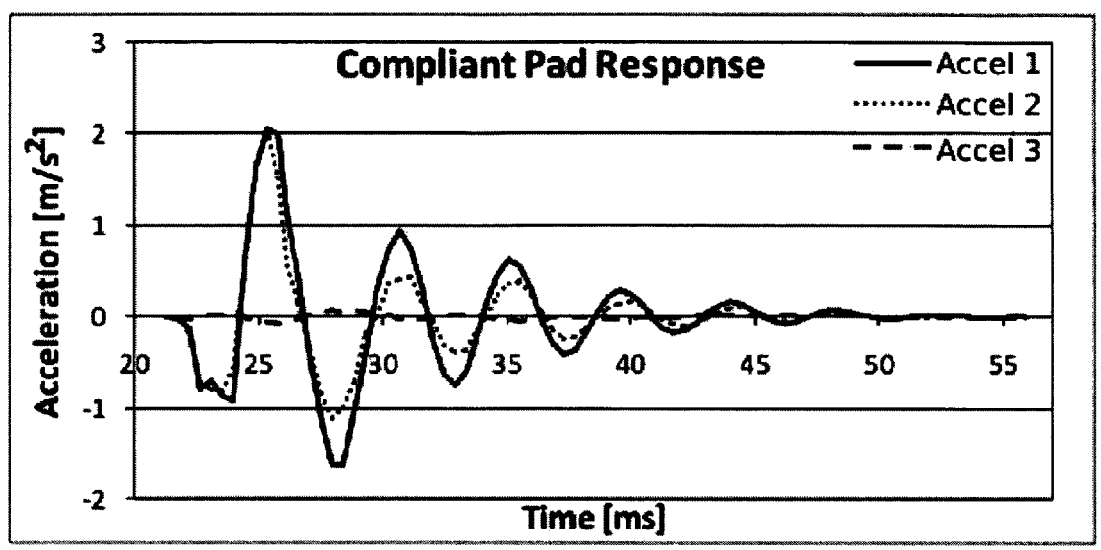
FIG. 9C. Vibration of hand-held device held in vise with small spring dampers supporting each corner FIG. 10A Normal Configuration Process.

In the third case the device is held by a vise and small elastomer pads are used to hold the device in a consistent way between the jaw faces. A representative response is shown in FIG. 9C. The amplitude of vibration is about 2.0 m/s2 and the frequency is consistently 200 Hz with the 7 mm diameter and 5 mm thick vinyl or polyurethane polymer dampers used. There is much less damping when using the spring dampers and the response smoothly disappears over the course of 7 cycles. The normalized CVP generated using the maximum/minimum method results in [1, 0.8, 1, 0.55, 0.05, 0.06] for this test data. With the exception of the fourth entry, this CVP is reasonably close to the CVP generated when held in the hand. The CVP generated with the time slice method using the absolute maximum as the point at which the data is to be taken results in [1, 1, −0.05]. This is reasonably close to the CVP generated using the hand-held method.

The results of these tests confirm that the basic conceptual paradigm of the present invention supports a wide variety of embodiments of impulse-driven devices. The advanced time-slice CVP generation methods of the present invention work reasonably well for all the situations explored in this test.

Various cases of an impulse-activated device attached to a large rigid component are now under active investigation. It is believed that the bandpass filter used in future testing of damping tolerance should have an increased high-frequency cutoff, i.e., greater than about 2000 Hz. In addition, alternative techniques for generating damping-tolerant CVP values are now being evaluated, i.e., by considering two or more time slices.

Example 5

Input Impulse Site Location by Interpolation

Introduction. Interpolation is the construction of new data points within the range of existing data points. In the case of "Virtual Button,™", interpolation represents the construction of operation phase site locations that exist between the configuration phase input site locations. Interpolation offers improvement for a user of the "Virtual Button,™" system in both the configuration phase and the operation phase.

Figure 10A:
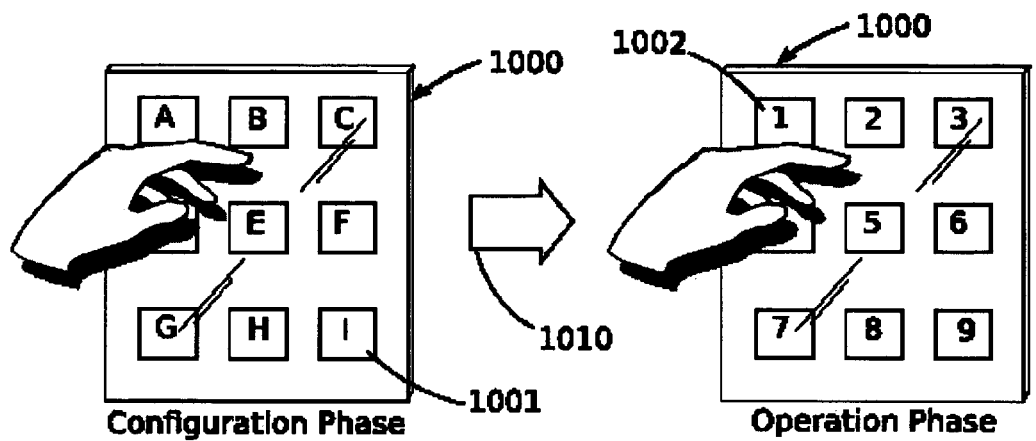
FIG. 10B: Interpolation Applied to Reduce Configuration Requirements. Sites 2, 4, 5, 6 and 8 have all been interpolated using data gathered from input sites A,B,C,D (1, 3, 7, 9).
FIG. 10C: Interpolation to Increase Input Site Resolution
FIG. 10D: Interpolation General Overview
FIG. 10E: Left: A flat panel touch interface Right: Two examples of input site determination FIG. 11. Schematic cross-section view, human index finger, distal phalanx applying an impulse to a thin polymer shell transfer surface FIG. 12a Isometric View of Exemplary Flat, Thin-Shell Transfer Surface w. Molded-Integral, Rectangular, Rib-Grid on Interior (Bottom) Surface.

Configuration Process. FIG. 10A shows an illustrative example of the "Virtual Button,™" configuration process without interpolation (1010). During the configuration sequence, the nine input site locations (9 APs, each labeled with an alphabetical character) on the input surface (1000) are impacted using a standardized impulse vector [theta, phi, impulse (1,1c) with impulse vector origin (1,5)] in order to build a library of comparison data to be used for classification in the operation phase. After the configuration routine is complete there exists a one-to-one correspondence between the operation phase input site locations (1001) and configuration phase input site locations (1002). In order to obtain nine-button functionality, the user must configure and collect data from nine input sites.

Figure 10B:
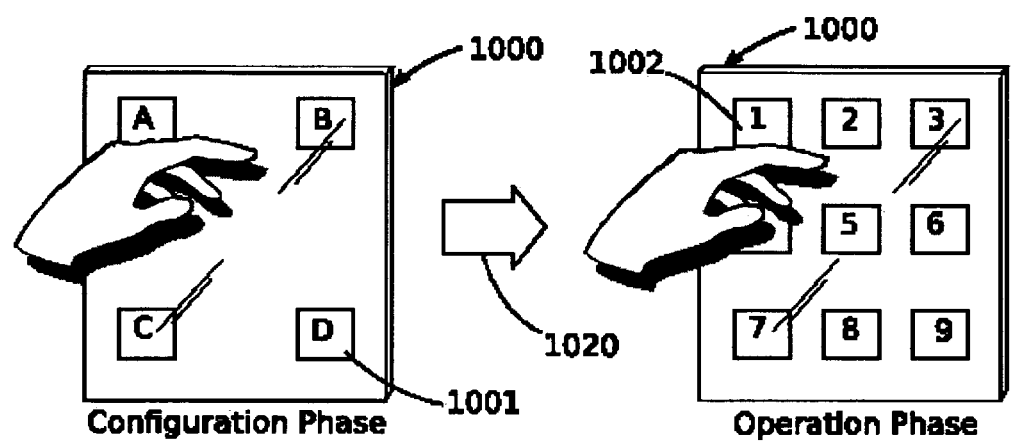

Interpolation for Reduced Configuration Requirements (1020). FIG. 10B illustrates use of interpolation to reduce the effort and time required for the configuration process. In this case, only four configuration phase input sites are configured yet the result is a 3×3 grid of operation phase sites. Interpolation algorithms automatically identify site locations between the existing input locations. Although this demonstrates a single input site being constructed between two adjacent configuration input sites, multiple input sites may be interpolated between configured input sites.

Figure 10C:
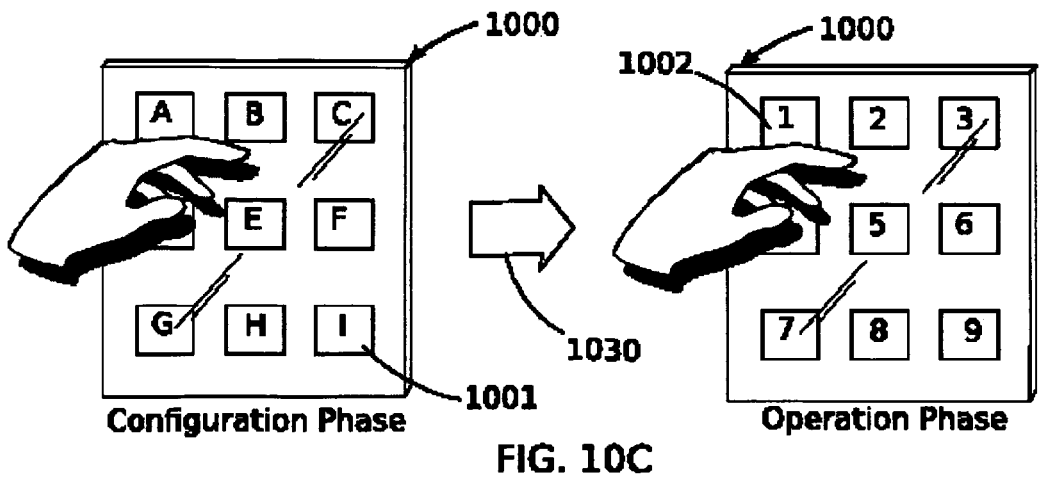

Interpolation for Improved Resolution (1030). FIG. 10C demonstrates the usage of interpolation to increase input site resolution. This figure represents a method that requires as much time and effort as method 1 (in which no interpolation is used). However, with the proper interpolation algorithms, it is possible to construct a system with finer resolution than the configured space.

In yet another embodiment, a combination of both methods may be used to simplify the configuration process while improving resolution.

Implementation.

To understand the benefits of interpolation for the "Virtual Button,™" impulse input system, one must understand the differences between two coordinate spaces:

3-D Transfer Surface Space. These coordinates in the transfer surface space represent the points on a device that may be impacted by an impulsing apparatus during normal operation.

n-D Composite Vibration Profile (CVP) feature space: This feature space has as many dimensions as the CVP has parameters. For example, using a time-slice method with 6 sensor channels produces a CVP that has 6 parameters. That CVP exists in a 6-D feature space.

The purpose of input site determination algorithms is to determine the location of the input site based on the acceleration data buffer. The CVP is representative of the thousands of values stored in the acceleration data buffer. With interpolation, the algorithms can go one step further and output not just the input site location but also a coordinate (or range of coordinates) in the transfer surface space.

The implementation of these algorithms is discussed below for a homogeneous, planar, surface with a regular grid pattern defining the input site locations. The same methodology is used for impulse input objects or surfaces that have any shape or contours including heterogeneous objects with multiple planar or curved surfaces, but only the planar case is discussed herein for conciseness.

Interpolation Methodology. This entire interpolation process is outlined as follows:

Configuration Phase
1. Configure input site locations.
2. Determine equations for configuration input site boundaries.
3. Determine equations that define the operation phase site boundaries.

Operation Phase
1. Retrieve live data and determine "distance" to each input site location
2. From "distance" information calculate the match to each input site location.
3. Find resultant impulse vector parameters (location and magnitude)
4. Use operation phase boundary equations to determine impacted operation phase input site.

Map Configuration Input Site Boundaries. A preliminary step of the interpolation algorithms is to define the input site boundaries based on the 3-D transfer site coordinate system. These input site regions may be specified as a set of inequalities. In FIG. 10E, the transfer site origin is located on the bottom left-hand corner of a touch panel and the input site boundaries form a grid. In this example, there exist a total of nine configuration input sites. The centroids of each configuration input site are also calculated for future algorithms.

Map Operation Phase Input Site Boundaries. Operation phase input boundaries outline the input regions for the operation phase. This process is similar to mapping the boundaries of the configuration phase input boundaries. Typically, there are more operation phase boundaries than configuration site boundaries. The application illustrated in FIG. 10E has 25 operation phase input boundaries.

Calculate Distance and Match Value to each Input Site Location. With the current input site determination algorithms, a distance to each input site location is returned. This distance represents the Euclidean distance between the operation CVP and the $k^{th}$ closest reference CVP for each class in the CVP library. The distance is defined such that the smaller the distance the closer the match between any two CVPs.

An alternative representation known as the match value is useful in the discussion of interpolation algorithms. The CVP match value is defined in the following way:

$CVP_O$: operation CVP; calculated in operation phase
$CVP_r$: reference CVP; calculated in configuration phase Larger match values for a pair of CVPs signify a closer relation between two signals. If the CVPs are exactly the same, then the match value between them is 1.0. Poor matches will result in very small or negative match values.

Figure 10D:
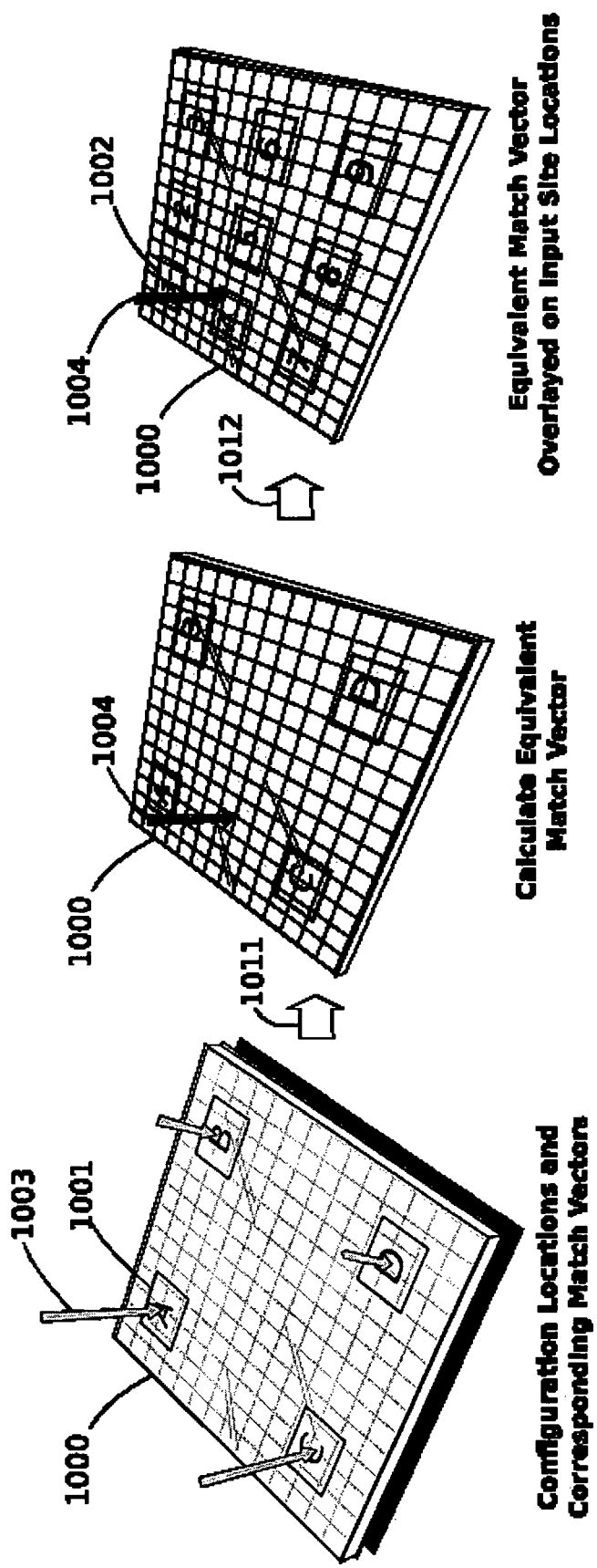
Figure 10E:
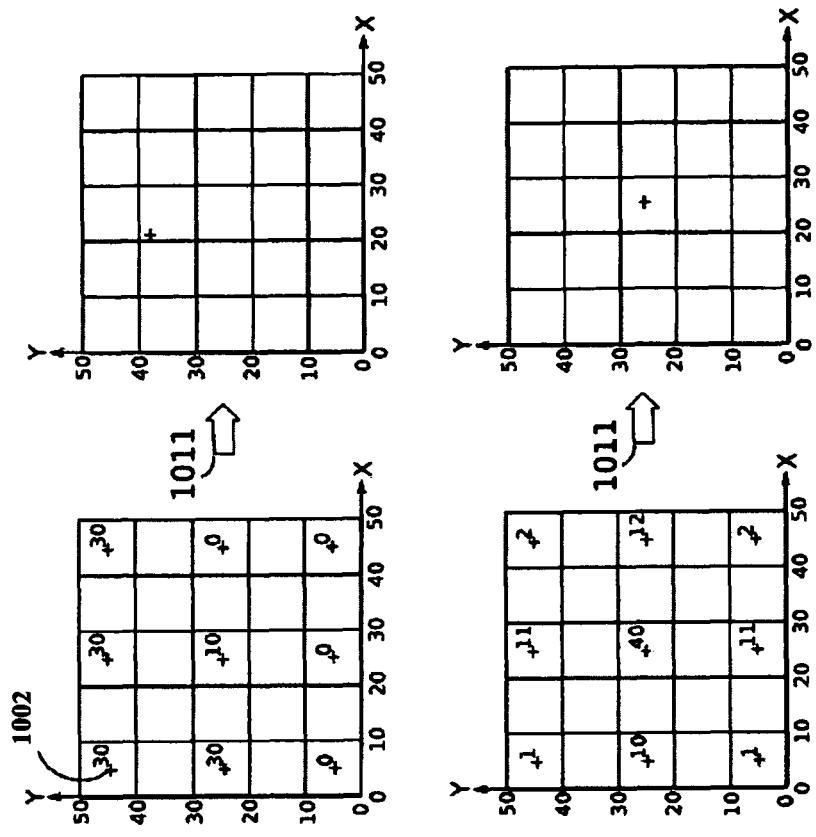
Figure 10E:
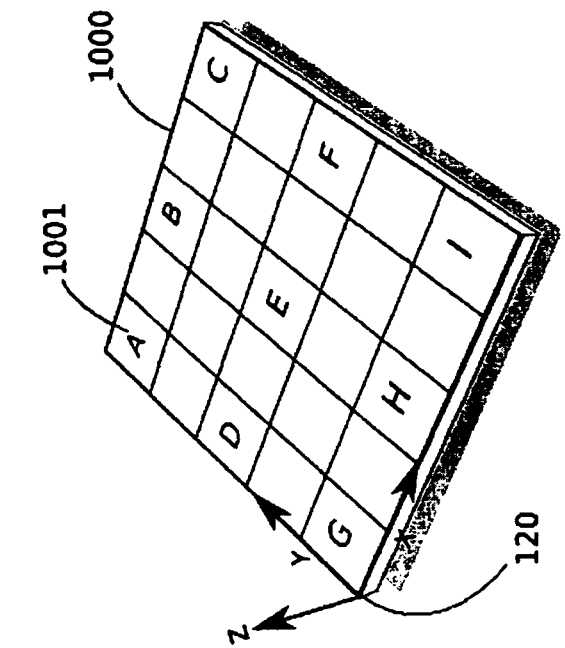

Associated with each match value is an impact location as shown in FIG. 10D. The match vector (1003) has a magnitude represented by the match value and calculated by the equation above and acts at the centroid of the corresponding input site location and perpendicular to the device surface. Therefore each vector has a magnitude (M) and an x, y and z (X, Y, Z) location on the transfer surface. For the 2-D planar surface only the magnitude, x and y parameters (M, X, Y) are required.

A match vector (1003) exists for each input site location. From all these vectors an equivalent match vector (1004) can be calculated.

Calculate Equivalent Match Vector (1011)

For the 2-D case, the parameters of this vector are calculated as:

$$\overline{M} = \sum_i \text{match}(CVP_o, CVP_i)$$

$$\overline{X} = \frac{\sum_i X_i \times M_i}{\overline{M}}$$

$$\overline{Y} = \frac{\sum_i Y_i \times M_i}{M}$$

X_bar and Y_bar are the parameters of the equivalent match vector. This location of the equivalent match vector indicates the interpolated location of the user's impulse (1012). Two examples of equivalent match vector calculation are shown in FIG. 10E.

Modeling

Unimodal vs Multimodal Systems. This interpolation mechanism is modular with respect to the distance metric used. However, with the implementation mentioned throughout this example, a unimodal distance distribution is required. A unimodal distribution is one in which there is a single maximum value in the discrete space (the two examples mentioned in FIG. 10E are both unimodal).

Tests are conducted for each new application to estimate the viability of the previously mentioned interpolation algorithm. Programs have been developed that display the match value overlaid on specific devices. One can quickly see if the distance metric used for that application produces a unimodal or multimodal distribution of match vectors.

Contrast. The same software used to assess the number of modes in the distribution of the match vectors can also be used to assess the contrast between adjacent input site locations. This contrast is indicative of the maximum resolution that can be achieved for a given application.

Contrast is a measure of difference between signals. When adjacent input site locations produce similar signals then it is relatively difficult to discriminate between them. When discrimination between those two points is difficult then interpolation may not be possible.

Linearity. When several input site locations are added between two configuration input sites then match linearity is a concern. A specific distance metric or set of parameters may not be linearly related between two configuration input sites. In order to utilize interpolation in applications in which the non-linearities are extreme, either the operation resolution must be decreased, or the resolution of the configuration sites should be increased, or a new distance metric or CVP parameters need to be chosen. When the CVP values are non-linear between configuration sites, non-linearities can be taken into account in the interpolation of operation sites. Such a scheme requires at least three configuration sites.

Linearity is tested by measuring the match values to all locations as one impacts at several intermediate locations between adjacent input sites. When the output match is linear with respect to the input coordinates then interpolation is a likely candidate for that application.

Design Implications

Multi-modal Systems. One method to address the problem with multi-modal systems is to cluster the match variables prior to calculating the equivalent match vectors. After the clustering has been completed, an equivalent match vector can be calculated for each cluster. The match vector with the largest magnitude can be used as an estimate of where the user applied an impulse vector to the device.

Multi-face Systems. The illustrative embodiments disclosed above involve impulses applied to a single face. "Virtual Button,™" are not restricted to single faces. For example, hand-held devices may have six planar faces. This is not a problem for interpolation techniques as long as the data is unimodal or if considerations for multi-modal systems are made.

Interpolation is most successful when the edges and corners of the transfer site are used as configuration phase input sites. This occurs because the configuration input sites define the application range. For the hand-held device, each face is separately configured by impacting the most extreme input site locations on all six faces of the device.

Summary of Interpolation. The interpolation method of the present invention is based on the concept of the match vector. The match vector is representative of the level of belief that a specific location on the transfer site has been impacted and one match vector exists for each configuration input site. The match vectors associated with each configuration site can be combined into an equivalent match vector that provides an estimate of the impacted input point or region. Interpolation is used to improve the resolution on a given application and/or reduce the time and effort required for system configuration. These advanced algorithms are believed to be a significant element of novelty in the present invention.

Example 6

Advanced Alternative Comparison Solution Techniques

The comparison-solution processes form the core of the present invention whereby user impulses to an array of APs on one or more transfer surfaces are translated into functional or command inputs to control an electronic device or system. Basically these techniques are divided into parametric and non-parametric approaches which are indicated below.

Parametric Methods

Minimum Euclidean Distance (MED). MED is pattern classification method that assumes that data points have a Gaussian distribution in which each of the features/parameters are equally important. This is equivalent to assuming that the data points are Gaussian-distributed as a circle, sphere or hypersphere, i.e., in 2D, 3D or n-D respectively.

In the impulse-input apparatus and method embodiments of the present invention, several CVPs are calculated for each class during the configuration phase. All the data from each class is reduced to a single representative CVP that is the mean of all the CVPs for that given class. The mean CVPs from all the classes then compose the CVP library. During the operation phase, each instantaneous operative CVP is compared to this library and classified to the closest CVP using the Euclidean distance metric.

The advantage of this algorithm is that it is computationally simple and does not require the dynamic storage of extensive data; it also is relatively invariant to noise and outliers.

The decision rule in MED is to choose the class that minimizes the Euclidean distance.

Generalized Euclidean Distance (GED). GED is similar to MED in that it is a parametric pattern classification method. The difference between the two is that GED does not make as many
    assumptions about the distribution of the data in each class. GED assumes that the data points are Gaussian distributed into an ellipsoid. Whereas MED required only the storage of the class means, GED requires the storage of both class means and class variances. Therefore, this method requires more memory. GED is most successfully applied if the data to be classified is Gaussian distributed.

$$d_{GED}(CVP_O) = (CVP_O - \mu)^T \Sigma^{-1}(CVP_O - \mu)$$

The decision rule in GED is to choose the class that minimizes the Generalized Euclidean distance.

Non-Parametric Methods

Decision Tree. The decision tree method is based on making successive intermediate classifications based on specific sensor readings until the final location is determined. The benchmark decision tree algorithms originally developed for "Virtual Button,™" of the present invention required meticulous user interaction during the configuration phase. This method was implemented using a heuristic approach based on the rigid-body motion.

For example, when the device is subject to an impulse upon the front surface, certain accelerometers move in the same direction as the impact. If a particular accelerometer's movement was in the opposite direction, then one can assume that the impact was from the opposite direction (the back). Therefore, this simple algorithm gives a coarse classification. While the decision tree algorithm can be refined even to the point of determining the actual location of an impulse, an example simple algorithm for determining the face of the impact is shown below.

Example Algorithm $f\_i(t)$: normalized, sensor reading from sensor channel i at time t
$f\_1$: accelerometer with axis perpendicular to front face
$f\_2$: accelerometer with axis perpendicular to left side face
$T=t\_maxval$: time when maximum value in acceleration data buffer is experienced if $f\_1(T) > 0.2$
input_face="front"
else if $f\_1(T) < 0.2$
input_face="back"
else if $f\_2(T) > 0.2$
input_face="left_side"
else if $f\_2(T) < 0.2$
input_face="right_side"
else:
input_face="undecided"

Nearest Neighbor (NN) and k-Nearest Neighbor (kNN) alternate approaches. In the nearest neighbour algorithm, the parameters of an input signal to be classified are compared to a set of labeled parameter data. The input signal is classified as belonging to the same class as the closest data point. "kNN" is a modification to the nearest-neighbour algorithm that removes the first k closest data points from each class. To alleviate the outlier sensitivity of the nearest neighbor algorithm, k data points are removed.

Mathematically:

kNN is a non-parametric pattern classification method based on the following rule:

given a reading (CVP) $\bar{x}$ and a distance metric $f(x)$, a reading is said to belong to a class i if $f(x\_i)$ is less then all $f(x\_j)$ for all j, where $x\_n$ is defined as the stored data point (CVP) in class n that produces the k-th smallest value for $f(x\_n)$.

Sequential-combination classification. Sequential classification is an alternative method of coupling two or more of the previously mentioned classification techniques into a series. For example, in one embodiment of the present invention, a decision tree is used to determine which face of a hand-held device is impacted. Subsequently, a kNN classifier is applied to determine which input site was impacted on the selected face.

The advantages of this strategy are that one can use the simple decision tree, which requires very little computational power or memory, to eliminate a large portion of the comparison data. For the final-solution process, computationally expensive but much more accurate algorithms such as kNN, may be implemented on a greatly reduced data set.

Example 7

Size-Scaling Principles for Impulse Technologies

Algorithms to execute "Virtual Button,™" input technology were originally developed with many applications in mind, i.e., small-scale embodiments such as hand-held devices as well as larger scale applications such as furniture and buildings (large transfer surfaces exceeding about 200× 200, mm LW, with typical surface thickness in the range 1 to 100 mm). Initial tests and algorithms were developed on a "thin-brick" hand-held device (about 100×60×12, mm housing LWT), having 6 Dytran single-axis accelerometers mounted internally. Four of the accelerometers were mounted so that their active axes were parallel to the defining coordinate directions of the edges of the device. In the process of implementing the present technology on larger scale devices, the significance of reliable scaling methods was realized at an early stage. Testing was executed on a transparent "white board" consisting of a glass sheet mounted in a wooden frame. This example identifies the differences between the configuration and performance phases for large and small embodiments and illustrates the types of algorithm modifications being implemented for upscaling from a small prototype.

Differences between Small and Large Device Applications

Physical Differences. One intuitively expects a "thin-brick" hand-held device and a "white board" to behave differently when impacted by a user. The former is held in the hand and thus undergoes more edge- and surface-contact damping than the white board device. In general, primary movement experienced by the accelerometers in a "thin-brick" is due to its rigid body motion. In contrast, the motion sensors of the white board experience mainly vibration; therefore, one expects to see stronger, sustained vibration modes and less damping reflected in the MS signals.

Care must be taken that the transfer surface, 2, of the larger device is mounted with optimal damping provisions. The sensors were mounted on the glass sheet but impacting the glass sheet would cause loose bumping contact between the glass and the wooden frame. By firmly attaching the glass sheet to the heavier wooden frame, the mass of the measured device along with the damping were increased substantially. The resulting signals were much more consistent from one impulse event to the next.

Signal Differences. Signal profile differences call for advanced techniques for handling of analytic features that establish the CVP. The benchmark algorithms used on early embodiments of the present invention focused upon peak values, especially the initial peak, and did not include specific arguments for modeling different levels of housing damping. In general, they included this and spatio-temporal information, i.e., readings from all sensor channels during the maximum peak value of the most significant sensor channel. The CVP parameters are usually extracted from the initial peak for both small and large embodiments.

AP resolution scaling between embodiments. Tests on "thin brick" versions have shown good performance with input site boundaries formed as a continuous, 4-gon array with 4,2 the typical edge length in the range of 15 mm. Analogous testing on a larger transparent "white board" embodiment have shown excellent performance with the AP array being a continuous, square, 4-gon grid of about 100 mm edge length.

Advanced algorithms. When scaling from a small device to a larger device, modifications to the algorithms are made in the filtering stage as well as the thresholding stage. The filtering stage of the larger device is less aggressive than the smaller device. The "thin brick" device is subject to arm motions, typically at low frequency. These low frequency motions must be filtered out to avoid erroneously setting off the trigger threshold. Motions of this type are not experienced in most large-device embodiments. As a result, the low-frequency cutoff for the small device is at a higher frequency.

Early in development of the present invention, an input impulse is analyzed if and only if a relevant accelerometer channel value surpasses a predetermined trigger-threshold level. After this event is signaled, accelerometer data is pushed into a constant width buffer with a specified number of pre-trigger data and post-trigger data. When upscaling, the signals change and thus values such as buffer length, number of pre-trigger samples, number of post-trigger samples and threshold level are modified in the algorithm.

Preliminary experiments suggest that it is possible to generalize filtering, thresholding and triggering algorithms such that they are reasonably application and scale independent. These characteristics reduce configuration time since the user does not have to make manual adjustments to the threshold values or input buffer length. Instead, algorithms decide the proper threshold values and acceleration data buffer length. Advanced acceleration data buffer extraction algorithms include the ability to reject bad impulse inputs based on shape instead of threshold testing alone. These routines discern whether impulses which are closely spaced in time at about the same transfer-site location are one or two inputs.

Example 8

The distal portions of the human index finger are effective as a stylus for application of impulse commands to an electronic device. This example focuses upon typical size characteristics of the hard tissue (fingernail) and the soft tissue (fingertip) and the effect of tissue dimensions and mechanical properties upon performance of impulse input embodiments of the present invention.

Fingertip soft-tissue impulse area/intensity. The data table immediately below shows illustrative anthropometric data for the fingernail and fingertip.

Anthropometric Data, Adult Male Humans:
Source-Buchholz, 1991

|  | Hand | | Index Phalanx length, mm | | | Index phalanx depth, mm | | |
| --- | --- | --- | --- | --- | --- | --- | --- | --- |
|  | length, mm | width, mm | Proximal | Middle | Distal | Proximal | Middle | Distal |
| Minimum | 158.8 | 79.4 | 42.8 | 29.7 | 16.9 | 16.8 | 14.6 | 12.4 |
| Mean +/− sd | 183 +/− 5.1 | 101 +/− 3.7 | 49.3 | 34.2 | 19.5 | 21.4 | 18.9 | 15.8 |
| Maximum | 209.6 | 117.5 | 56.5 | 39.2 | 22.4 | 24.9 | 21.6 | 18.3 |

As can be seen from Bucholtz's anatomical data, the size range of the adult human index fingertip soft tissue can be modeled as a hemisphere-tipped, elastomer cylinder about 12 to 18 mm in diameter and having a hardness of 30-60 on the Shore-A durometer scale. Resolvable impacts with such a soft, rounded stylus therefore require an AP polygon size of about 25-30 mm edge length and centroid spacing. The coefficient of friction between the fingertip skin and the TSM surface under typical office environments (23C, 40% RH) is high enough to avoid slipping during the instant force is being transferred, even at oblique theta angles (about 10-20 deg) for the impulse vector.

Figure 11:
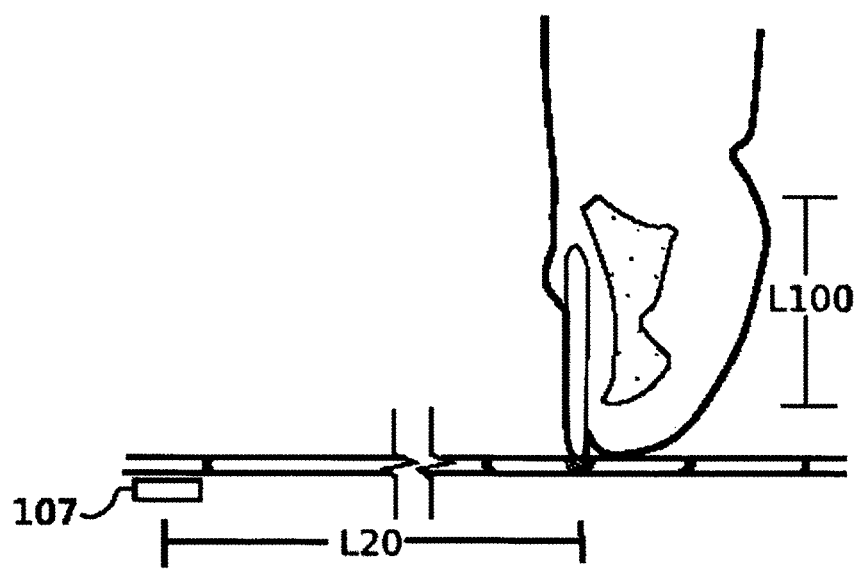

FIG. 11 shows a sectional view of a contact situation between a user's fingernail and the transfer surface. This case applies to deliberate use of natural or bonded-synthetic fingernail to achieve an impulse transfer. The distal phalanx length, (L100) is shown to give an indication of the scale of the drawing; this value is about 17 to 24 mm as shown in the tabular data above. The length L20 represents the typical distance from the point of fingernail contact to an adjacent motion sensor. This particular spacing corresponds generally to the distance 6,12 shown for MS devices in Table 3 and in FIG. 1F. For the thin shell shown, the application of an intense impulse produces compression stresses in the immediate area and elastic flexure of the shell. These effects are detected by the "Virtual Button,™" array of MS devices, typically 4 to 6 three-axis accelerometers, the coordinate origins of which are spaced apart at typical distances of (6,10 see TABLE 3), which falls in the typical range of 10 to 2000 mm. Components of the MS array also detect some of the Chladni modes.

Example 9

Embodiments with Unique, Stiffened Impulse-Transfer Surfaces

For certain embodiments of the present invention it may be desirable to control the localized mechanical characteristics of the impulse-receiving surface (TS) in specific zones/quadrants or in local areas adjacent selected ngons. For a shell-type surface larger than about 50 mm in any direction, these changes are accomplished by configuring the impulse transfer surface to include stiffeners in the form of molded-integral ribs, high-modulus mold inserts and externally-attached or bonded stiffening components. Certain of such elements may also be on the exposed surface, e.g., surface features or texture patterns such as a grid or ribs (uniform-section or length-tapered bars or rods) of defined length, oriented in one or more particular directions and their axes spaced apart by specific distances.

FIGS. 12A-D, 13A and 13B show some selected apparatus embodiments with reinforcing ribs (1210, 1260, and 1310) that modify the response characteristics of certain surfaces (1200, 1250, and 1300).

By prudent materials-selection and advanced design, rib-like elements can be used to optimize the frequency of impulse-excited plate vibration modes of the TS. The size of the spaces between the "ribs" can be optimized for enhancing plate vibration modes in selected frequency ranges and/or suppressing modes in other defined frequency ranges. For example, the material properties as well as the thickness and depth of the ribs is designed so as to induce the vibration modes in or above certain frequencies of interest.

Figure 12A:
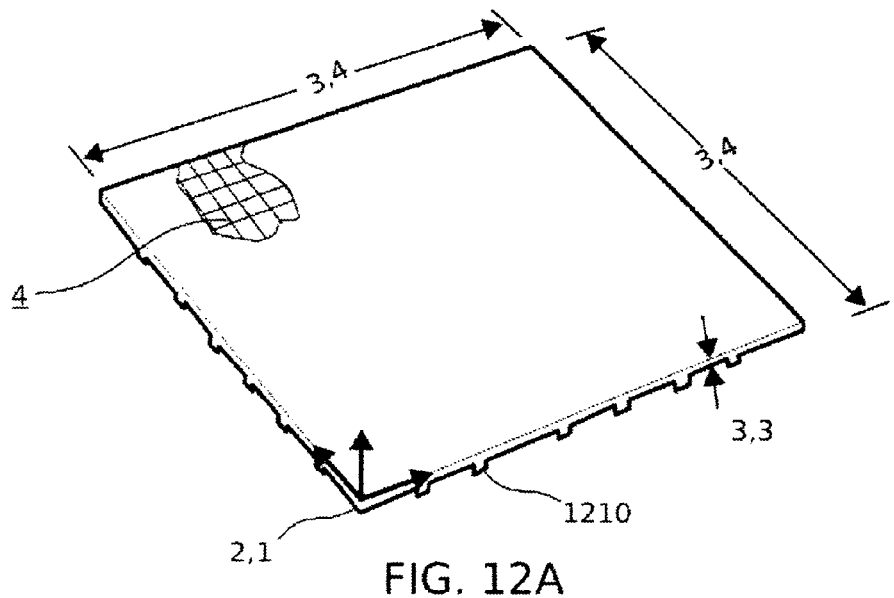
FIG. 12b Bottom View of Typical Grid-Stiffened Transfer Surface Showing Exemplary Angles, Spacing Distances, Placements of Motion Sensors and Ngon Locations FIG. 12c. Section AA (see FIG. 12b). An Exemplary TS Cross-Section Showing Molded-Integral Stiffening Ribs FIG. 12d. Perspective-Edge-Sectional View of Exemplary 3D Curved Impulse-Receiving Surface (TS) with Formed-Integral Stiffening Ribs FIG. 12e. Isometric Cut-Away Sectional View of a Thin, Impulse Transfer Surface with Parallel Stiffener Ribs FIGS. 13a and 13b. Zeroth-Order Free-Body Diagram and Vibrational Characteristics of a TS Portion with and without Stiffening Elements FIG. 14A. Desktop Monitor (1401) with 2D-Curved Display Surface for Impulse Transfers FIG. 14B. Forearm 3D-Curved Display Surface for Impulse Transfers FIG. 14C. Isometric View of 3D-Curved Display Surface for Impulse Transfers with Integral-Dual Straps FIG. 14D. Plan_Top View of 3D-Curved Display Surface for Impulse Transfers FIG. 14E. Front_Elevation View of 3D-Curved Display Surface for Impulse Transfers FIG. 15A. Isometric View of Impulse-Interactive Table with Extended Transfer Surface, Continuous Ngon Mapping of Active Flat Surface and Motion Sensor Array FIG. 15B. Isometric Cutaway Section View of Impulse-Interactive Table Corner Edges with Discrete and Continuous Ngons FIGS. 16 A,B. Front and Side Views of Stringed-Racquet Embodiment with Integrated Impulse-Vector Sensing Technology FIGS. 17A,B. Isometric View of Vehicle Console with Extended Transfer Surface, Continuous Ngon Mapping and Motion Sensor Array FIG. 18. Impulse-Adapted Hockey Game Display with Live Puck Shots
Figure 12B:
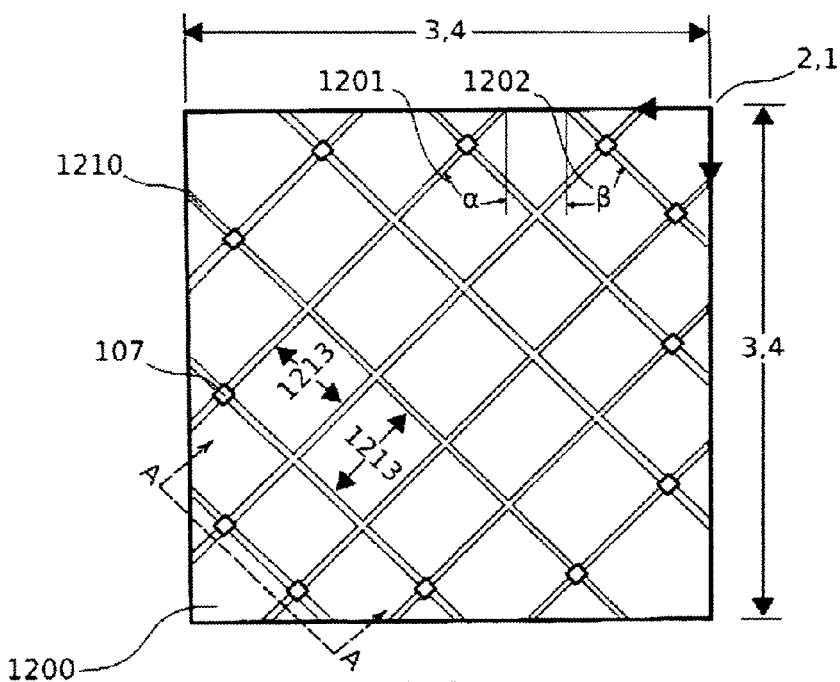
Figure 12C:
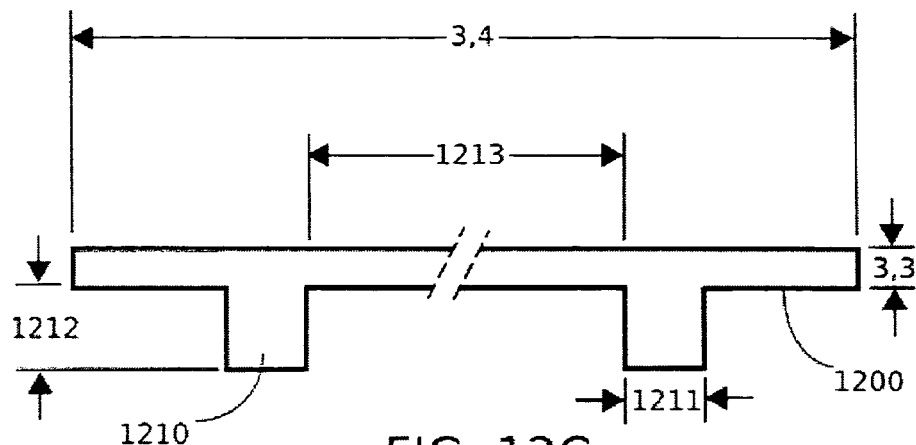
Figure 12D:
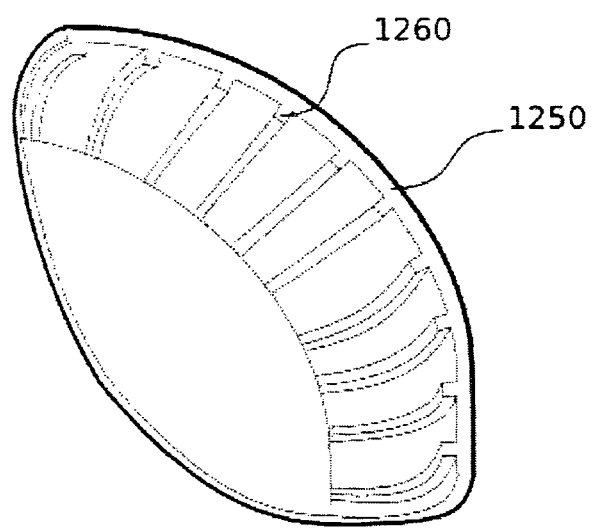
Figure 12E:
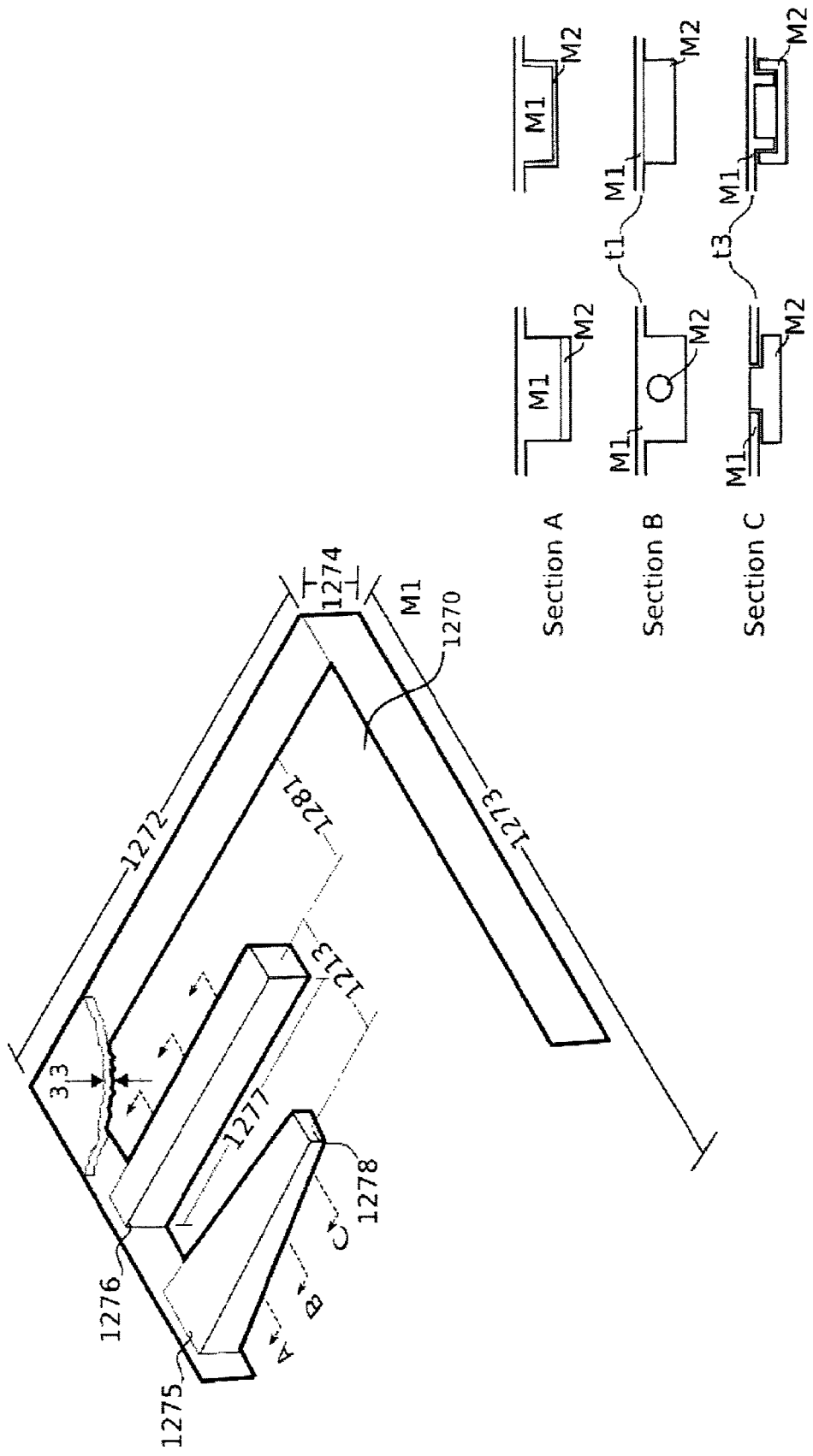

As shown in FIG. 12b, the alpha and beta angles of the rib axes relative to the x-axis of the Cartesian coordinates (a defining edge) are independent values falling generally in the range 0 to 90 deg. Adding mechanical stiffeners can be an effective way to increase the natural frequencies of a the impulse transfer surface. For example, the first few natural frequencies of a 300 mm square polycarbonate surface (E=2.38 MPa, density=1200 kg/m^3, Poisson's ratio=0.3) with clamped boundaries that is 5 mm thick are 4.3 Hz, 8.7 Hz (both the 2-1 and 1-2 mode shapes are at this frequency), 12.9 Hz and 15.7 Hz.

By adding a rectangular-grid array of substantially-parallel stiffeners as shown, the natural frequencies of the overall mode shapes of the entire TS will be increased, roughly proportionally to the average thickness increase of the original shell-type surface. This knowledge facilitates designed overall TS plate modes of vibration in the frequency range of interest, typically 25-200 Hz.

With the pattern of stiffening elements as shown in FIGS. 12a and 12b, each of the parallelogram-sections will behave like a small square diaphragm that is edge-clamped to the surrounding rib element. The natural frequencies of these squares will be higher than the original square, and for a spacing of 60 mm the first few natural frequencies will be at: 107.2, 218.7, 322.6, and 392 Hz. By placing the elements even closer together, at say 20 mm, the natural frequencies can be pushed up so that the first few are at 965 Hz, 1968 Hz, and 2904 Hz. If the effect of the diaphragm modes of vibration are considered to be only noise, then these can be configured to be above the lower cutoff of a bandpass filter, or the cutoff of a low-pass filter. If the effect of the diaphragm modes is considered to be important for the "Virtual Button™" implementation, the natural frequencies of each of the squares can be designed to be slightly different, by changing either the thickness of the surface, or the spacing of the rib axes, so that certain frequencies of vibration excited will be characteristic of certain locations of input. This enhancements help in locating an impulse input upon a surface.

In one embodiment of the present invention, the local plate bending modes between the ribs (1210) are configured to be at frequencies which do interfere with the overall plate modes of the entire surface (1200).

In another embodiment of the present invention, it is desirable to have the local plate diaphragm resonances for the relatively-thin zones (defined by the spaces between the ribs (1210)) to be in just the right frequency range so that the signals coming from the plates, through the ribs and to the sensors (107) can be precisely analyzed. One method of overcoming possible spurious excitation of distant zones is to configure each to a different size so that their natural frequencies are slightly different.

In another embodiment, the contribution of the frequency of the plate diaphragm modes can be made negligible by adding stiffeners (1310) to the plate (1300) (FIG. 13*b*) in order to increase the plate diaphragm resonance to a very high frequency. The dominant frequencies which may be picked up by the sensors after the stiffeners are added will be the resonance of the particular element and these can best be detected by placing a sensor at its distal portion.

Figure 13A:
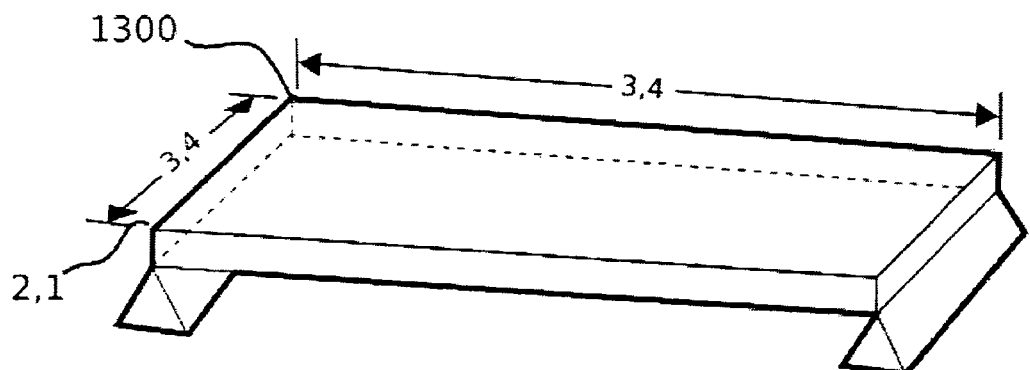

Assuming that the plate (1300) in FIG. 13A is polycarbonate with a Youngs modulus of E=2.38 MPa, a density of 1,200 kg/m^3, and a Poisson's ratio of 0.3. This plate has a long dimension of 3,4, a short dimension of 3,4, and a thickness of 3,3. Calculations were performed with the long dimension of 3,4=50 mm and the short dimension of 3,4=20 mm, and 3,3=2 mm. Natural frequencies of the example shown were calculated using formulas found in Robert Blevins classic text "Formulas for Natural Frequency and Mode Shape, Krieger Publishing, 1979. The natural frequency of the first 3 plate modes of vibration for this simply-supported, free, simply-supported, free plate were found to be 16.3, 57.7, and 65.8 Hz.

Figure 13B:
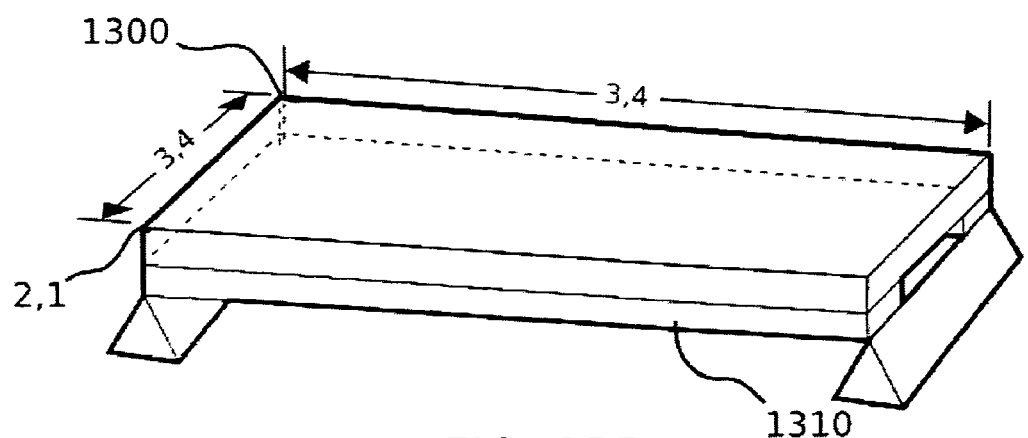

By adding two polycarbonate beams (1310) on each of the free sides of the plate as in FIG. 13B, the natural frequencies of vibration are dominated by the beams themselves, which have the first three natural frequencies of 80.8, 323.1, and 727.0 Hz as calculated by the above-noted formulas for a beam. The plate itself now becomes clamped on each of the sides attached to the beams, and remains simply-supported on the other two ends as in FIG. 13B. The first three frequencies of the plate are calculated as 2,791, 3,160, and 3,879 Hz For this exemplary embodiment the thickness of the surface (a) is 5 mm. The dimensions (1211) and (1212) of the ribs are 5 mm; the ribs are square in this example. For selected embodiments, the stiffener-section will be unique molded-integral geometry such as: square, hollow box, channel. Generally, the value ranges of stiffener dimensions (1211) and (1212) are 0.1 to 20 times the section thickness. For certain embodiments, stiffeners of another material with different moduli are used. Likewise, the axis spacing of stiffeners falls in the range 5-1000 times the shell thickness. The width (1211) and depth (1212) of a specific stiffening rib (1210) is designed to induce a range of particular vibrational modes in the particular surface being designed. Depending on application and manufacturing considerations, the ribs can be manufactured as part of the surface, or they can be attached to the surface in a separate manufacturing step. The indicia relative to stiffened surfaces and "rib" geometry illustrated in this example are numbered 1200 to 1310 and are defined in TABLE 4A.

For this exemplary embodiment of "ribs" on the bottom surface of a 3D curved TS, the stiffeners are shown as integral, meaning formed of the same material. For selected applications, it may be desirable to form the stiffened TS surfaces by non-molding/non-casting methods such as swaging, stamping, extrusion, vacuum forming, etc. All indicia of FIGS. 12*a-d* are defined in TABLES 3 and 4a. The stiffener This exemplary embodiment illustrates an alternative TS configuration with a thin impulse surface of thickness, t (0.5<t, mm <10), bounded by lateral defining edges, D1 and D3 (20<D1, D3, mm <5000) and vertical corner-intersection edges D2 (5<D2, mm <100) and provided with parallel, rib-type stiffeners extending from one bounding edge in a direction substantially perpendicular to that edge. The length, 1 (ASCII ch. 108), of the stiffeners is falls in the range of 0.1 to 1.0 of D1; optionally, certain stiffeners may extend across the full length of D1 and be mechanically connected at both ends to the respective bounding-edge elements. As shown, the stiffeners are either in mechanical contact with the impulse surface or molded integral with it. The shorter stiffener is shown as a cantilevered rib with a linearly-tapered cross-section [minimum tip area=a2] (0.2.times.a1<a2, mm2<0.9.times.a1), which extends a portion of the length of D1. The longer stiffener is shown with a uniform section [constant area=a1, mm2] (4<a1, mm2<100) along its full length. Stiffeners are typically spaced a distance, S1, apart (5<S1, mm <100); the typical wall spacing of the closest rib axis is S2 (5<S2, mm <20). The three section views illustrate several alternative embodiments of rib structure and its makeup of two different materials.

Section A (left) illustrates formed-integral rib of material M1 with an attached strip of bonded material M2 with selected mechanical properties (density, TYS, modulus). Section A (right) illustrates the application of a channel-form element of a different material M2 with selected mechanical properties.

Section B (left) illustrates a molded-integral rib with a mold-inserted element of another material M2. Section B (right) illustrates a mechanically attached stiffener rib of material M2 fixed under the surface.

Section C (left) illustrates a mechanically-attached stiffener rib of material M2 under the surface; in this embodiment the stiffener is provided with short posts which extend into the surface portion for maximum shear coupling with the rib. Section C (right) illustrates a mechanically-attached stiffener rib of material M2; in this embodiment two close-spaced integral ribs engage a channel-form component of a different material.

The vibration modes of a flat plate (1200) can be modified by adding an array of stiffening ribs (1210). FIGS. 13a-b show a simplified model to illustrate this effect quantitatively. A defined array of stiff ribs will increase the frequency of the response of plate vibration modes across a typical square plate w. 300 mm edges.

The spacing of the ribs is optimized for inducing plate vibration modes in frequencies of interest, both for the entire square TS, and also for smaller parallelogram-zones between the ribs, into a range of frequencies of interest. The frequency range of interest is typical on the order of 30 Hz to 1000 Hz. In general, the lower the frequency, the higher the amplitude of the vibrations for the mode of interest, and the more distinct will be the readings from the sensors. The higher the frequency, the quicker will be the response from the sensors. For instance, for a frequency of 64 Hz, the CVP that results from the first peaks of each of the sensors will be read from the sensors about 0.016 s after impulse; this leaves an interval of 0.084 s for the CPU and microprocessors to determine the characteristics of the command impulse and provide a response to the user.

Example 10

Alternative Embodiments with 2D- and 3D-Curved Impulse-Transfer Surfaces

Figure 14A:
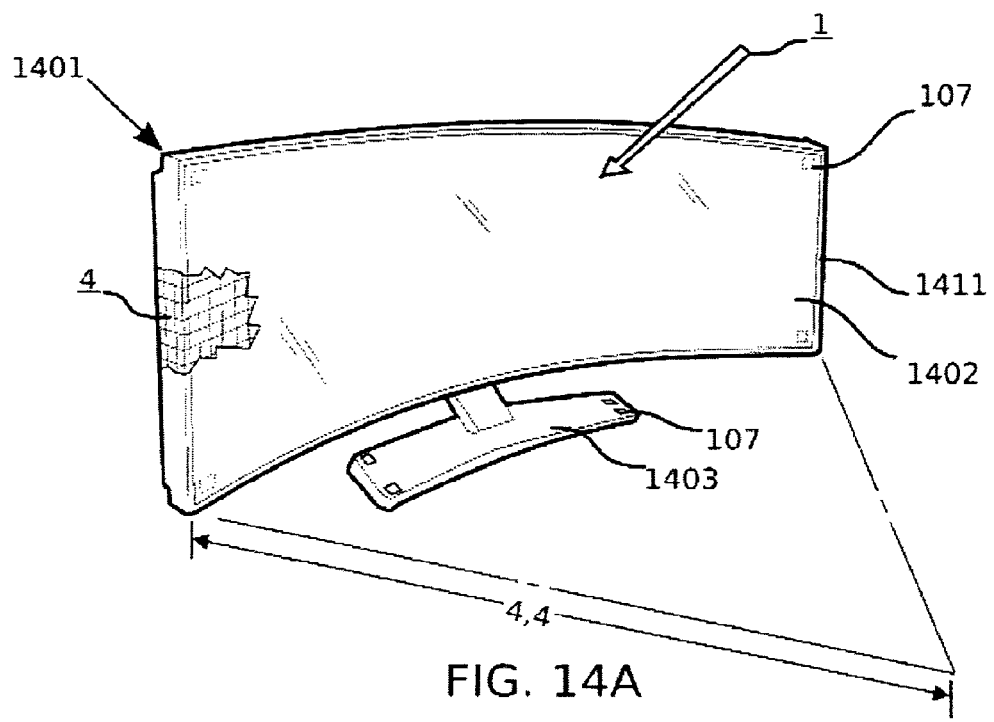

Both convex and concave display surfaces can be configured with "Virtual Button™" enhancements to allow user inputs by means of an impulse vector (1) applied to: (a) the main front viewing area (1402), (b) the back portion of the enclosure, (c) the edges and frame including the front and the sides of the edges and frame (1411), and (d) the supports/base (1403). In general, the motion sensors are rigidly mounted on the support structures immediately behind the front face and adjacent the display margins and the resolution of activatable polygons dictates the placement and number of motion sensors needed. As illustrated in FIG. 14a, both front and back exterior curved surfaces, as well as all the edges, are impulse-enabled by means of a coordinated array of motion sensors. The cylindrical or spherical radius of curvature (4.4 or 4.5) are defined by the design of the display monitor, but a typical large screen (diagonal measure in the range 1.00 to 3.00 m) display monitor will have a radius of curvature around 12 m. The supports/base can also be coordinated with the same array to be impulse enabled with the "Virtual Button™" concept.

Figure 14B:
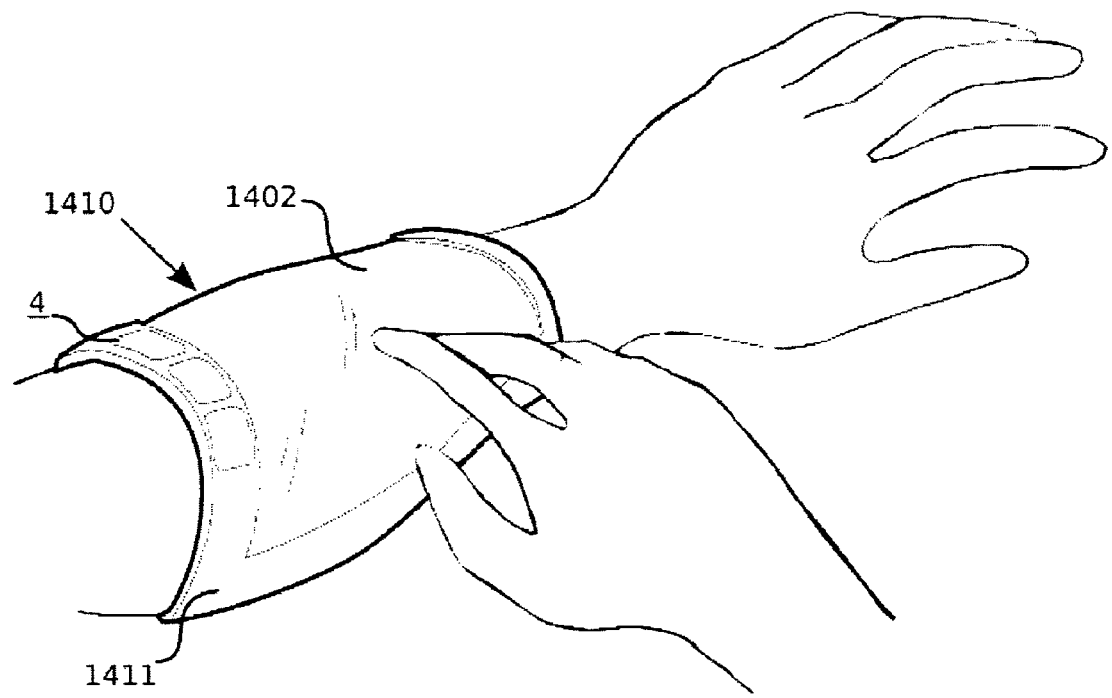
Figure 14C:
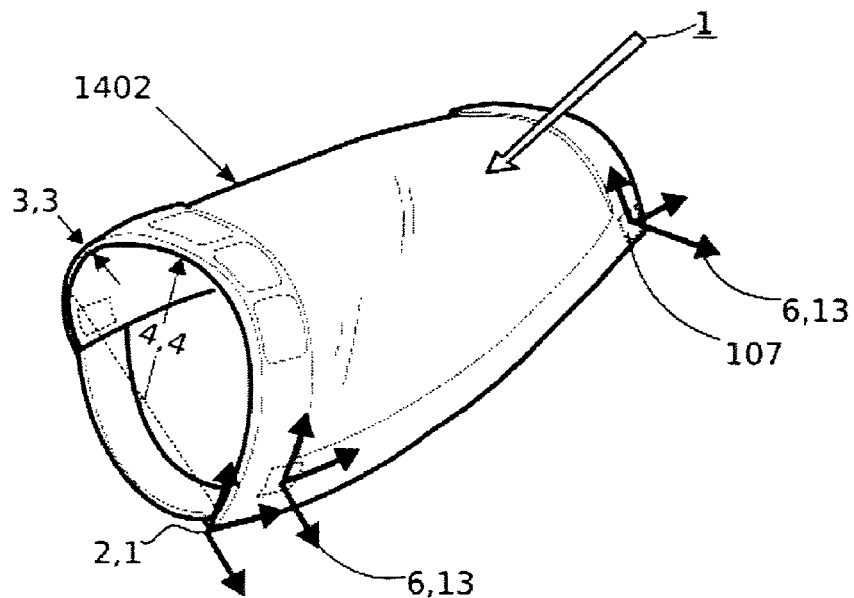
Figure 14D:
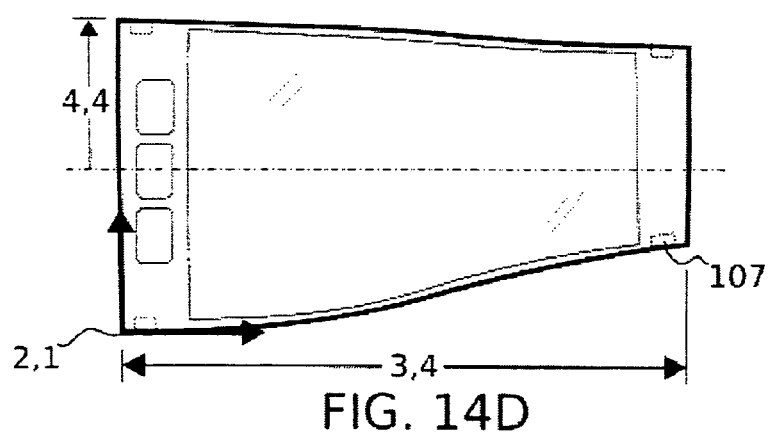
Figure 14E:
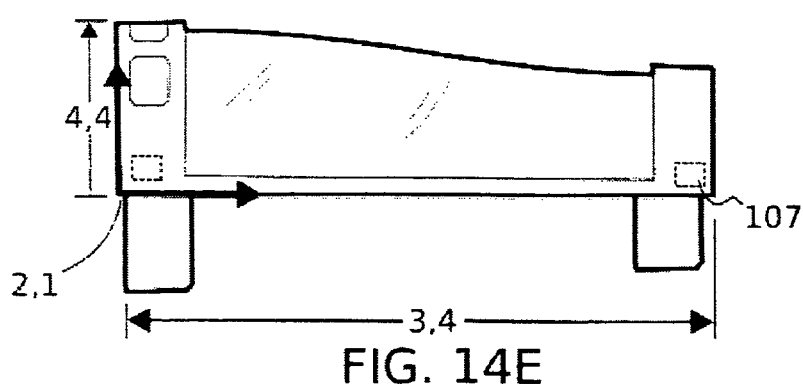

FIG. 14B illustrates a compact computer and display screen (1410) configured as an anthropometrically curved device which wraps around the human forearm and is secured to the limb by: (a) one or more known wrist straps or (b) a customized "picture-frame" cargo pocket formed in a sleeve of the garment being worn by the user. This particular version illustrates a convex impulse-transfer display surface (1402) being impulsed by the opposite hand of the user as well as some activatable polygons (4) on the frame (1411) of the device. The cylindrical or spherical radius of curvature (4.4 or 4.5) are defined by the design of the compact computer (1410) and may typically be 50 mm for an arm worn computer. The frame material may be by way of non-limiting example: but not limited to, a polymer, metal, alloy, composite. The armband material may be by way of non-limiting example: leather, rubber, cloth or elastic. A variant of this is a pivoting, thin-cylindrical-shell computer embodiment with displays on both its obverse and reverse faces and supported with its convex surface facing outwards (closed position, obverse exposed) and pivotable about its long edge in a known wrist-secured frame to present the concave backside face and impulse surfaces (open position, reverse exposed). Such frames are known for classic pivoting watches having two time-display faces.

The wearable versions illustrated may have OLED (organic light emitting diodes) curved displays, which are configured into flexible and/or curved surfaces. Advanced impulse-command features of the present invention are incorporated into all faces and edges of such units for maximum user friendliness. For instance, the frame and the parts of the compact computer that are used to secure the device to the limb may also have activatable polygons.

Naturally, other transfer surfaces can be used, and the "Virtual Button™" concept is not limited to curved surfaces that also have a display surface. The supports/base (1402) of the monitor may also be a curved surface without a display that can be activated with an impulse vector (1). Illustrative curved surfaces for user interaction which may be activated using advanced techniques of the present invention include: curved office-stationary monitors and displays, the curved case surfaces around the edge of a wearable watch or timer, the curved surfaces of consumer electronics devices and medical electronics devices such as those discussed above.

Example 11

Impulse-Vector Augmentation of Touch Screens

The impulse-sensing configurations of the present invention provide significant enhancement of the user interface by providing data on impulse inputs into activatable polygons (4) mapped onto a traditional touch-screen. The intensity, direction and duration of each input-impulse is assessed with the "Virtual Button,™" apparatus and firmware algorithms; similarly the contact coordinates of each impulse are also determined. This facilitates "matching" or corroborating of signals from a classic touch-screen system and leads to boosting the "intuitiveness" of the interface, allowing the intensity of the impulse to help determine the response of the computer. Embodiments of the present invention are configurable to discern selected characteristics of input impulses including: force range/level, direction vector angles_arc-ranges and the force-time parameters, e.g., integrated area in each threespace base-vector component.

An augmented touch screen device may be a capacitive, resistive, surface acoustic wave, or pressure sensitive, touch-screen, but impulse augmentation is not limited to such types. Ideally, compliant supports are utilized under the table to permit sufficient displacements in response to applied command impulses.

For example, an impulse-augmented classic touch-screen allows the user to navigate within a map display by applying a distinctive impulse, i.e., at a selected angle Are the surface, of a selected force range, for a selected time duration, to accomplish a controlled "zoom" and "pan" of the displayed image.

Similarly, if the activated control ngons for audio volume or acoustic-spectrum profile receive vector impulses of the present invention, these advanced commands make the interface significantly more "user friendly",e.g., a relatively high-force impulse applied with a fingertip or other pre-elected alternative object in the predetermined "max coordinate direction" causes the volume to be increased a preset large increment or, by an alternative command logic, to the preset default maximum value. Similar provisions are available for the audio spectrum and a "max-type" impulse would reset to the predetermined "extreme" profile. Such augmentations also cover viewing controls such as brightness and contrast along with other features of any particular "touch screen" display.

Figure 15A:
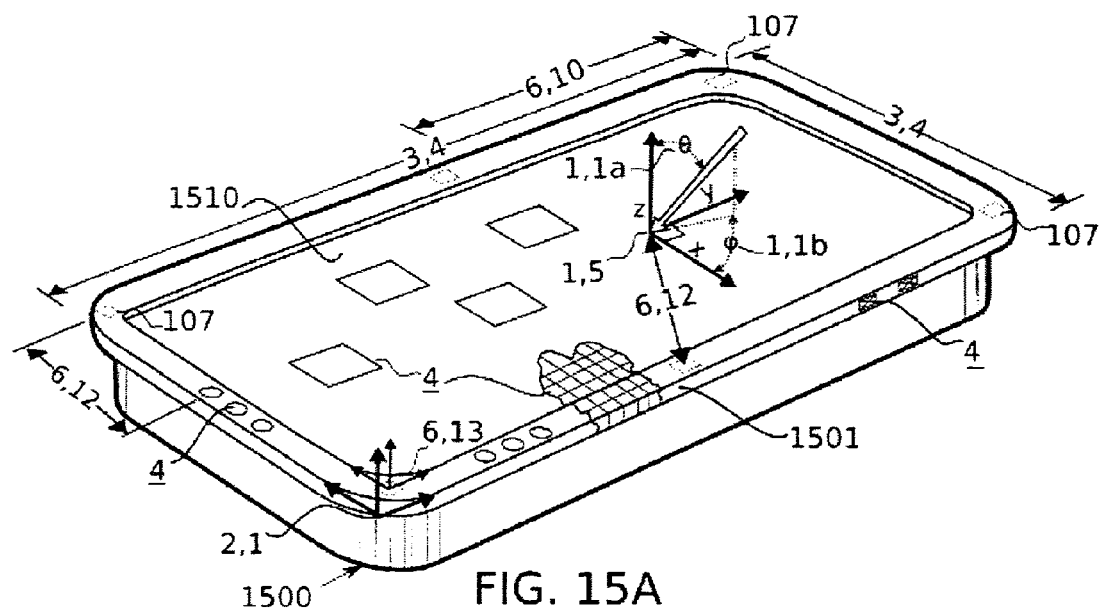

The "group-dynamic-engagement" table shown in FIG. 15A illustrates how the "intuitiveness" of a known back- or forward-projection visual-display surface can be significantly improved using apparatus of the present invention. Using systems described above, the table area illustrated is mapped into an array of ngons sensitive to displacements and deflections of the table due to mechanical impulses, 1, which are applied by individual participants; such impulses are typically applied by a fingertip or other designated implement striking the surface. Impulses are typically applied by means of a fingertip oriented at a selected angle re the surface and directed with a predetermined force for a predetermined time duration. As illustrated, the impulse-enabled table is provided with an array of motion sensors (107). Each of these sensors is: (a) located at a critical place along the table periphery, (b) mounted in firm contact with the table structure and (c) fixed with its motion-sensitive axes oriented in particular directions. The vector distance on the table surface between a particular contact point (1,5) and a particular sensor is indicated by (6,12). By placing motion sensors (107) such as the Freescale MMA7450L in the frame (1501) around the display of the table (1500) that has a traditional touch-screen device surface (1510), impulse-command apparatus of the present invention can be used to augment the capabilities of the traditional touch-screen device. Activatable polygons, AP, are illustrated as discrete individual 4gons, 4, and a cutaway portion which indicates continuous-mapped 4gon grid across the surfaces.

Figure 15B:
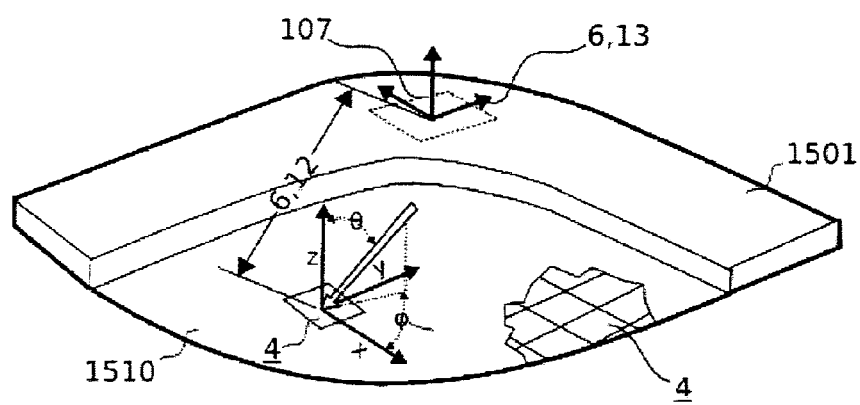

FIG. 15B is a close-up showing a sensor (107) with its active axes in the mounted into table frame close to the edge of the touch-screen. This view indicates apparatus structural details relating to the impulse vector, sensors, 6, and the separation vector (6,12) between the impulse origin (1,5) and the nearest sensor.

Example 12

Ball-Sport Striking Implements

The impulse-vector sensing and characterization techniques of the present invention offer opportunity for significant improvements in player training devices for situations where the "ball sport" involves a player using an implement such as a racquet, bat, paddle, club, etc., to strike a ball. According to the present invention, a game-optimized array of multiple-axis accelerometers is provided into the striking implement to sense selected key parameters of its movements. These factors include: (a) the stroke style, including: threespace trajectory, velocity-time data and the instant of impulse-contact along with (b) the instantaneous direction vectors of both the ball and the implement at the moment of contact. Such an optimized array may also be customized for diagnosing specific player problems by selection of particular sensors and their unique positioning/orientation. Such an optimized array may also be customized for diagnosing specific player problems by selection of particular sensors and their unique positioning/orientation; in this way stroke biomechanics can be differentiated from stroke timing.

Embodiments of such devices use one or more special-dedicated, three-axis accelerometers in order to measure the direction of the gravity vector during the stroke. By analyzing the direction of the gravity vector at the moment of ball contact, it is possible to determine the implement's specific angular orientation in threespace, and from that, whether the stroke is optimally timed.

Figures 16A, 16B:
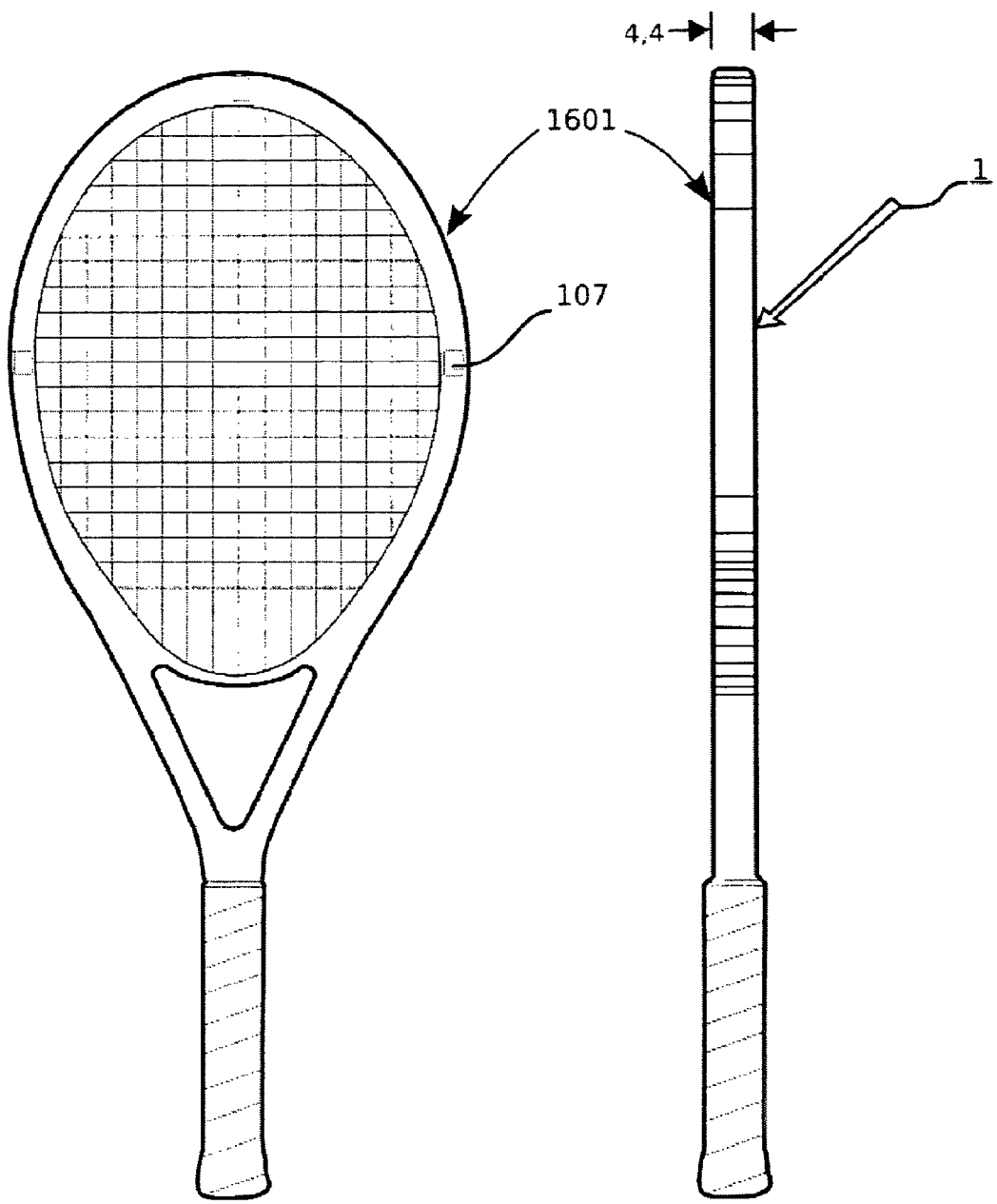

In a stringed-racquet-implement embodiment such as illustrated in FIGS. 16A and 16B, motion sensors (6) are placed at key locations around the edge of the training racquet to measure its instantaneous deflections and displacements, especially data from the sampling frames just pre- and post-the ball-impulse (1) instant. From these data, the impulse-transfer location and the time extent of the active forces are accurately inferred. In these figures, the impulse-transfer surface (TS) for an optimal stroke is generally the center of the implement portion defined by the substantially-planar grid of orthogonal tensioned strings of known elastic properties. For maximal return-shot power and return-trajectory control, the optimal impulse vector, IV (1), of the tennis ball falls is generally perpendicular to the center of percussion of the particular implement. Polar coordinates representing the direction vector of the center of mass of the incoming ball are determined re the basis vectors of the TS origin. For convenience in this example, the origin of the TS transfer coordinates is located at the centroid of the string-grid portion; the x, y and z coordinates as well as axis-orientations of the particular motion sensors are defined by the by standard Cartesian basis vectors from this point, i.e., x and y=orthogonal string axes and z=grid-normal.

Tests of an impulse-enabled squash racquet (HEAD Ti Demon) confirm that the present invention is easily adapted to prepare a useful squash-training implement. Four, single-axis Dytran accelerometers were firmly fixed to the frame edges at approximately middle locations on top, bottom and both sides. Initially the stringed portion was configured by dropping a regulation squash ball from a vertical spacing of 0.5-1 m, onto 2-4 selected locations of the stringed portion (each with specific x and y values). This configuration phase included 4-5 test drops to defined locations on both faces to evaluate whether there might be any possible asymmetry of the frame or stringing; no such effect was found. Additional preliminary experimentation on the configured racquet indicates that that the point of impact of a dropped ball traveling at low velocity substantially perpendicular to the stringed portion of a squash racquet can be localized to a circular area approximately 100 mm diameter.

Over the course of a training session, the player may build up a frequency map of impact locations to examine characteristics of particular stroke styles, e.g., consistently striking the ball low, high, early, late, etc.

Using the apparatus designs disclosed above and illustrated in this example, "Virtual Button,™" technology is easily implemented into a myriad of unique diagnostic ball-striking devices which are extremely useful to analyze critical aspects of a player's technique. For example, a database of impulse-contact locations can also be analyzed statistically, e.g., against those of an instructor or over the course of training sessions.

Example 13

Vector-Impulse Embodiments for Vehicle Controls

The impulse-vector sensing and characterization techniques of the present invention offer opportunity for significant improvements in vehicle controls, especially navigation/safety settings, climate-control values and entertainment-system parameters. According to the present invention, a cabin-configuration-optimized array of multiple-axis accelerometers is provided to sense selected temporary or default operational preferences as input by a fingertip vector impulse provided by either the driver—or possibly by a front-seat passenger—to a defined ngon. Advanced vector discrimination techniques inherent in the "Virtual Button™" technology enable the underlying control algorithms to discern: (a) which ngon was targeted, (b) whether the particular vector impulse emanates from the driver or the passenger and (c) to display an alert prompt for immediate confirmation in certain critical ngons-situations.

Such embodiments use one or more special-dedicated, three-axis accelerometers in order to measure and store the direction-change pattern of the gravity vector in the time frames immediately adjacent the impulse event. By this provision, instantaneous vehicle and driver passenger movements—as would be experienced in a corner, skid, bump, or other violent maneuver—do not result in spurious or unanticipated input commands.

Figure 17A:
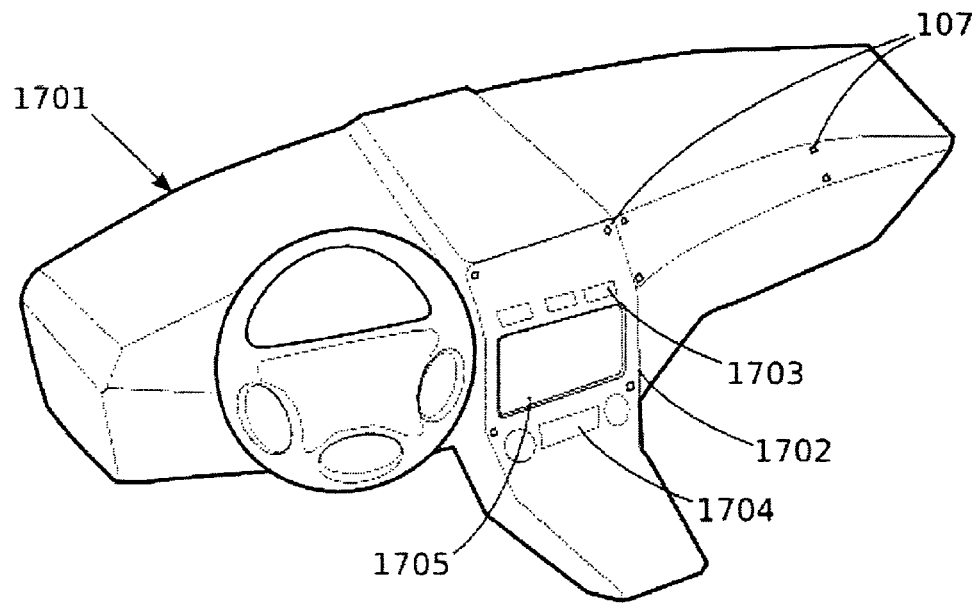
Figure 17B:
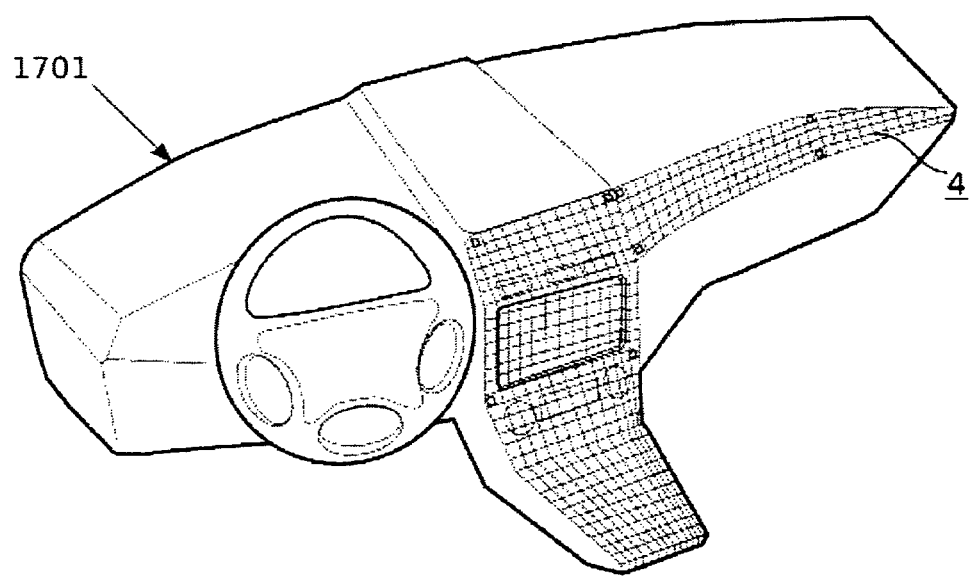

FIGS. 17A and 17B show an illustrative passenger-car embodiment. FIG. 17A shows a model automobile dashboard and glove box (1701) and center console (1702) and indicates: some typical locations of: accelerometers (107); a typical automotive system-and-status display configured for impulse inputs to defined ngons (1705); ngon region for audio features (1704); and an ngon region for cabin climate control features (1703). The overall-mapped 4gons shown in FIG. 17B illustrate mapping of the extended transfer surface, TS, into large number of definable 4gons. In this illustrative version the ngons are scaled to approximately a 20-mm edge length. Of course, inherent in the present technology is the possibility to map such large impulse-responsive surfaces into alternative sets of larger, separated, spaced-apart ngons of different shapes and provided with graphics or surface-texture attributes which are easily human-discernible, even in low light levels.

Example 14

Impulse Configured Video-Game and Information-Kiosk Embodiments

In this alternative embodiment of the present invention, a projector (1805) is used to display an image (1802) on a nominally-flat screen or rigid surface (1801) fitted with an array of motion sensors and adapted for dynamic user interaction using a puck and hockey stick on a flat area in front of the display. The image of a goalie poised with extended stick in front of a hockey goal may be front or back projected. The object of the game is for the user to strike the puck and to drive it into an "unguarded area" of the image. An "unguarded area" is one in which only the local background view is displayed, i.e., the goal frame or the net. A goal is scored if the impact site of the struck puck actually falls on a portion of the image outside the images outlines of the goalie or his stick.

Figure 18:
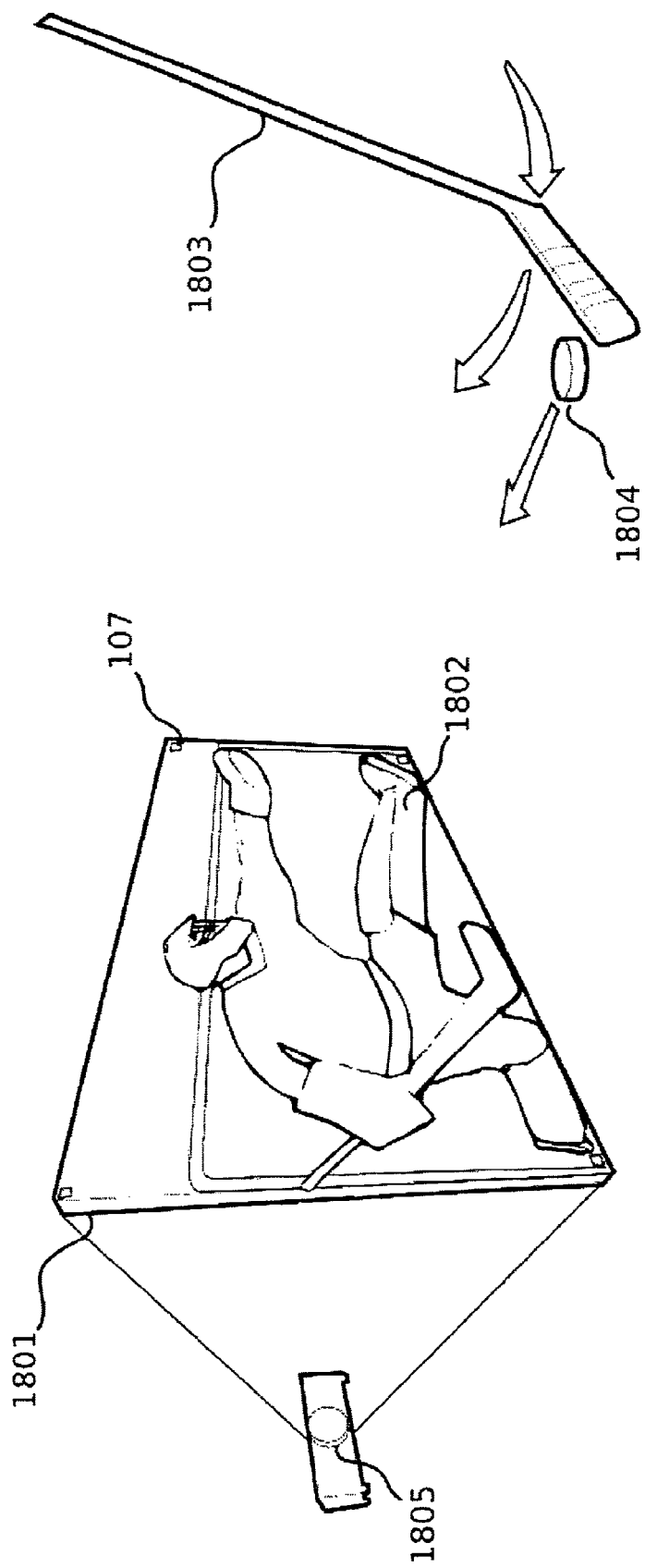

FIG. 18 illustrates a large projection screen or display surface (1801) with an image of a hockey goalie and net (1802). In this game, the user(s) use(s) the hockey stick (1803) to shoot the hockey puck (1804) and attempt to score a goal on the image of the hockey goalie and net. This embodiment includes the several elements of the present invention which are described above but adapted into this particular form and function. Working together, the array of sensors (107) along with the memory and processor determines the location of the impulse of the puck on a continuous topology of activatable polygons on the screen by performing analysis on the measured acceleration history, forming a CVP, and comparing the CVP with the CVP library. When the location of the impulse is determined, it can then be compared with the location of the displayed image of the goalie and of the net. If the hockey puck hits a location on the screen where the net is present, but the goalie is not displayed at that location, then this system determines that a goal has been scored by the user(s). If the hockey puck hits a location where the goalie is present, then the goalie has stopped the puck.

In another embodiment, the image of the goalie is dynamically animated, i.e., moves around with random movements or has a schedule of defined movements which may be responsive to the user(s) stance or movements.

In still another embodiment, this apparatus is useful for calculating the intensity and trajectory of the hockey puck. If the hockey puck is shot from a known location, the position on the screen is calculated with the system disclosed above, and the trajectory can be calculated based on the known starting position and the known location of impulse on the screen. The intensity is calculated by comparing the CVP to a library of CVPs associated with known intensity, or by comparing the amplitude of the non-normalized acceleration time history data of the impulse event with known amplitudes and their relation to known impulse intensities. This data can then be converted to velocity of the shot.

This embodiment is further adaptable to many other uses. For example, within the sports industry, this system could be made into a baseball pitching trainer, determining where in the strike zone a baseball pitch hit or where a cricket bowl hit.

A projected display as shown in FIG. 18 could also be used as an information kiosk in a public space such as a auditorium, store, museum, mall, transportation terminal or advertising display. In such an embodiment, the projector (1805) may display static, sequential or dynamic-interactive information to the user(s) on the display screen (1801). This information might include maps of the town/museum/mall, information about certain attractions at different locations, or information about different displays in the museum. The user(s) interact with the projected display by providing impulse inputs with their fingers on the locations they want to zoom in on, or find more information about.

In all the embodiments described above, the display does not necessarily have to be projected, but could also be an LCD, LED or other display surface that has a covering such as the removable protective ICS screen assembly (810) and protective screen (811) that is described in Example 3 and shown in FIG. 8C. If the impulse inputs are not damaging, then there not a need for the protective screen for these display technologies.

TABLE 1

TYPICAL ACCELEROMETER CHARACTERISTICS

| Device Type | Piezoresistive | Piezoelectric | Capacitive | |
|---|---|---|---|---|
| Design Source | Commercial | Commercial | Commercial | Developmental |
| Norm. range, +/− gravity accel. (=g) | 20 | 50 | 5 | ~4-6 |
| Sensitivity, mV/g | ~25 | ~100 | ~250 | 938 mV/g [2] |
| Resolution, mg | 2 | ~0.15 | ~2 | ~2.5 |
| Approx. freq. range, Hz | 0-500 | ~0.5 to 10 000 | ~0 to 5 000 | ~0.1 to 25 |
| Resonant freq., kHz | 1.4 | 35 | 18 | 2 |
| Nonlinearity, % | ~2 | ~5 | ~0.3 | ~1.5 |
| Max. transverse sensitivity, % | ~5 | ~5 | ~5 | ~4 |
| Max acceleration, gravity | ~2000 | ~5000 | ~1000 | ~40-50 |
| Mass, gram, g | ~6 | ~2 | ~1-2 | ~0.5 |
| Size, L × W × H, mm | 11.9 × 7.4 × 7.4 | 11.4 × 7.1 × 7.1 | 10.5 × 10.6 × 4.3 | 5 × 5 × 0.7 |

TABLE 2A

Commercial Motion-Sensor Accelerometer Characteristics

| Manufacturer | Part Number | Axes | Range (g) | Bandwidth (Hz) | Resolution/Sensitivity | Interface | Dims., mm |
|---|---|---|---|---|---|---|---|
| Analog Devices | ADIS16003 | 2-axis | ±1.7 | 2250 | 1.0 mg at 60 Hz | SPI | 7.2 × 7.2 × 3.7 |
| | ADIS16006 | 2-axis | ±5 | 2250 | 1.9 mg at 60 Hz | SPI | 7.2 × 7.2 × 3.7 |
| | ADIS16201 | 2-axis | ±1.7 | 2250 | 0.42 mg | SPI | 9.2 × 9.2 × 3.9 |
| STMicro-electronics | LIS202DL | 2-axis | ±2, ±8 | 200 | 16.2 mg at 50 Hz | I2C/SPI | 3 × 5 × 0.9 |
| | LIS302DL | 3-axis | ±2, ±8 | 200 | 16.2 mg at 50 Hz | I2C/SPI | 3 × 5 × 0.9 |
| | LIS331DL | 3-axis | ±2, ±8 | 200 | 18 mg at 50 Hz | I2C/SPI | 3 × 3 × 1 |
| | LIS3LV02DL | 3-axis | ±2, ±6 | 640-2560 | 15.6 mg at 2560 Hz | I2C/SPI | 7.5 × 4.4 × 1.8 |
| Freescale | MMA7450L | 3-axis | ±2, 4, 8 | 125 | 15.6 mg | I2C/SPI | 3 × 5 × 0.8 |
| | MMA7455L | 3-axis | ±2, 4, 8 | 125 | 15.6 mg | I2C/SPI | 3 × 5 × 1.0 |
| VTI Technologies | SCA3100 | 3-axis | ±2 | 45 | 1.1 mg | SPI | 8.6 × 7.6 × 3.3 |
| | SCA2120 | 2-axis | ±2 | 45 | 1.1 mg | SPI | 8.6 × 7.6 × 3.3 |
| Hitachi | H30CD | 3-axis | ±2, 4, 8 | 112 | 1 mg at ±2 g | I2C | 2.9 × 2.9 × 0.92 |
| Bosch | BMA020 | 3-axis | ±2, 4, 8 | 25-1500 | 4 mg at 10 bit | I2C/SPI | 3 × 3 × 0.9 |
| | BMA150 | 3-axis | ±2, 4, 8 | 25-1500 | 4 mg at 10 bit | I2C/SPI | 3 × 3 × 0.9 |
| | SMB380 | 3-axis | ±2, 4, 8 | 25-1500 | 4 mg at 10 bit | I2C/SPI | 3 × 3 × 0.9 |
| Analog Devices | ADXL321 | 2-axis | ±18 | 2500 | 3 mg (50 Hz) | analog | 4 × 4 × 1.45 |
| | ADXL330 | 3-axis | ±3 | 1600 | 300 mV/g | analog | 4 × 4 × 1.45 |
| STMicro-electronics | LIS2L06AL | 2-axis | ±2, ±6 | 2000 | 0.3 mg (100 Hz) | analog | 5 × 5 × 1.6 |
| | LIS3L06AL | 3-axis | ±2, ±6 | 1500 | 0.5 mg (100 Hz) | analog | 5 × 5 × 1.6 |
| Freescale | MMA7261QT | 3-axis | ±2.5-10 | 150 | 120 mV/g | analog | 6 × 6 × 1.45 |
| | MMA7331L | 3-axis | ±4, ±12 | 400 (XY), 300 (Z) | 308 mV/g at 4 g | analog | 3 × 5 × 1.0 |
| | MMA7341L | 3-axis | ±3, ±11 | 400 (XY), 300 (Z) | 400 mV/g at 3 g | analog | 3 × 5 × 1.0 |
| Bosch | BMA140 | 3-axis | ±4 | 1500 | 330 mV/g | analog | 3 × 3 × 0.9 |
| | BMA145 | 3-axis | ±4 | 1500 | 330 mV/g | analog | 4 × 4 × 0.9 |
| Kionix | KXD94 | 3-axis | ±5.0-13 | 800 | | analog | 5 × 5 × 1.2 |
| Dytran | 3035BG | 1-axis | ±50 | 10000 | 100 mV/g | analog | *0.28" × 0.33" |

TABLE 2B

Commercial Motion-Sensor Accelerometer Characteristics [Digital]

| Manufacturer | Package | Voltage (V) | Power Consumption | Temp. Range (° C.) | Shock Survival (g) |
|---|---|---|---|---|---|
| Analog Devices | | 3.0-5.25 | <2 mA | −40 to 125 | 3500 |
| | LGA | 3.0-5.25 | 1.4 mA | −40 to 125 | 3500 |
| | | 3.0-3.6 | | −40 to 125 | 3500 |
| STMicro-electronics | | 2.16-3.6 | <1 mW | −40 to 85 | 10000 |
| | | 2.16-3.6 | <1 mW | −40 to 85 | 10000 |
| | | 2.16-3.6 | <1 mW | −40 to 85 | 10000 |
| | LGA | 2.16-3.6 | 0.8 mA | −40 to 85 | 10000 |
| Freescale | | 2.4-3.6 | 0.4 mA | −40 to 85 | 10000 |
| | LGA-14 | 2.4-3.6 | 0.4 mA | −40 to 85 | 10000 |
| VTI Technologies | | 3.0-3.6 | 5 mA | −40 to 125 | 20000 |
| | | 3.0-3.6 | 5 mA | −40 to 125 | 20000 |
| Hitachi | | 2.2-3.6 | 0.27 mA | −35 to 85 | 5000 |
| Bosch | LGA-12 | 2.0-3.6 | 0.2 mA; 1 uA | −40 to 85 | |
| | LGA-12 | 2.4-3.6 | 0.2 mA; 1 uA | −40 to 85 | |
| | QFN-12 | 2.4-3.6 | 0.2 mA; 1 uA | −40 to 85 | |
| Analog Devices | LFCSP | 2.4-6.0 | 0.35 mA | −20 to 70 | 10000 |
| | LFCSP | 1.8-3.6 | 0.18 mA | −25 to 70 | 10000 |

TABLE 2B-continued

Commercial Motion-Sensor Accelerometer Characteristics [Digital]

| Manufacturer | Package | Voltage (V) | Power Consumption | Temp. Range (° C.) | Shock Survival (g) |
|---|---|---|---|---|---|
| STMicro-electronics | LGA-8 | 2.4-5.25 | 1.5 mA | −40 to 85 | 10000 |
|  | LGA-8 | 2.4-3.6 | 1.5 mA | −40 to 85 | 10000 |
| Freescale | QFN | 2.2-3.6 | 0.8 mA; 3 uA | −40 to 105 | ±2000 |
|  | LGA-14 | 2.2-3.6 | 0.4 mA; 0.3 uA | −40 to 105 | ±5000 |
|  | LGA-14 | 2.2-3.6 | 0.4 mA; 0.3 uA | −40 to 105 | ±5000 |
| Bosch | LGA-12 | 1.8-3.5 | 0.2 mA; 0.9 uA | −40 to 85 |  |
|  | LGA-16 | 1.8-3.5 | 0.2 mA; 0.9 uA | −40 to 85 |  |
| Kionix | DFN-14 | 2.75-5.25 | 1.1 mA; 5 uA | −40 to 85 | 5000 |
| Dytran | BNC | 18-30 | 2-20 mA |  |  |

TABLE 3

(BASIC TERMS AND DEFINITIONS)

| Ind. | Meaning, Units | Min Value | Typical Value | Max Value |
|---|---|---|---|---|
| 1 | impulse force vector (IV) | | | |
| 1.1a | IV zenith (theta angle), deg | 0 | 0 to 180 | 180 |
| 1.1b | IV azimuth (phi angle), deg | 0 | 0 to 360 | 360 |
| 1.1c | impulse force × time, N-s | 1.00E−003 | 3.00E−001 | 2.00E+000 |
| 1.2 | IV tip contact radius, mm | 0.1 | 2 | 15 |
| 1.3 | IV tip matls, type, NA | -polymer, elastomer, metal, ceramic, keratin, tissue- | | |
| 1.4 | IV tip matls. E or G, Gpa | 0.2 | ~2.5 | >200 |
| 1.5 | IV Origin, NA | N/A | N/A | N/A |
| 2 | transfer surface coords (TS), x, y, z, mm | 50, 50, 8 | 80, 80, 12 | >3000, >3000 |
| 2.1 | TS Origin, NA | N/A | N/A | N/A |
| 3 | transfer site material (TSM) | | | |
| 3.1 | TSM type, NA | polymer, alloy, metal, composite, ceramic, glass | | |
| 3.2 | TSM modulus, E or G, MPA | 0.2 | ~2.5 | >200 |
| 3.3 | TSM thickness, mm | 0.5 | 1.5 | >5 |
| 3.4 | TSM lateral extent, mm | 20 | 100 | >2000 |
| 4 | activatable polygon (AP) | | | |
| 4.1 | AP shape, NA | ---triangle, quadrilateral, n-gon (circle, ellipse)--- | | |
| 4.2 | AP edge, length, mm | 5 | 10 to 15 | >2000 |
| 4.3 | AP spacing, area-centroids, mm | 5 | 10 to 15 | >2000 |
| 4.4 | AP cylin. or spher. curvature rad., mm | 5 | 200 to infinity | infinity |
| 5 | external damping factors (EF) | | | |
| 5.1 | EF clamp or mount matl. absorption, alpha, non-dim | elastomer | soft polymer | hard polymer, metallic |
| 5.2 | EF matl. thickness, mm | 0.5 | 1 | >10 |
| 5.3 | EF situation factors (handheld) | foam cushion | hand grip | flat surface |
| 6 | motion sensing devices (MS) | | | |
| 6.1 | MS type, NA | sol-st device | MEMS-accel. | discrete devs. |
| 6.2 | MS sensitive axes, 1 <= number <= 3 | 1 | 3 | 3 |
| 6.3 | MS size, L, W, H, mm | 3, 3, 1 | 5, 5, 2 | 7, 7, 3 |
| 6.4 | MS detn. threshold, x-gravity | 0.1 | 0.6 | 5 |
| 6.5 | MS output, per accel- change unit, NA | (see Tabs. 1, 2) | (see Tabs. 1, 2) | (see Tabs. 1, 2) |
| 6.6 | MS axis alignment re AP, NA | (not) | (some, most) | (all) |
| 6.7 | MS axis alignment re IV, NA | (not) | (some, most) | (all) |
| 6.8 | MS mounting damping, NA | adhesive, 0.1 mm | mech/adhesive | (press fit) |
| 6.9 | MS array layout, NA | (discrete) | Part.-continuous) | (continuous) |
| 6.10 | MS origin spacing in the array, mm | 10 | 40 | >2000 |
| 6.11 | MS origin-TS spacing, mm | 5 | 20 | >200 |
| 6.12 | IV-MS vector distance(s), mm | 5 | 20 | >200 |
| 6.13 | MS Origin, NA | N/A | N/A | N/A |

TABLE 4A

TECHNICAL INDICIA

| Ind. | Definition | FIGS. |
|---|---|---|
| 101 | Hand-held device(cell phone, remote, . . . ) | 1a, 1d, 1e |
| 102 | Casing | 1a |
| 103 | Mechanical Push Button | 1a |
| 104 | Decals | 1a, 6a-c |
| 105 | Screen | 1a, 6c |
| 106 | Speaker | 1a, 1c, 6a |
| 107 | Sensor | 1b, 1c, 1g, 6a, 6b, 6c, 7a, 7b, 7e, 8b, 8c, 11, 12b, |

TABLE 4A-continued

TECHNICAL INDICIA

| Ind. | Definition | FIGS. |
|---|---|---|
| | | 13, 14a, 14c-e, 15a, 15b, 16a, 17a, 17b, 18 |
| A1, 107 | Sensor A | 1f |
| A2, 107 | Sensor B | 1f |
| 110 | Connector | 1b, 1c |
| 111 | Microcontroller | 1b, 1c |
| 112 | Filter | 1c |
| 113 | Amplifier | 1c |
| 114 | Analog to Digital Converter | 1c |
| 115 | Central Processing Unit | 1c |
| 116 | Memory | 1c |
| 130 | Flexural Mode of Plate | 1i |
| 131 | Wave Propagation Direction | 1j |
| 132 | Propagating Transverse Wave | 1j |
| 200 | Continue configuration | 2 |
| 210 | Select Impulse Parameters | 2 |
| 220 | Data Acquisition | 2, 3 |
| 230 | Signal Conditioning | 2, 3 |
| 240 | Sensor reading threshold comparison | 2, 3 |
| 250 | Compute Composite Vibration Profile | 2, 3 |
| 260 | Store Composite Vibration Profile | 2 |
| 280 | Form CVP Comparison Library | 2 |
| 300 | Determine Impulse Vector Parameters | 3 |
| 310 | Input site determination | 3, 5 |
| 320 | Impulse focus determination | 3 |
| 330 | Impulse intensity characterization | 3 |
| 340 | Output decision | 3 |
| 500 | Characteristic Vibration Profile | 5 |
| 511 | Compute distances to points in CVP library | 5 |
| 512 | Discard k distances from each class | 5 |
| 513 | Return class with smallest distance | 5 |
| 514 | Distance < threshold | 5 |
| 520A | Return impulse location of best match | 5 |
| 520B | No match | 5 |
| 600 | Sealed keyboard | 6a |
| 601 | Interface skin | 6a |
| 602 | Keyboard panel | 6a |
| 603 | Microcontroller housing | 6a |
| 604 | Universal Serial Hub (USB) Interface | 6a |
| 605 | Support riser | 6a |
| 610 | Touch-activated headphone | 6b |
| 611 | Printed Circuit Board | 6b, 7e |
| 612 | Cover plate | 6b |
| 620 | Touch activated laptop | 6c |
| 700 | Point of Care Device | 7a |
| 710 | Mobile Clinical Assistant | 7b-e |
| 711 | Traditional Touch Screen | 7b |
| 721 | Mounting Screw | 7e |
| 800 | LCD Monitor | 8a-c |
| 801 | Factory Installed ICS Screen | 8a |
| 810 | Removable Protective ICS Screen Assembly | 8c |
| 811 | Protective Screen | 8c |
| 812 | Assembly Frame | 8c |
| 813 | Compliant Mount | 8c |
| 814 | Clearance | 8e |
| 1000 | Input Surface | 10a-e |
| 1001 | Configuration Phase Input Site | 10a-e |
| 1002 | Operation Phase Input Site | 10a-d |
| 1003 | Match Vector | 10d, 10e |
| 1004 | Equivalent Match Vector | 10d, 10e |
| 1010 | Normal Process | 10a |
| 1011 | Calculate Equivalent Match Vector | 10d |
| 1012 | Determine Interpolated Input Site | 10d |
| 1020 | Interpolation to Reduce Config. Requirements | 10b |
| 1030 | Interpolation Process to Increase Resolution | 10c |
| 1200 | Arbitrary Flat Plate (Reinforced with Ribs) | 12a-c |
| 1201 | Angle Alpha Describing Layout of Ribs | 12b |
| 1202 | Angle Beta Describing Layout of Ribs | 12b |
| 1210 | Reinforcing Ribs on Flat Plate | 12a-c |
| 1211 | Width of Reinforcing Rib | 12c |
| 1212 | Thickness of Reinforcing Rib | 12c |
| 1213 | Spacing Between Adjacent Reinforcing Ribs | 12c, 12e |
| 1250 | Arbitrary Surface with Reinforcing Ribs | 12d |
| 1260 | Reinforcing Ribs on Arbitrary Surface | 12d |
| | Etc . . . | |
| 1270 | Arbitrary Device with Example Reinforcing Ribs | 12e |
| 1271 | Impulse Surface (of Device 1270) Connected to Ribs | 12e |
| 1272 | Length of Device 1270 | 12e |
| 1273 | Width of Device 1270 | 12e |
| 1274 | Vertical Corner Intersection Edge of Device 1270 | 12e |
| 1275 | Exemplary Tapered Reinforcing Rib on 1270 | 12e |
| 1276 | Exemplary Non-Tapered Reinforcing Rib on 1270 | 12e |
| 1277 | Length of Reinforcing Ribs on 1270 | 12e |
| 1278 | Minimum Cross-Section of Re-inforcing Rib 1275 | 12e |
| 1279 | Cross-Section of Reinforcing Rib 1276 | 12e |
| 1281 | Spacing Between Outside Rib and Side Bounding Edge | 12e |
| 1300 | Arbitrary Long Plate Surface | 13a, 13b |
| 1310 | Ribs for Arbitrary Long Plate Surface | 13b |
| 1401 | Desktop Monitor Device with Curved Display | 14a |
| 1402 | Main Viewing area of Curved Display | 14a-c |
| 1403 | Base or Support for Curved Display System | 14a |
| 1410 | Wearable Computer with Curved Display | 14b, 14c |
| 1411 | Frame or Edge Around a Curved Display | 14a, 14b |
| 1500 | Device with Traditional Touch-Screen Technology | 15a, 15b |
| 1501 | Frame around Device 1500 | 15a, 15b |
| 1510 | Traditional Touch Screen of Device 1500 | 15a, 15b |
| 1601 | Stringed Racquet Implement | 16a, 16b |
| 1701 | Model Automobile Dashboard and Glovebox | 17a, 17b |
| 1702 | Model Auto Center Console | 17a |
| 1703 | Climate Control User Inputs | 17a |
| 1704 | Auto Audio Controls | 17a |
| 1705 | Auto Telematics Display | 17a |
| 1801 | Substantially Planar Surface with Projected Image on it | 18 |
| 1802 | Image Displayed on 1801 | 18 |
| 1803 | Hockey Stick to Shoot Puck | 18 |

TABLE 4A-continued

TECHNICAL INDICIA

| Ind. | Definition | FIGS. |
|---|---|---|
| 1804 | Hockey Puck that Hits 1801 | 18 |
| 1805 | Projector that Throws Image on Surface 1801 | 18 |

TABLE 4B

TECHNICAL SYMBOLS/ABBREVIATIONS

| Symbol | Definition | Figure Usage |
|---|---|---|
| CVP, V P$_i$ | Composite Vibration Profile Parameter i | 2, 3, 4a, 4b, 5 |
| ADB | Normalized Acceleration Data Buffer | 4a, 4b, 4c, 4d |
| ADB' | Non-normalized Acceleration Data Buffer | |
| DB | CVP Database | |
| L | CVP Comparison Library | 2, 5 |
| NN | Nearest Neighbour | |
| kNN | K Nearest Neighbour | 5 |

TABLE 5

TYPICAL HOUSING POLYMER PROPERTIES

| Polymer Class | Specific Gravity | Tensile, kPa | Modulus, MPa | Elongation, % | Heat Dist. Temp, C. |
|---|---|---|---|---|---|
| Acetal | 1.42 | 65 | 2.79 | 44 | 117 |
| ABS | 1.04 | 45 | 2.24 | 100 | 101 |
| Acrylic | 1.18 | 68 | 2.76 | 5 | 82 |
| PTFE | 2.16 | 28 | 0.52 | 240 | 56 |
| Polyamide, 6/6 | 1.14 | 83 | 3.07 | 180 | 93 |
| Polycarbonate | 1.20 | 62 | 2.38 | 85 | 137 |
| Polyimide | 1.43 | 69 | 2.07 | 7 | 360 |
| Polypropylene | 1.10 | 30 | 2.76 | 350 | 78 |
| Polystyrene | 1.06 | 48 | 3.10 | 2 | 87 |
| Polyurethane | 1.20 | 43 | 0.02 | 550 | 93 |
| PVC | 1.50 | 18 | 0.34 | 270 | 79 |
| Polyphenylene Oxide | 1.06 | 76 | 2.62 | 70 | 191 |
| Polysulfone | 1.25 | 69 | 2.48 | 80 | 0 |

What is claimed is:

1. Apparatus for providing user operational impulse inputs for directing a connected electronic device comprising:

an external enclosure provided with at least one substantially-planar, moveable, input surface defined by bounding edges;

the location of any point on said input surface being designated by an orthogonal coordinate system, the origin of which is fixed adjacent the intersection of a pair of said bounding edges while the x and y basis vectors of which are aligned parallel to at least one of said bounding edges and the z basis vector extends substantially perpendicular to said input surface;

said input surface(s) being mathematically mapped into a group of one or more n-sided, closed polygons, each said polygon defined by the length of a selected side and the x abscissa and y ordinate coordinates of its centroid of area;

each said polygon representing a particular input character or logic value by which the user enters operational commands for directing said connected device;

an array of multiple motion sensors each mechanically linked to an input surface and adapted to provide operational-displacement signals directly reflective of impulse-vector-related displacements thereof consisting essentially of: free-body displacement, rotation about an axis drawn across an input surface and transient elastic Chladni deflections of said input surface;

said sensor array being sufficiently sensitive for accurately detecting: changes in the direction and velocity of said origin, changes in the angular velocity of one or more said bounding edges about said drawn axis and transient flexural deflections of said input surface at frequencies below about 10 000 Hz;

each said polygon being initially pre-configured by user's application of a standardized impulse of mechanical energy indicative of a specific operational input, said impulse being: oriented, in spherical coordinates with degree units, in a predetermined vector direction, (1,1a), (1,1b), and (1,1c) and being sustained for a predetermined force*time interval, in, for example, N-sec units;

a processor supported adjacent to said array and connected to receive said operational-displacement signals;

said processor adapted to store and access signals resulting from said standardized user-configuration impulses as individual records in a Composite Vibration Profile (CVP) configuration database;

said processor adapted to discriminate technical features of accidental movements of said input surface(s) and to reject invalid operational impulses thereupon including: accidental user impacts and body tremors, environmentally-coupled acoustic vibrations, unintended ultrasonic-frequency-wave reflections-dispersions as well as Lamb- and surface-acoustic waves;

said processor, during post-configuration operation, being especially adapted to utilize stored solution algorithms for producing technical effects, including dynamic analysis of accelerations resulting from or related to each operational impulse and the resulting generation of an instantaneous-operational (CVP) parameter;

said technical effects also including: (a) filtering-conditioning for removal of noise and interfering signals, (b) threshold testing, (c) vibration profile characterization, (d) input site determination and finally (e) impulse focus and intensity characterization and (f) comparison of instantaneous (CVP) parameters with said configuration database, whereby the polygon with the nearest (CVP) match is reliably identified;

whereby said processor is adapted to deliver an output signal into the connected device reflective of the user's intent in applying the operational impulse.

2. The apparatus of claim 1, further comprising:

the apparatus and connected device being combined into an integrated electronic appliance sized and shaped for gripping in a human hand and enclosed within a thin-walled housing defined by a pair of mating, separated, generally rectangular, four-cornered, front and back faces, connected along their edges by four substantially perpendicular, intersecting peripheral faces extending therebetween;

said edge-intersections defining bounding edges of one or more separate input surfaces;

said front face being provided with a transparent portion through which a known, underlying display screen is visible;

said front face being mapped to present multiple polygons over at least a portion of its surface, including the display, and said impulse-vector orientation origin being located at lower left corner thereof;

at least one said additional face also being mapped to present multiple quadrilateral polygons over at least a portion of its surface;

said polygon edges delineated for human user perception by one or more of: visible and tactile markings;

each said polygon area identified with one or more of: human perceptible display images, markings and symbols;

said array of motion sensors comprising three to six MEMS-type accelerometers each being sufficiently sensitive along at least one of three orthogonal axes to sense impulse-related accelerations while said housing is being held in the user's hand;

each of said accelerometers being fixed to a selected location within said housing and aligned with its sensitive axes generally parallel to the defining edges of said front face;

at least three of said selected locations being interior corner locations of said front face;

whereby predetermined operational user impulses delivered to configured polygons provide control inputs for the appliance.

3. The appliance of claim 2, further comprising:

said front-face input surface geometry is one of: generally cylindrical with a radius of curvature greater than about 100 mm and generally prismatic formed of two or more separated, side-by-side, flat mosiac strips each defined as being externally tangent to a cylinder having a radius in the range 100 mm to 10 m;

said front face being further provided with one or more known manual-switch controls including mechanical keys and joy-stick devices distributed among said polygons whereby known additional, repeated or enhanced functions of said appliance are triggered by simultaneous or immediate sequential user activation of said polygons and said switches;

said display is a known touch screen exposed within a portion of said front face;

whereby control inputs for said appliance are provided from one or more of: predetermined operational user impulses delivered to configured polygons and user actuation of said known switch controls.

4. The apparatus of claim 1, further comprising:

said apparatus and connected device being combined into an integrated, mobile electronic appliance enclosed within a clamshell housing including a pair of pivoting, mating first and second elements each in the form of a thin, rectangular-block defined by opposing, separated, four-cornered main faces, twelve edges and respective peripheral-edge faces extending between said corners, said elements being mechanically hinge-coupled together at one or more points along one abutting peripheral edge and said elements adapted to move from a closed placement, whereby only exterior and peripheral edge-faces are exposed, to an opened placement, whereby said internal faces are rotated about 90-180 deg. and exposed for use and whereby all said faces are available for user impulses;

said interior main face of said first element being provided with one said input surface and said interior main face of said second element being provided with a known display screen overlaid with a transparent input surface, said surfaces, along with at least one of said peripheral-edge faces, also being mapped with said polygons;

said polygon edges delineated for human user perception by one or more of: visible and tactile markings;

each said polygon area identified with one or more of: human-perceptible display images, markings and symbols;

said array of motion sensors comprising three to ten MEMS-type accelerometers each being sufficiently sensitive along at least one of three orthogonal axes to sense impulse-related accelerations while said housing is in said opened placement and said first element is supported in a generally level attitude;

three of said accelerometers being each respectively fixed to a selected corner location within each of said elements and aligned with its sensitive axes generally parallel to said defining edges of said elements;

said processor being initially user configured to identify subsequent operational impulses applied to any designated polygon;

whereby predetermined operational user impulses delivered to configured polygons provide control inputs for the appliance.

5. The apparatus of claim 2, further comprising:

said apparatus and connected device being combined into an integrated, handheld, electronic medical appliance enclosed within a sealed housing;

said processor being initially user configured to identify subsequent operational impulses applied to any polygon;

whereby predetermined operational user impulses delivered to configured polygons provide control inputs for the appliance.

6. The apparatus of claim 2, further comprising:

said apparatus and connected device being combined into an integrated, handheld, electronic medical appliance enclosed within a sealed housing;

at least one said input surface being further provided with one or more known manual-switch controls including mechanical keys and joy-stick devices distributed among said polygons whereby known additional, repeated or enhanced functions of said appliance are triggered by simultaneous or immediate sequential user activation of said polygons and said switches;

said processor being initially user configured to identify subsequent operational impulses applied to any polygon;

whereby control inputs for said appliance are provided from one or more of: predetermined operational user impulses delivered to configured polygons and user actuation of said known switch controls.

7. The apparatus of claim 2, further comprising:

the apparatus and connected device being combined into an integrated, handheld, electronic medical appliance enclosed within a sealed housing;

at least one said input surface being further provided with one or more known manual-switch controls including mechanical keys and joy-stick devices distributed among said polygons whereby known additional, repeated or enhanced functions of said appliance are triggered by simultaneous or immediate sequential user activation of said polygons and said switches;

said back face also being mapped to present multiple user-input polygons over at least a portion of its surface;

said processor being initially user configured to identify subsequent operational impulses applied to any polygon;

whereby control inputs for said appliance are provided from one or more of: predetermined operational user impulses delivered to configured polygons and user actuation of said known switch controls.

8. The apparatus of claim 2, further comprising:
said apparatus and said connected device being combined into an integrated, hand-held, electronic medical appliance enclosed within a laterally-symmetric, free-form, tablet shaped housing provided with substantially-flat front and back faces, said enclosure being sealed, and having an outline defined by 2D-curved peripheral edges;
said front face being provided with a known rectangular, substantially co-planar touch screen display over at least a portion of its area;
said front face, including the screen area, being mapped to present multiple user-input polygons over at least a portion of its surface;
a portion of said peripheral edge also being mapped to present multiple user-impulse-input polygons;
said array of motion sensors comprising three to eight MEMS-type accelerometers, each being sensitive along at least one of three orthogonal axes;
said accelerometers being fixed to selected locations within the enclosure and aligned with one of their sensitive axes aligned substantially parallel to a line which bisects the area of said enclosure outline;
at least three of said selected locations being inside the enclosure adjacent the vertices of the maximum-edge-length right triangle which can be drawn within said outline;
whereby predetermined user impulses delivered to configured polygons provide control inputs for the appliance.

9. The apparatus of claim 8, further comprising:
said front face being provided with one or more known manual-switch controls including mechanical keys and joy-stick devices distributed among said polygons whereby known additional, repeated or enhanced functions of said apparatus are triggered by simultaneous or immediate sequential user activation of said polygons and said switches;
whereby control inputs for said appliance are provided from one or more of: predetermined operational user impulses delivered to configured polygons and user actuation of said known switch controls.

10. The apparatus of claim 1, further comprising:
said connected devices being a known desktop computer including a CPU, display screen and typical, standard input devices;
said apparatus including a surround-frame sized to allow direct user viewing of all screen area, fixed in front of, and spaced apart from, said screen;
said input surface being a transparent, stiff, low-mass, generally rectangular, planar overlay plate defined by bounding edges and elastically supported along at least one of said edges by one or more elastically-compliant mounts coupled to said frame and sized to provide a peripheral-edge spacing in the range 2-10 mm within said frame, while providing user a minimally-optically-distorted view of displayed information, whereby predetermined, limited 3D impulse-resultant movements thereof are allowed;
said overlay surface being mathematically mapped into multiple, separately-activatable, n-sided, closed polygons;
said polygons spread within said bounding edges of said overlay surface;
said overlay being provided with an array of motion sensors, each mechanically secured to its surface;
said array of motion sensors comprising three to six MEMS-type accelerometers each sensitive along at least one of three orthogonal axes, said axes aligned at mounting with at least one of said bounding edges, sensors being surface mounted adjacent at least three corners of said overlay;
said processor being supported on said surround-frame and connected to receive said impulse-generated signals;
whereby a user operational impulse applied to said overlay results in delivery of a processor output into the computer reflective of the intent of the user's input.

11. The apparatus of claim 10, further comprising:
selected one or more of said polygons provided with edge delineation and area-identification markings for human user perception by one or more of: visible and tactile features;
said processor being initially user configured to identify subsequent operational impulses applied to any polygon;
whereby a user operational impulse applied to a particular location on said overlay results in delivery of a processor output into the computer reflective of the intent of the user's operational impulse.

12. A system for human-user control of a networked electronic device comprising:
an enclosure which encompasses motion sensors, a connected processor provided with advanced firmware, including analysis algorithms adapted to resolve command impulses as well as a delivery means for providing signals into said network, said enclosure having at least one substantially-planar, input surface defined by bounding edges, at least a pair of said edges forming an orthogonal intersection;
the location of any point on said input surface being designated by an orthogonal coordinate system, the origin of which is fixed adjacent said orthogonal intersection while the x and y basis vectors of which are aligned parallel to one of said bounding edges and the z basis vector extends substantially perpendicular to said input surface;
said input surface(s) being mathematically mapped into one or more n-sided, closed polygons, each said polygon defined by the length of a side and the x abscissa and y ordinate coordinates of its centroid of area;
each said polygon representing a particular input character or logic value by which the user enters operational commands for directing said electronic device;
said motion sensors each positioned, mounted and mechanically linked to said input surface and adapted to provide signals directly reflective of impulse-vector-related displacements thereof;
said mechanically-linked motion sensors being functionally coordinated into an array sufficiently sensitive for accurately detecting changes in: rigid-body displacement, rotation about an axis drawn across, or along a bounding edge of, said input surface and transient, elastic Chladni deflections of said input surface at frequencies below about 10 000 Hz;
each said polygon being initially pre-configured by user's application of a standardized impulse of mechanical energy indicative of a specific operational input, said impulse being: oriented in a predetermined vector direction, (1,1a), (1,1b) and (1,1c), and sustained for a predetermined force*time interval in, for example, N-sec units;

said processor supported adjacent said array and connected to receive said pre-configuration and operational displacement signals;

said processor further adapted to store and access parameters resulting from said user-configuration signals as individual records in a configuration database Composite Vibration Profile (CVP);

said firmware adapted to discriminate technical features of extraneous movements of said surface and to reject invalid operational impulses thereupon consisting essentially of: accidental user impacts and body tremors, environmentally-coupled acoustic vibrations, unintended ultrasonic-frequency-wave reflections-dispersions as well as Lamb- and surface-acoustic waves;

said processor, during post-configuration operation, being especially adapted to utilize said firmware for producing characteristic technical effects consisting essentially of: immediate dynamic analysis of accelerations resulting from each operational impulse and the resulting generation of an instantaneous-operational (CVP) parameter;

said technical effects consisting essentially of: (a) filtering-conditioning for removal of noise and interfering signals, (b) threshold testing, (c) vibration profile characterization, (d) input site determination, (e) impulse focus and intensity characterization and (f) comparison of instantaneous (CVP) parameters with said configuration database whereby the polygon with the nearest (CVP) match is reliably identified;

said firmware including Bayesian logic implementations by which said parameters of selected recent impulses are also weighed before reaching the most-likely-input-polygon solution;

whereby said processor is adapted to furnish an output signal for delivery to said electronic device reflective of the intent of the user's operational impulse; and whereby system features are accessed and predetermined device functions are directed and modulated.

13. The system of claim 12, further comprising:

a hand-held electronic appliance wherein said user control system and said networked device are integrated and enclosed within a thin-brick housing sized and shaped for comfortable gripping by a human hand and formed as a thin shell;

said housing enclosure defined by twelve substantially-linear edges, corners formed by intersections of said edges and six substantially flat, rectangular faces including front, back and four peripheral faces;

said front face being one of said input surfaces, bounded by said edges and mapped into multiple input polygons;

said front face also being provided with a known rectangular display screen mounted substantially coplanar therein;

at least one of said back and peripheral faces also being mapped to present multiple quadrilateral, user-impulse-input polygons over at least a portion of its surface;

said motion sensors including three to six MEMS-type accelerometers each sensitive along at least one of three orthogonal axes;

three of said accelerometers being fixed within said enclosure in at least three of said corner locations of said front-face and aligned with their sensitive axes parallel to said bounding edges of the front face;

said processor being located inside said enclosure;

whereby predetermined user impulses delivered to configured polygons provide control inputs for said appliance.

14. The system of claim 13, further comprising:

said appliance front face is also provided with one or more known manual-switch controls including mechanical keys and joy-stick devices distributed among said polygons whereby known additional, repeated or enhanced functions of said apparatus are triggered by simultaneous or immediate sequential user activation of said polygons and said switches;

whereby control inputs for said appliance are provided from one or more of: predetermined operational user impulses delivered to configured polygons and user actuation of said known switch controls.

* * * * *